US009349023B2

(12) United States Patent
Mori et al.

(10) Patent No.: US 9,349,023 B2
(45) Date of Patent: *May 24, 2016

(54) DATABASE ENCRYPTION SYSTEM, METHOD, AND PROGRAM

(71) Applicant: NEC CORPORATION, Tokyo (JP)

(72) Inventors: Kengo Mori, Tokyo (JP); Satoshi Obana, Tokyo (JP); Jun Furukawa, Tokyo (JP); Isamu Teranishi, Tokyo (JP); Toshiyuki Isshiki, Tokyo (JP); Toshinori Araki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 162 days.

This patent is subject to a terminal disclaimer.

(21) Appl. No.: 14/323,364

(22) Filed: Jul. 3, 2014

(65) Prior Publication Data

US 2015/0006908 A1 Jan. 1, 2015

Related U.S. Application Data

(63) Continuation of application No. 13/991,101, filed as application No. PCT/JP2012/079149 on Nov. 9, 2012, now Pat. No. 8,812,877.

(30) Foreign Application Priority Data

Nov. 11, 2011 (JP) .................................. 2011-247908

(51) Int. Cl.
G06F 21/62 (2013.01)
H04L 9/14 (2006.01)
(Continued)

(52) U.S. Cl.
CPC ...... *G06F 21/6227* (2013.01); *G06F 17/30289* (2013.01); *G06F 21/602* (2013.01); *H04L 9/008* (2013.01); *H04L 9/0894* (2013.01); *H04L 9/14* (2013.01)

(58) Field of Classification Search
CPC .......................... G06F 21/6227; G06F 21/602
See application file for complete search history.

(56) References Cited

U.S. PATENT DOCUMENTS 6,360,324 B2 * 3/2002 Van Blarkom ...... G06F 21/6254
713/161
6,792,425 B2 9/2004 Yagawa et al.
(Continued)

FOREIGN PATENT DOCUMENTS

CN 1303065 A 7/2001
CN 102024054 A 4/2011
(Continued)

OTHER PUBLICATIONS

Tingjian Ge et al.; Fast, Secure Encryption for Indexing in a Column-Oriented DBMS; Data Engineering, 2007. ICDE 2007. IEEE 23rd International Conference on; Apr. 15-20, 2007; pp. 676-685; IEEE Xplore.*

(Continued)

*Primary Examiner* — Bradley Holder
(74) *Attorney, Agent, or Firm* — Sughrue Mion, PLLC

(57) ABSTRACT

A user apparatus connected to database apparatus via network comprises: unit that manages key information in order to encrypt and decrypt; storage unit that stores security configuration information of data and/or metadata; application response unit that determines whether or not encryption is necessary for database operation command, and if encryption is necessary, selects encryption algorithm corresponding to data and/or metadata, performs encryption, and transmits result to database control unit to cause database control unit to execute database operation, if encryption is not necessary, transmits database operation command to database control unit to cause database control unit to execute database operation, and receives processing result transmitted by database control unit, and if decryption or conversion of data and/or metadata of processing result is necessary, performs necessary decryption or conversion, and returns response to database operation command; and security configuration unit that configures security information of data stored in database.

29 Claims, 28 Drawing Sheets

(51) Int. Cl.
  *G06F 21/60* (2013.01)
  *G06F 17/30* (2006.01)
  *H04L 9/00* (2006.01)
  *H04L 9/08* (2006.01)

(56) References Cited

U.S. PATENT DOCUMENTS

| | | | |
|---|---|---|---|
| 7,093,137 B1 | 8/2006 | Sato et al. | |
| 7,111,005 B1 | 9/2006 | Wessman | |
| 7,152,067 B2 | 12/2006 | Yagawa et al. | |
| 7,539,682 B2* | 5/2009 | Rubin | G06F 17/30286 |
| 7,593,942 B2* | 9/2009 | Sack | G06F 21/6218 |
| 7,761,704 B2* | 7/2010 | Ho | H04N 5/913 380/201 |
| 7,814,076 B2* | 10/2010 | Sack | G06F 21/6227 707/694 |
| 7,818,588 B2* | 10/2010 | Duri | G06F 21/6245 709/207 |
| 7,844,829 B2* | 11/2010 | Meenakshisundaram | G06F 12/1483 380/277 |
| 7,890,774 B2* | 2/2011 | Agrawal | G06F 21/6227 713/193 |
| 7,992,010 B2* | 8/2011 | Dettinger | G06F 21/6245 713/189 |
| 8,001,389 B2* | 8/2011 | Dettinger | G06F 21/6245 713/189 |
| 8,032,765 B2* | 10/2011 | Dettinger | G06F 21/6245 713/193 |
| 8,055,678 B2 | 11/2011 | Kim et al. | |
| 8,213,620 B1* | 7/2012 | Sussland | H04L 9/083 380/278 |
| 8,639,947 B2* | 1/2014 | Elovici | G06F 21/6227 380/37 |
| 8,661,263 B2* | 2/2014 | Mattsson | G06F 21/6209 713/189 |
| 2001/0011349 A1* | 8/2001 | Garrison | H04L 9/0825 713/165 |
| 2001/0054142 A1* | 12/2001 | Van Blarkom | G06F 21/6254 713/151 |
| 2002/0019934 A1 | 2/2002 | Ishizaki | |
| 2002/0065956 A1* | 5/2002 | Yagawa | G06F 17/30557 719/330 |
| 2003/0187848 A1* | 10/2003 | Ghukasyan | G06F 17/30471 |
| 2004/0181679 A1* | 9/2004 | Dettinger | H04L 63/0428 713/193 |
| 2005/0027680 A1* | 2/2005 | Yagawa | G06F 17/30557 |
| 2009/0100033 A1 | 4/2009 | Kim et al. | |

FOREIGN PATENT DOCUMENTS

| | | |
|---|---|---|
| JP | 11-143780 A | 5/1999 |
| JP | 2002-055608 A | 2/2002 |
| JP | 2002-169808 A | 6/2002 |
| JP | 2003-186725 A | 7/2003 |
| JP | 2004-234344 A | 8/2004 |
| JP | 2004-528615 A | 9/2004 |
| JP | 2005-134990 A | 5/2005 |
| JP | 2009-099151 A | 5/2009 |
| JP | 2009-211384 A | 9/2009 |
| JP | 2010-224655 A | 10/2010 |
| JP | 2011-211593 A | 10/2011 |
| JP | 2011-227193 A | 11/2011 |
| WO | 02/29577 A2 | 4/2002 |

OTHER PUBLICATIONS

Damiani et al.; Key management for multi-user encrypted databases; StorageSS '05 Proceedings of the 2005 ACM workshop on Storage security and survivability, 2005; pp. 74-83;ACM Digital Library.*

Communication dated Feb. 11, 2015 from the State Intellectual Property Office of People's Republic of China in counterpart Application No. 201280003997.5.

Communication dated Apr. 14, 2015 from the European Patent Office in counterpart application No. 12848286.6.

Raluca Ada Popa et al: "CryptDB", Operating Systems Principles, ACM, 2 Penn Plaza, Suite 701 New York NY 10121-0701 USA, Oct. 23, 2011, pp. 85-100.

Craig Gentry, "Fully Homomorphic Encryption using Ideal Lattices", STOC'09, May 31-Jun. 2, 2009, pp. 169-178.

Office Action dated Mar. 27, 2014, issued by the Patent Office of the P.R.C. In corresponding Chinese Application No. 201280003997.5.

Japanese Office Action issued Jun. 24, 2014 in corresponding Japanese Patent Application No. 2013-168697.

* cited by examiner

FIG. 5

| PROCESSING CONTENT IDENTIFIER | PRIVACY LEVEL | ENCRYPTION ALGORITHM IDENTIFIER | CRYPTOGRAPHIC PROTOCOL IDENTIFIER |
|---|---|---|---|
| SIMPLE MATCH | HIGH | AES | AES_SS_H |
| SIMPLE MATCH | HIGH | HE1 | HE1_SS_H |
| SIMPLE MATCH | MEDIUM | SE1 | SE1_SS_M |
| SIMPLE MATCH | MEDIUM | AES | AES_SS_M |
| SIMPLE MATCH | MEDIUM | HE1 | HE1_SS_M |
| SIMPLE MATCH | LOW | SE1 | SE1_SS_L |
| SIMPLE MATCH | LOW | AES | AES_SS_L |
| ... | ... | ... | ... |
| ADDITION | HIGH | AES | AES_ADD_H |
| ADDITION | HIGH | HE1 | AHE1_SS_H |
| ... | ... | ... | ... |

FIG. 6

| TABLE NAME | TABLE NAME ENCRYPTED OR NOT | COLUMN NAME | COLUMN NAME ENCRYPTED OR NOT | COLUMN DATA ENCRYPTED OR NOT | COLUMN DATA PRIVACY LEVEL | COLUMN DATA ENCRYPTION ALGORITHM IDENTIFIER |
|---|---|---|---|---|---|---|
| EMPLOYEE LISTING | NO | WORK LOCATION | NO | YES | MEDIUM | SE1 |
| EMPLOYEE LISTING | NO | WORK LOCATION | NO | YES | MEDIUM | AES |
| EMPLOYEE LISTING | NO | 0xa638 | YES | YES | HIGH | AES |
| 0x30c8a4 ... | YES | NULL | NULL | NULL | NULL | NULL |
| △□ LISTING | NO | 0xc4b1 ... | YES | NO | NULL | NULL |
| ... | ... | ... | ... | ... | ... | ... |

FIG. 7

(A) EMPLOYEE LISTING (BEFORE ENCRYPTION)

| ... | WORK LOCATION | COMPANY POSITION |
|---|---|---|
| ... | HEAD OFFICE | SECTION CHIEF |
| ... | TAMAGAWA | SENIOR STAFF |
| ... | ... | ... |

(B) CIPHERTEXT TABLE INFORMATION LISTING

| TABLE NAME | COLUMN NAME | ENCRYPTION ALGORITHM | PARAMETER | CIPHERTEXT TABLE NAME |
|---|---|---|---|---|
| EMPLOYEE LISTING | WORK LOCATION | AES | NULL | CIPHERTEXT_AES_1 |
| EMPLOYEE LISTING | WORK LOCATION | SE1 | 0x16a... | CIPHERTEXT_SE1_1 |
| EMPLOYEE LISTING | 0xa638... | AES | NULL | CIPHERTEXT_AES_2 |
| ... | ... | ... | ... | ... |

(C) EMPLOYEE LISTING (AFTER ENCRYPTION)

| ... | WORK LOCATION | 0xa638... |
|---|---|---|
| ... | 1 | 1 |
| ... | 2 | 2 |
| ... | ... | ... |

(D) CIPHERTEXT_AES_1 LISTING

| ID | CIPHERTEXT |
|---|---|
| 1 | 0x3d8... |
| 2 | 0x962... |
| ... | ... |

(E) CIPHERTEXT_AES_2 LISTING

| ID | CIPHERTEXT |
|---|---|
| 1 | 0x61b... |
| 2 | 0xa53... |
| ... | ... |

(F) CIPHERTEXT_SE1_1 LISTING

| ID | CIPHERTEXT |
|---|---|
| 1 | 0x8ec... |
| 2 | 0x7c0... |
| ... | ... |

FIG. 9

| TABLE NAME | TABLE NAME ENCRYPTED OR NOT | DECRYPTED TABLE NAME | COLUMN NAME | COLUMN NAME ENCRYPTED OR NOT | DECRYPTED COLUMN NAME | COLUMN DATA ENCRYPTED OR NOT | COLUMN DATA PRIVACY LEVEL | COLUMN DATA ENCRYPTION ALGORITHM IDENTIFIER |
|---|---|---|---|---|---|---|---|---|
| EMPLOYEE LISTING | NO | NULL | WORK LOCATION | NO | NULL | YES | MEDIUM | SE1 |
| EMPLOYEE LISTING | NO | NULL | WORK LOCATION | NO | NULL | YES | MEDIUM | AES |
| EMPLOYEE LISTING | NO | NULL | 0xa638・・ | YES | COMPANY POSITION | YES | HIGH | AES |
| 0x30c8a4・・ | YES | ×× LISTING | NULL | NULL | NULL | NULL | NULL | NULL |
| △□ LISTING | NO | NULL | 0xc4b1・・ | YES | ●× | NO | NULL | NULL |
| ・・ | ・・ | ・・ | ・・ | ・・ | ・・ | ・・ | ・・ | ・・ |

FIG. 10

| ENCRYPTION ALGORITHM IDENTIFIER | KEY INFORMATION |
|---|---|
| AES | 0x51a4··· |
| HE1 | 0xb316··· |
| SE1 | 0x506c··· |
| : | : |

FIG. 17

| PROCESSING CONTENT IDENTIFIER | PRIVACY LEVEL | ENCRYPTION ALGORITHM IDENTIFIER | CRYPTOGRAPHIC PROTOCOL IDENTIFIER |
|---|---|---|---|
| SIMPLE MATCH | HIGH | AES | AES_SS_H |
| SIMPLE MATCH | HIGH | HE1 | HE1_SS_H |
| SIMPLE MATCH | MEDIUM | SE1 | SE1_SS_M |
| SIMPLE MATCH | MEDIUM | AES | AES_SS_M |
| SIMPLE MATCH | MEDIUM | HE1 | HE1_SS_M |
| SIMPLE MATCH | LOW | SE1 | SE1_SS_L |
| SIMPLE MATCH | LOW | AES | AES_SS_L |
| ⋮ | ⋮ | ⋮ | ⋮ |
| ADDITION | HIGH | AES | AES_ADD_H |
| ADDITION | HIGH | HE1 | HE1_ADD_H |
| ⋮ | ⋮ | | ⋮ |

CRYPTOGRAPHIC PROTOCOL INFORMATION STORAGE UNIT

FIG. 18

| TABLE NAME | TABLE NAME ENCRYPTED OR NOT | COLUMN NAME | COLUMN NAME ENCRYPTED OR NOT | COLUMN DATA ENCRYPTED OR NOT | COLUMN DATA PRIVACY LEVEL | COLUMN DATA ENCRYPTION ALGORITHM IDENTIFIER |
|---|---|---|---|---|---|---|
| EMPLOYEE LISTING | NO | ... | ... | ... | ... | ... |
| EMPLOYEE LISTING | NO | WORK LOCATION | NO | NO → YES | NULL → MEDIUM | NULL → AES |
| EMPLOYEE LISTING | NO | 0xa638 | YES | YES | HIGH | AES |
| 0x30c8a4 | YES | NULL | NULL | NULL | NULL | NULL |
| △□ LISTING | NO | 0xc4b1 | YES | NO | NULL | NULL |
| ... | ... | ... | ... | ... | ... | ... |

SECURITY CONFIGURATION INFORMATION STORAGE UNIT

FIG. 19

SECURITY CONFIGURATION INFORMATION TEMPORARY STORAGE UNIT

| TABLE NAME | TABLE NAME ENCRYPTED OR NOT | DECRYPTED TABLE NAME | COLUMN NAME | COLUMN NAME ENCRYPTED OR NOT | DECRYPTED COLUMN NAME | COLUMN DATA ENCRYPTED OR NOT | COLUMN DATA PRIVACY LEVEL | COLUMN DATA ENCRYPTION ALGORITHM IDENTIFIER |
|---|---|---|---|---|---|---|---|---|
| EMPLOYEE LISTING | NO | NULL | ... | ... | ... | ... | ... | ... |
| EMPLOYEE LISTING | NO | NULL | WORK LOCATION | NO | NULL | NO → YES | NULL → MEDIUM | NULL → AES |
| EMPLOYEE LISTING | NO | NULL | 0xa638... | YES | COMPANY POSITION | YES | HIGH | AES |
| 0x30c8a4... | YES | ××LISTING | NULL | NULL | NULL | NULL | NULL | NULL |
| △□LISTING | NO | NULL | 0xc4b1... | YES | ●× | NO | NULL | NULL |
| ... | ... | ... | ... | ... | ... | ... | ... | ... |

FIG. 20

(A) EMPLOYEE LISTING

| EMPLOYEE NUMBER | ... | WORK LOCATION | COMPANY POSITION |
|---|---|---|---|
| 8001 | .. | HEAD OFFICE | SECTION CHIEF |
| 8002 | .. | TAMAGAWA | SENIOR STAFF |
| .. | .. | .. | .. |

(B) LIST CREATED AFTER ENCRYPTION

| 8001 | HEAD OFFICE | 0x3d8··· | 1 |
|---|---|---|---|
| 8002 | TAMAGAWA | 0x962··· | 2 |
| .. | .. | .. | 3 |
| .. | .. | .. | .. |

FIG. 21

(A)
LIST CREATED AFTER ENCRYPTION

| 8001 | HEAD OFFICE | 0x3d8··· | 1 |
|---|---|---|---|
| 8002 | TAMAGAWA | 0x962··· | 2 |
| : | : | : | 3 |
| : | : | : | : |

(B)
CIPHERTEXT_AES_1 LISTING

| ID | CIPHERTEXT |
|---|---|
| 1 | 0x3d8··· |
| 2 | 0x962··· |
| : | : |

(C)
CIPHERTEXT TABLE INFORMATION LISTING

| TABLE NAME | COLUMN NAME | ENCRYPTION ALGORITHM | PARAMETER | CIPHERTEXT TABLE NAME |
|---|---|---|---|---|
| EMPLOYEE LISTING | WORK LOCATION | AES | NULL | CIPHERTEXT_AES_1 |
| : | : | : | : | : |

FIG. 22

(A)
LIST CREATED AFTER ENCRYPTION

| | HEAD OFFICE | | |
|---|---|---|---|
| 8001 | TAMAGAWA | 0x3d8… | 1 |
| 8002 | .. | 0x962… | 2 |
| .. | .. | .. | 3 |
| | | | .. |

(B)
EMPLOYEE LISTING

| EMPLOYEE NUMBER | … | WORK LOCATION | COMPANY POSITION |
|---|---|---|---|
| 8001 | .. | 1 | SECTION CHIEF |
| 8002 | .. | 2 | SENIOR STAFF |
| .. | .. | .. | .. |

(C)
CIPHERTEXT_AES_1 LISTING

| ID | CIPHERTEXT |
|---|---|
| 1 | 0x3d8… |
| 2 | 0x962… |
| .. | .. |

(D)
CIPHERTEXT TABLE INFORMATION LISTING

| TABLE NAME | COLUMN NAME | ENCRYPTION ALGORITHM | PARAMETER | CIPHERTEXT TABLE NAME |
|---|---|---|---|---|
| EMPLOYEE LISTING | WORK LOCATION | AES | NULL | CIPHERTEXT_AES_1 |
| .. | .. | .. | .. | .. |

FIG. 23

| TABLE NAME | TABLE NAME ENCRYPTED OR NOT | DECRYPTED TABLE NAME | COLUMN NAME | COLUMN NAME ENCRYPTED OR NOT | DECRYPTED COLUMN NAME | COLUMN DATA ENCRYPTED OR NOT | COLUMN DATA PRIVACY LEVEL | COLUMN DATA ENCRYPTION ALGORITHM IDENTIFIER |
|---|---|---|---|---|---|---|---|---|
| .. | .. | .. | .. | .. | .. | .. | .. | .. |
| WORK HOURS MANAGEMENT LISTING | NO | NULL | EMPLOYEE NUMBER | NO | NULL | NO | NULL | NULL |
| WORK HOURS MANAGEMENT LISTING | NO | NULL | WORK HOURS | NO | NULL | YES | MEDIUM | AES |
| WORK HOURS MANAGEMENT LISTING | NO | NULL | OVERTIME HOURS | NO | NULL | YES | MEDIUM | AES |
| WORK HOURS MANAGEMENT LISTING | NO | NULL | OVERTIME HOURS | NO | NULL | YES | MEDIUM | HE1 |
| WORK HOURS MANAGEMENT LISTING | NO | NULL | SECTION NUMBER | NO | NULL | NO | NULL | NULL |
| .. | .. | .. | .. | .. | .. | .. | .. | .. |

WORK HOURS MANAGEMENT LISTING

| EMPLOYEE NUMBER | WORK HOURS | OVERTIME HOURS | SECTION NUMBER |
|---|---|---|---|
| 4001 | 1 | 1 | 10A |
| 4002 | 2 | 2 | 11B |
| 4003 | 3 | 3 | 10A |
| .. | .. | .. | .. |

(B)

CIPHERTEXT TABLE INFORMATION LISTING

| TABLE NAME | COLUMN NAME | ENCRYPTION ALGORITHM | PARAMETER | CIPHERTEXT TABLE NAME |
|---|---|---|---|---|
| WORK HOURS MANAGEMENT LISTING | WORK HOURS | AES | NULL | CIPHERTEXT_AES_1 |
| WORK HOURS MANAGEMENT LISTING | OVERTIME HOURS | AES | NULL | CIPHERTEXT_AES_2 |
| WORK HOURS MANAGEMENT LISTING | OVERTIME HOURS | HE1 | 0xc9e | CIPHERTEXT_HE1_1 |
| .. | .. | .. | .. | .. |

(C)

CIPHERTEXT_AES_1 LISTING

| ID | CIPHERTEXT |
|---|---|
| 1 | 0x3d8··· |
| 2 | 0x962··· |
| 3 | 0xec9··· |
| .. | .. |

(D)

CIPHERTEXT_AES_2 LISTING

| ID | CIPHERTEXT |
|---|---|
| 1 | 0xc50··· |
| 2 | 0x18e··· |
| 3 | 0x623··· |
| .. | .. |

(E)

CIPHERTEXT_HE1_1 LISTING

| ID | CIPHERTEXT |
|---|---|
| 1 | 0xead··· |
| 2 | 0x8e0··· |
| 3 | 0xabd··· |
| .. | .. |

FIG. 25

CRYPTOGRAPHIC PROTOCOL INFORMATION STORAGE UNIT

| PROCESSING CONTENT IDENTIFIER | PRIVACY LEVEL | ENCRYPTION ALGORITHM IDENTIFIER | CRYPTOGRAPHIC PROTOCOL IDENTIFIER |
|---|---|---|---|
| : | : | : | : |
| SIMPLE MATCH | MEDIUM | SE1 | SE1__SS__M |
| ADDITION | MEDIUM | HE1 | HE1__ADD__M |
| ADDITION | LOW | OPE1 | OPE1__ADD__M |
| AVERAGE | MEDIUM | HE1 | HE1__AVG__M |
| : | : | | : |

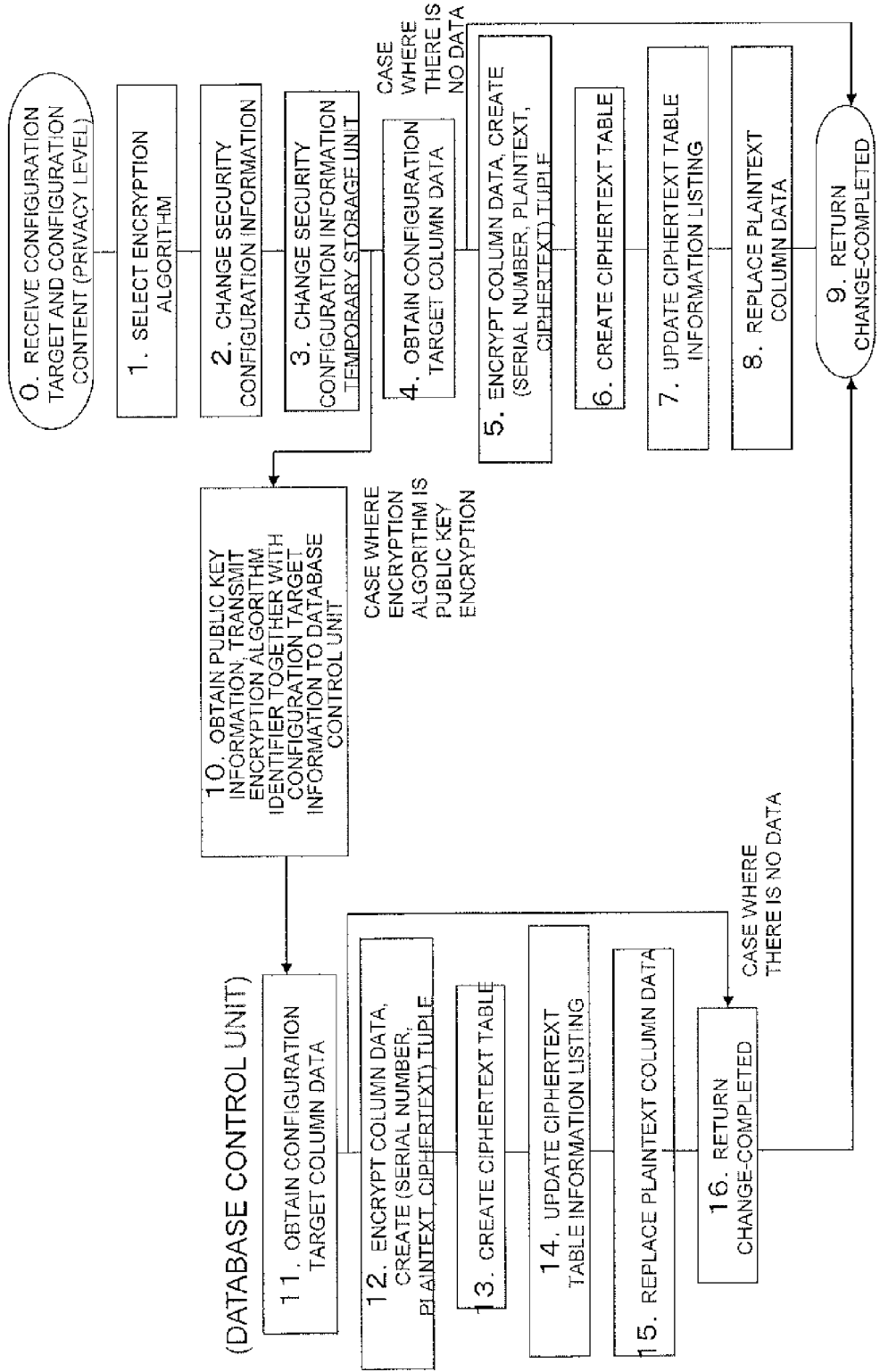

DATABASE ENCRYPTION SYSTEM, METHOD, AND PROGRAM

REFERENCE TO RELATED APPLICATION

This is a continuation of U.S. application Ser. No. 13/991,101, filed May 31, 2013, which is a National Stage of International Application No. PCT/JP2012/079149, filed Nov. 9, 2012, claiming priority based on Japanese Patent Application No. JP2011-247908 (filed on Nov. 11, 2011) the content of which is incorporated herein in its entirety by reference thereto. The present invention relates to information encryption technology, and in particular to a database encryption system, method, and program.

BACKGROUND

Technical Field

Recently there is increasing usage of cloud computing that provides clients with an Internet-based infrastructure for software, applications, operating systems (OS) and the like. Henceforth, it is expected that there will be an increase in usage modes for outsourcing in the cloud also with regard to databases.

However, with outsourcing of databases to the cloud, it is particularly important to prevent information leakage from the databases. To prevent information leakage from databases, a wide variety of methods of encrypting data recorded in databases have been proposed heretofore. While there is no particular limitation in this regard, examples of these methods are classified as follows.

1. When storing data in a database, the relevant data is encrypted to be stored, and when the data is extracted, the data is decrypted to be returned to a user.

Patent Literature PTL1, for example, discloses a method and device for automatic database encryption, wherein encryption is automatically executed in a transparent manner to a database user, without the database user being aware of it. A client, a database server, and a database are provided, and operation is performed by receiving a request to store data in a column of a database system. In a case where a user designates a column of the database system as an encrypted column, the data is encrypted automatically using an encryption function. The encryption function uses a key stored in a key file managed by a security administrator. After the encryption of the data, the system stores the data using a storage function of the database system. Operation is also performed by receiving a request to extract data from an encrypted column of the database system. The system checks column ID metadata to inquire whether the relevant column is encrypted, and if encrypted, in a case where the request to extract data is made by a permitted user, an encryption parameter is retrieved, a decryption key is retrieved to decrypt the data, and the decrypted data is returned to the client. In a case where the request to extract data is not made by a permitted user, the decrypted data is not decrypted. According to the method and device described in Patent Literature PTL1, the encryption/decryption key is managed on the database side. Therefore, the user of the database system (database user) does not need to modify enquiries to the database.

2. A key is managed on a user side by using an encryption scheme that can process ciphertext as it is.

Patent Literature PTL2, for example, discloses an encrypted database retrieval device that performs index creation processing applicable to a retrieval system which retrieves documents stored in an encrypted database, in encrypted form, to realize speeding up of retrieval processing. Data to be retrieved is encrypted with a key and encryption scheme the same as the encrypted data, to perform retrieval. In this system, even if there is information leakage on the database side, only encrypted text (ciphertext) is leaked.

As a system that manages the key on the user side and encrypts and decrypts data stored in the database by a terminal on the user side, Patent Literature PTL3, for example, discloses a database access system wherein the user terminal is provided with private key generation units for generating a private key using a public key, storage unit for storing the private key, encryption unit for encrypting data based on the public key, and decryption unit for decrypting the encrypted data using the private key, and wherein data leakage can be precisely prevented with respect to a third party intruding from outside, an administrator who stores and manages the data, and the like.

3. Encrypted text (ciphertext) is processed as it is, by arbitrary processing.

Non-Patent Literature NPL1 discloses enabling arbitrary logical operations on encrypted data by using Fully Homomorphic Encryption, and without decrypting a cipher.

[PTL1]
Japanese Translation of PCT International Publication, Publication No. JP2004-528615 (International Publication No. 02/029577)
[PTL2]
Japanese Patent Kokai Publication No. JP-2005-134990A
[PTL3]
Japanese Patent Kokai Publication No. JP-2004-234344A
[NPL1]
Craig Gentry, "Fully Homomorphic Encryption Using Ideal Lattices," STOC'09 May 31-June 2, pp. 169-178, 2009.

SUMMARY

An analysis of the related technology described above is given below by the present invention.

1. With regard to a method in which, when storing to a database, data is encrypted to be stored, and when extracting data, data is decrypted to be returned to a user, since a key for encryption/decryption is disposed on the database side, there is a possibility of information leakage due to intrusion into the database system from outside, or an impropriety or operational error by a database administrator or the like.

2. A method enabling a key to be managed on the user side by using an encryption scheme in which ciphertext can be processed as it is, can only partly handle general database operations (SQL: Structured Query Language) (for example, retrieval processing).

3. A method enabling processing of ciphertext as it is, by using Fully Homomorphic Encryption, requires a vast amount of computation. For example, it is estimated that computational processing 1 trillion times what is presently used would be necessary.

Therefore, there is a need in the art to provide a system, method and program that prevent information leakage of database systems and improve efficiency of processing. There is also a need in the art to provide a system, method and program that enable meeting the need without requiring restructuring of applications that perform database operations.

According to the present invention, there is provided a database encryption system, comprising: a database apparatus that comprises a database, and a database control unit that controls execution of database operation; and a user apparatus that is connected to the database control unit via a network.

The user apparatus comprises: a key usage unit that manages key information for encryption and decryption; a security configuration unit that configures information related to configuration of security of data and/or metadata stored in the database; a first storage unit that stores information related to the configuration of security; and an application response unit that receives a database operation command issued to the database apparatus, and determines whether or not encryption is necessary with respect to data and/or metadata handled by the database operation command, by referring to the information of the first storage unit. The application response unit, if encryption is necessary, transmits to the database control unit, as data and/or metadata of the database operation command, encrypted data and/or encrypted metadata that has been encrypted according to key information of the key usage unit by using an encryption algorithm corresponding to the security of the data and/or metadata, to cause the database control unit to execute the database operation. The application response unit, if encryption is not necessary, transmits the database operation command as it is, to the database control unit, to cause the database control unit to execute the database operation. The application response unit receives a database processing result transmitted by the database control unit, and if conversion or decryption of the data and/or metadata of the database processing result is necessary, returns a result of performing the conversion or the decryption according to key information of the key usage unit, to an issuing source of the database operation command as a response to the database operation command.

According to another aspect of the present invention, there is provided a user apparatus, connected to a database apparatus via a network. The user apparatus comprises: a key usage unit that manages key information for encryption and decryption; a security configuration unit that configures information related to configuration of security of data and/or metadata stored in the database; a first storage unit that stores information configured by the security configuration unit; and an application response unit that receives a database operation command issued to the database apparatus, and determines whether or not encryption is necessary with respect to data and/or metadata handled by the database operation command, by referring to the information of the first storage unit. The application response unit, if encryption is necessary, transmits to the database apparatus, as data and/or metadata of the database operation command, encrypted data and/or encrypted metadata that has been encrypted according to key information of the key usage unit by using an encryption algorithm corresponding to the security of the data and/or metadata, to cause the database apparatus to execute a database operation. The application response unit, if encryption is not necessary, transmits the database operation command as it is, to the database apparatus to cause the database apparatus to execute the database operation. The application response unit receives a database processing result transmitted by the database apparatus, and if conversion or decryption of the data and/or metadata of the database processing result is necessary, returns a result of performing the conversion or the decryption according to key information of the key usage unit, to an issuing source of the database operation command as a response to the database operation command.

According to a further aspect of the present invention, there is provided a database encryption method, comprising: by a user apparatus connected to a database apparatus via a network, storing and managing key information for encryption and decryption; configuring information related to configuration of security of data and/or metadata stored in the database and storing the information in a first storage unit; determining, with respect to a database operation command issued to the database apparatus, whether or not it is necessary to encrypt the data and/or metadata handled by the database operation command, by referring to the information of the first storage unit; if encryption is necessary, transmitting to the database apparatus, as data and/or metadata of the database operation command, encrypted data and/or encrypted metadata that has been encrypted according to the key information using an encryption algorithm corresponding to the security of the data and/or metadata, to cause the database apparatus to execute a database operation; if encryption is not necessary, transmitting the database operation command as it is, to the database apparatus to cause the database apparatus to execute the database operation; and receiving a database processing result transmitted by the database apparatus, and if conversion or decryption of the data and/or metadata of the database processing result is necessary, returning a result of performing the conversion or the decryption according to the key information to an issuing source of the database operation command as a response to the database operation command.

According to a further aspect of the present invention, there is provided a program, causing a computer of a user apparatus, connected to a database apparatus via a network, to execute: a key usage process of managing key information for encryption and decryption; a security configuration process of configuring information related to configuration of security of data and/or metadata stored in a database, and storing in a first storage unit; and an application response process of determining, with respect to a database operation command issued to the database apparatus, whether or not encryption is necessary with respect to data and/or metadata handled by the database operation command, by referring to the information of the first storage unit. The application response process further comprises: if encryption is necessary, transmitting to the database apparatus, as data and/or metadata of the database operation command, encrypted data and/or encrypted metadata that has been encrypted according to the key information by using an encryption algorithm corresponding to the security of the data and/or metadata, to cause the database apparatus to execute a database operation; if encryption is not necessary, transmitting the database operation command as it is, to the database apparatus to cause the database apparatus to execute the database operation; and receiving a database processing result transmitted by the database apparatus, and if conversion or decryption of the data and/or metadata of the database processing result is necessary, returning a result of performing the conversion or the decryption according to the key usage process to an issuing source of the database operation command as a response to the database operation command.

The present invention provides the following advantage, but not restricted thereto. According to the present invention, it is possible to prevent information leakage of database apparatus and improve efficiency of processing. Furthermore, according to the present invention, implementations that handle database operations without restructuring of applications are possible.

BRIEF DESCRIPTION OF DRAWINGS

FIG. 5 is a diagram describing a cryptographic protocol information storage unit in an exemplary embodiment of the present invention.

FIG. 6 is a diagram describing a security configuration information storage unit in an exemplary embodiment of the present invention.

FIG. 7 is a diagram describing a ciphertext table in an exemplary embodiment of the present invention; (A) is a table before encryption, (B) is a ciphertext table information listing, (C) is a table after encryption, and (D) to (F) are ciphertext tables.

FIG. 9 is a diagram describing a security configuration information temporary storage unit in an exemplary embodiment of the present invention.

FIG. 10 is a diagram showing an example of a key information storage unit in an exemplary embodiment of the present invention.

FIG. 17 is a diagram describing an example of the cryptographic protocol information storage unit in an exemplary embodiment of the present invention.

FIG. 18 is a diagram describing an example of the security configuration information storage unit in an exemplary embodiment of the present invention.

FIG. 19 is a diagram describing an example of a security configuration information temporary storage unit in an exemplary embodiment of the present invention.

FIG. 20 is a diagram describing an example of encryption of column data in an exemplary embodiment of the present invention.

FIG. 21 is a diagram describing configuration processing of data privacy level in an exemplary embodiment of the present invention.

FIG. 22 is a diagram describing configuration processing of data privacy level in an exemplary embodiment of the present invention.

FIG. 23 is a diagram describing data operation processing in an exemplary embodiment of the present invention.

FIG. 24 is a diagram describing data operation processing in an exemplary embodiment of the present invention.

FIG. 25 is a diagram describing data operation processing (cryptographic protocol information storage unit) in an exemplary embodiment of the present invention.

FIG. 28 is a flowchart describing another example of configuration processing of privacy level in an exemplary embodiment of the present invention.

PREFERRED MODES

Figure 1:
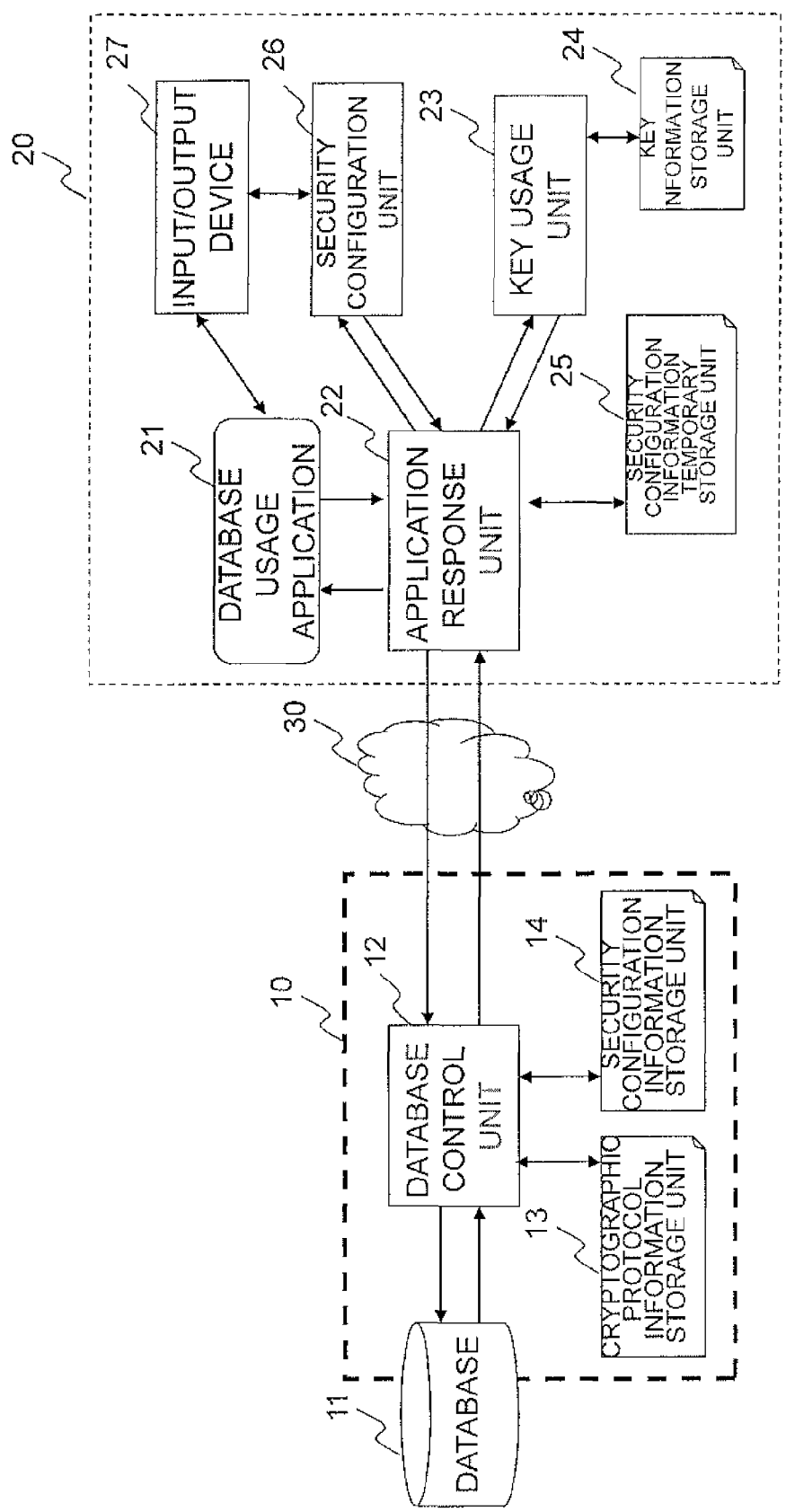
FIG. 1 is a diagram showing a system configuration of an exemplary embodiment of the present invention.

First a description is given of an outline of the present invention, and then a description is given concerning exemplary embodiments. According to one mode of the present invention, there are provided a database apparatus (for example, 10 in FIG. 1) that comprises: a database (for example, 11 in FIG. 1), and a database control unit that controls execution of database operations (for example, 12 in FIG. 1); and a user apparatus (for example, 20 in FIG. 1) that is connected to the database control unit (12) via a network (for example, 30 in FIG. 1). The user apparatus (20) comprises a key usage unit (for example, 23 in FIG. 1) that manages key information in order to encrypt and decrypt data and/or metadata (at least one of data and metadata); security configuration unit (for example, 26 in FIG. 1) that configures information related to configuration of security for data and/or metadata stored in the database; a first storage unit (for example, 25 in FIG. 1) that stores information configured by the security configuration unit; and an application response unit (for example, 22 in FIG. 1). The application response unit (22) receives a database operation command issued to the database apparatus (10), refers to information in the first storage unit (25), and determines whether or not encryption of data and/or metadata handled by the database operation command is necessary. In a case where encryption is necessary, the application response unit (22) transmits to the database control unit (12) encrypted data and/or encrypted metadata that has been encrypted by key information of the key usage unit (23) using an encryption algorithm corresponding to the security of the data and/or metadata, as the data and/or metadata of the database operation command, to cause the database control unit (12) to execute the database operation. In a case where encryption is unnecessary, the application response unit (22) transmits the database operation command as it is (as non-encrypted plaintext) to the database control unit (12) to cause the database control unit (12) to execute the database operation. The application response unit (22) receives a database processing result transmitted by the database control unit (12), and in a case where conversion or decryption of the data and/or metadata of the database processing result is necessary, performs the conversion or decryption according to key information of the key usage unit, and returns a response to the database operation command, to the issuing source (for example, 21 in FIG. 1) of the database operation command.

According to one mode of the present invention, the security configuration unit (26) performs, for data or metadata stored in the database (11), at least one of: a configuration or change with regard to encryption/non-encryption of metadata, a configuration or change with regard to encryption/non-encryption of data, and a configuration or change of privacy level information representing the security level of the data. The metadata includes a table name and column name for a table. The first storage unit (25) may be configured to hold, for data or metadata stored in the database, at least one of: information as to whether or not the metadata is encrypted, whether or not the data is encrypted, privacy level information representing the security level of the data, and distinguishing information of an encryption algorithm corresponding to the privacy level information.

According to one mode of the present invention, the first storage unit (25), in a case where the metadata including the table name and column name stored in the database are encrypted, in addition to the encrypted data name and column name, stores and holds the table name in plaintext and the column name in plaintext before encryption, as the table name after decryption and the column name after decryption. In a case where encryption of the metadata, including the table name and column name specified by the inputted database operation command, is necessary, and the metadata is stored and held as the encrypted table name and column name in the first storage unit (25), the application response unit (22) obtains the encrypted table name and column name in the first storage unit (25) as encrypted metadata (in this case, decryption by a key usage unit is not performed). The application response unit (22) may have a configuration in which, in a case where at least one of the table name and the column name, among metadata of the database processing result transmitted by the database control unit (12), is encrypted, at least one of a plaintext table name and plaintext column name of the decrypted table name and the decrypted column name of the first storage unit is obtained (in this case, decryption by the key usage unit is not performed), and returned to the issuing source as a response to the database operation command.

According to one mode of the present invention, the application response unit (22) may have a configuration in which a determination is made as to whether or not the table name and the column name specified by the database operation command are encrypted, by referring to the first and/or second storage unit, and in a case where at least one of the table name and the column name is encrypted, at least one of the plaintext table name and column name is replaced by ciphertext.

According to one mode of the present invention, the database apparatus (10) may be configured to be provided with: the second storage unit (14) that stores and holds information as to whether or not the metadata including the table name and column name stored in the database is encrypted, whether or not the data is encrypted, privacy level information representing data security level, and distinguishing information for an encryption algorithm corresponding to the privacy level information, and a third storage unit (13) that stores and holds at least cryptographic protocol distinguishing information associating processing content of the database operation command, privacy level information, and an encryption algorithm.

According to one mode of the present invention, the database (11) may be configured to function as at least one of the second and/or third storage unit (14, 13), and information stored in the second and/or third storage unit held as a table within the database may be stored as a table in the database.

According to the present invention, key information used in decryption is managed by the user apparatus (20), which is a database user, and after encryption on the user apparatus (20) side, data/metadata is transmitted to the database apparatus (10) to be stored in the database (11).

Furthermore, for a database usage application (21) on the user side that issues a database operation command (for example, SQL (Structured Query Language)), it is possible to perform a database operation using a normal database operation command, as a transparent database operation, without the application being aware of encryption of data. As a result, in the database usage application, modification or restructuring accompanying encryption is unnecessary (however, modification or restructuring of the database usage application is not prohibited).

<A. Prevention of Information Leakage>

By providing the storage unit (24) that stores the key information for encryption and decryption of data and the key usage unit (23) that manages the key information on the user apparatus (10) side, it is possible to prevent information leakage due to intrusion into the database apparatus from outside, or an impropriety or operational error by a database administrator or the like.

<B. Efficient Processing>

Selection and execution are performed with regard to processing (encryption algorithm) corresponding to security level (privacy level) required for data that is a target of operation by the database operation command inputted from the database usage application (21 in FIG. 1). For example, with data of low required security, processing is relatively fast, but an encryption algorithm for relatively low security is used. In addition, with data that does not require security (privacy), efficient processing is possible by excluding it from encryption.

<C. Handling of Arbitrary Database Operations is Possible>

In response to the database operation command inputted from the database usage application (21 in FIG. 1), computational processing (addition or multiplication, etc.) is executed in an encrypted state, on encrypted data stored in a database.

As is well known, in additive homomorphic encryption such as Paillier encryption for example, for ciphertext $E(m1)$ of plaintext m1, and ciphertext $E(m2)$ of plaintext m2, the following holds, as ciphertext $E(m1+m2)$ of m1+m2:

$$E(m1)+E(m2)=E(m1+m2)$$

That is, the ciphertext $E(m1+m2)$ of the sum m2+m2 of plaintext m1 and plaintext m2, is obtained directly from the sum of the ciphertext of m1 and the ciphertext of m2. In multiplicative homomorphic encryption such as RSA encryption, Elgamall encryption, or the like, with regard to ciphertext $E(m1 \times m2)$ of the product m1×m2 of plaintext m1 and m2, the following holds:

$$E(m1 \times m2)=E(m1) \times E(m2)$$

and the ciphertext $E(m1 \times m2)$ of plaintext m1×m2 is obtained directly from the product of the ciphertext of plaintext m1 and the ciphertext of plaintext m2.

In a case where the encryption algorithm is the abovementioned homomorphic encryption, computation of encrypted data as it is can handle addition or multiplication, but cannot handle complex operations such as addition, subtraction, multiplication, division, or logical operations. Therefore, in a case where computation of a database operation command cannot be obtained by computation of the encrypted data stored in the database as it is, the encrypted data recorded in the database is read and returned to the user apparatus side, computational processing is performed after decrypting to plaintext on the user apparatus side, and a computation result in plaintext that is obtained is returned to a database usage application of the issuing source of the database operation command. Or, in a case where more complex processing is necessary, multiple processing combining processing with encrypted data on the database side and processing with plaintext on the user apparatus side may be performed, so as to have consecutive execution where a plaintext computational result, obtained by performing computational processing after decryption to plaintext on the user apparatus side, is re-encrypted and transmitted to the database side, and computational processing with encrypted data is performed on the database side. In this way, by combining computational processing with encrypted data and computational processing with plain data, handling of arbitrary database operations is possible.

<D. Configuration of Privacy Level>

Whether or not information stored in the database on the user apparatus side is encrypted can be configured, for example, based on table, column, or column data, and it is possible to select a processing procedure (encryption algorithm) according to data operation content and required security (privacy level). In this way, it is possible to realize processing efficiency.

<E. Avoiding Application Restructuring>

In implementing the present invention, modification of sentence structure of database operation commands (for example, SQL commands or the like) is not necessary, and in the database usage application (21 in FIG. 1), the database operation command may be issued as it is (command sentence structure, and command specified table name, column name, data and the like, all in plaintext). When a database operation command is issued, such as table (listing) creation, column addition, row addition, or data computation, in the database usage application (21 in FIG. 1), it is inputted to the application response unit (22 in FIG. 2). In the application response unit (22 in FIG. 1), an encryption algorithm corresponding to the data security is selected, and after performing encryption with the encryption algorithm in question, the data is transmitted to the database apparatus (10). By providing the security configuration unit (26) to perform security configuration for data stored in the database (11) separately from the database usage application (21), restructuring of existing applications that use the database is unnecessary. That is, in implementing the present invention, data encryption, decryption, security configuration, and the like, need not be performed by an application and it is possible to handle arbitrary existing applications that issue database operation commands (it is possible to use existing applications as they are).

It is to be noted that Patent Literature PTL3 discloses a database access system where a user terminal is provided with a private key generation unit that generates a private key using a public key, storage unit that stores the private key, encryption unit that encrypts data based on the public key, and decryption unit that decrypts the encrypted data using the private key, wherein it is possible to precisely prevent data leakage with respect to a third party intruding from the outside or an administrator storing and managing data. Patent Literature PTL3 discloses implementation of information leakage prevention as described above in A, but does not disclose the abovementioned points B to E.

Exemplary Embodiment

A description is given below of an exemplary embodiment making reference to the attached drawings.

<System Configuration Example>

FIG. 1 is a diagram describing one exemplary embodiment of the present invention. Referring to FIG. 1, a database apparatus 10 and a user apparatus (user apparatus) 20 are connected via a network 30 such as a LAN (Local Area Network), a WAN (Wide Area Network), or the Internet. The database apparatus 10 is provided with a database 11, a database control unit 12, a cryptographic protocol information storage unit 13, and a security configuration information storage unit 14.

The user apparatus 20 is provided with a database usage application 21, application response unit 22, key usage unit 23, a key information storage unit 24, a security configuration information temporary storage unit 25, security configuration unit 26, and an input/output device 27. There is no particular limitation, but the user apparatus 20 is implemented, for example, in a data processing unit (CPU, processor) provided with a function for realizing a communication connection to the database apparatus 10 by being connected to the network 30. In this case, the database usage application 21 is an application program that operates in the data processing unit. Also, while there is no particular limitation, the application response unit 22, the key usage unit 23, and the security configuration unit 26 may be implemented by a program (control program, or the like) that operates in the data processing unit. Or, in a case of implementation in a thin client system or the like, it is possible to introduce virtualization technology in a server, to implement the user apparatus in a virtual machine in the server, and to perform input from a thin client terminal to the database usage application in the virtual machine in the server.

It is to be noted that in FIG. 1, respective unit configuring the user apparatus 20 are disposed within one block, but a configuration is also possible where, for example, these are installed separately via a communication network such as a local area network or the like. Similarly, in the database apparatus 10, the database 11 and the database control unit 12 are disposed within one block, but clearly they may also be disposed separately.

In order to simplify the description, FIG. 1 shows an example in which one user apparatus 20 is provided, but clearly it is possible to have a plurality of user apparatuses 20 connected via the network 30 to the database apparatus 10. In addition, a configuration is possible in which one application response unit 22 connected for communication to the database apparatus 10 is commonly provided for the plurality of user apparatuses 20. In this case, each of the plurality of user apparatuses 20 is configured to be provided with the key usage unit 23 and the key information storage unit 24 for each user, the key information being stored and managed on the user side, and the security configuration unit 26 is also provided, and with the configuration being connected to the database apparatus 10 via the common application response unit 22. The security configuration information temporary storage unit 25 may be arranged to be integrated in one storage device (system) for the plurality of user apparatuses 20, or may be dispersed among the individual user apparatuses 20.

<Database Apparatus>

Next, a description is given of an outline of elements of the database apparatus 10. The database control unit 12 is provided with a function to perform operations (database operations by a database operation command) on the database 11, and a function to execute cryptographic protocols.

The security configuration information storage unit 14 stores and holds, as information for security configuration of data stored within the database 11, information of an encryption algorithm used in encryption, for example. The security configuration information storage unit 14, for example, stores and holds:

whether or not metadata including table name and column name stored in the database 11 is encrypted, whether or not data is encrypted, privacy level information representing security level of data, and encryption algorithm distinguishing information to distinguish an encryption algorithm when performing data encryption.

The cryptographic protocol information storage unit 13 stores cryptographic protocol information for encrypting data of the database 11. For example, the following is stored and held:

processing content (simple matching, addition, and the like) of database operation commands, and distinguishing information for an encryption algorithm corresponding to the security level (privacy level) required for the data, and distinguishing information for a cryptographic protocol.

The cryptographic protocol information storage unit 13 stores information for selecting an additive homomorphic encryption algorithm, in accordance with the relevant processing content, for addition computational processing of ciphertext data as it is, within the database 11.

The database control unit 12 receives a database operation command (a database operation in plaintext) transmitted by the application response unit 22, or a cryptographic protocol execution instruction, executes the database operation with plaintext data or the cryptographic protocol, and transmits a processing result to the application response unit 22. The database control unit 12 may be implemented as a database server with the user apparatus (10) as a client.

<User Apparatus>

Next, a description is given of an outline of respective elements of the database apparatus 20. The database usage application 21 issues a database operation command. It is to be noted that while there is no particular limitation, the database usage application 21 is formed of an application program that issues a database operation command (SQL (Structural Query Language) command) for executing a database operation. Or, the database usage application 21 may be implemented as a GUI (Graphical User Interface) environment that performs operations such as table defining, data addition, retrieval, computation and the like, on screen, via the application response unit 22 with respect to the database control unit 12 of the database apparatus 10. In this case, an operation selected by the user on screen is converted to a corresponding SQL command and inputted to the application response unit 22. The database usage application 21 can use an existing application as it is. This does not indicate that the database usage application 21 must not be newly developed, but, with regard to newly developing or restructuring or re-versioning the database usage application 21, indicates that configuration of information for data encryption, decryption, and data security configuration, need not be performed by the relevant database usage application 21.

The security configuration unit 26 performs configuration of information for data security.

The key usage unit 23 refers to the key information storage unit to generate a key necessary for execution of respective cryptographic protocols such as data encryption and decryption.

An input/output device 27 includes an input device such as a keyboard, a mouse, a touch panel or the like, and an output device such as a display device or a file device (printer), and performs information input from a user of the database, or outputs or displays output information. It is to be noted that FIG. 1 shows an input/output device 27 which includes an input/output integrated device such as a touch panel or tablet display, or a device in which input and output are separate.

The security configuration information temporary storage unit 25 stores information stored in the security configuration information storage unit 14, and information for identifying data to be operated on. For example, in a case concerning metadata (for example, table name, column name, etc.) which is information that identifies data within the database 11, where the relevant metadata is encrypted:

encrypted metadata, and decrypted metadata (plaintext metadata)

are associated to be stored and held.

When a database operation command is inputted from the database usage application 21, the application response unit 22 refers to the security configuration information temporary storage unit 25, the security configuration information storage unit 14, and the cryptographic protocol information storage unit 13, and cooperates with the database control unit 12 and the key usage unit 23 to execute:

replacing metadata such as table name, column names, etc., with ciphertext metadata, a cryptographic protocol in accordance with content (processing content) of a database operation, or a normal database operation.

For example, in a case where a database operation command inputted by the database usage application 21 is newly created and a need is generated to dynamically configure or modify the data security, the application response unit 22 calls the security configuration unit 26, and after performing configuration of the security configuration information, creates a table within the database 11 through the database control unit 12.

In this regard, the security configuration unit 26 may make a screen display recommending input of the security configuration information to the user. With regard to input of the security configuration information when creating a new table, various mode types are possible besides that described above. For example, before the database operation command being issued by the database usage application 21, security configuration information, such as whether or not the newly created table name in question is encrypted, may be configured in advance by the security configuration unit 26. Or, with respect to a table newly created in the database 11, privacy level and cryptographic protocol distinguishing information (default information) may be configured for a template of a table name in which a part of the table name is replaced by a wild card or the like, and in a case where the newly created table matches the table name including the wild card, encryption may be performed by a cryptographic protocol corresponding to the default privacy level.

Where it is necessary to encrypt the data to be operated on by the database operation command inputted from the database usage application 21, the application response unit 22 performs data encryption. In this regard, the application response unit 22 performs encryption using the key information and transmits to the database control unit 12. The application response unit 22 returns a database operation result (processing result) returned by the database control unit 12 to the database usage application 21. While there is no particularly limitation here, the database usage application 21 outputs a database operation result to the input/output device 27.

<Operation Overview>

An overview is given of an operation example of the system shown in FIG. 1. In a case where a database operation command inputted by the database usage application 21 and forwarded via the application response unit 22 is an operation for which there is a cryptographic protocol that can process ciphertext as it is, such as a query or the like, the database control unit 12 performs the processing (query) with ciphertext as it is. The database control unit 12 returns a result of processing the ciphertext within the database 11 to the application response unit 22 as ciphertext. The application response unit 22 receives a result in which the ciphertext is decrypted to plaintext by the key usage unit 23, and returns a plaintext database operation result to the database usage application 21.

In a case where a database operation command inputted by the database usage application 21 is an operation in which processing in the database with ciphertext as it is, is difficult (for example, complex arithmetic operations such as addition, subtraction, multiplication, division, or logical operations), the database control unit 12 extracts the data to be operated on as ciphertext from the database 11, and transmits it to the application response unit 22 without performing a computational operation. The application response unit 22 decrypts the encrypted data transmitted by the database control unit 12 using a key for decryption of the key usage unit 23, performs an operation specified by the database operation command on the obtained plaintext, and returns an operation result to the database usage application 21.

In a case where in complex arithmetic operations such as plaintext arithmetic, part of the arithmetic operation can be processed as ciphertext, the database control unit 12 returns an arithmetic result (ciphertext) obtained by performing the partial arithmetic operation with ciphertext, to the application response unit 22. In the application response unit 22, the arithmetic result with ciphertext may be decrypted to plaintext by the key usage unit 23, and the remainder of the complex arithmetic operation may be performed with plaintext. By so doing, processing is more efficient that in a case where complex arithmetic operations are performed after decrypting all data items.

By referring to the security configuration information storage unit 14, for a database operation command inputted by the database usage application 21, the application response unit 22 confirms whether or not protection by encryption is necessary (whether or not encryption is necessary) for data within the database 11 that is a target of operation by the inputted database operation command. Where encryption is not necessary, processing similar to a normal database operation is performed. By referring to the security configuration information temporary storage unit 25, in a case where metadata (for example, table name or column name in SQL) of data which is a target of operation by the database operation command inputted from the database usage application 21, is encrypted, the application response unit 22 can identify data that is to be operated on.

As described above, according to the present exemplary embodiment, by referring to the security configuration information for the inputted database operation command, the application response unit 22 can determine processing according to the level of security required in the database 11 that is to be operated on. Thus, efficient processing is possible for data with low required security by using an encryption algorithm that is relatively fast but has low security.

According to the present exemplary embodiment, since, among data recorded in the database 11, data for which security is required is encrypted, it is possible to prevent information leakage of the data in question. By cooperation with the application response unit 22, a response is possible to an arbitrary inputted database operation command.

Figure 2:
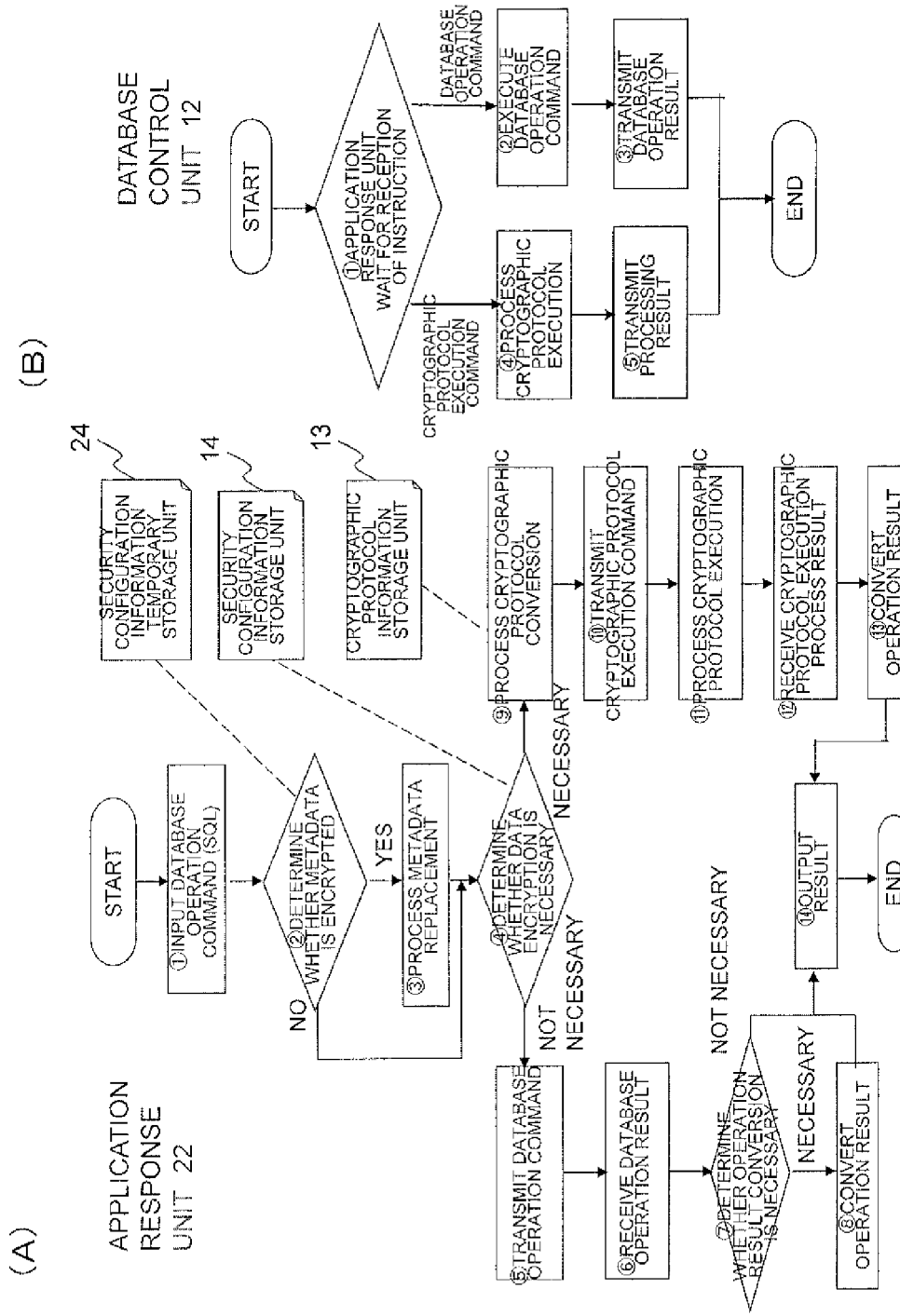
FIG. 2 is a diagram showing an overall operational example of an exemplary embodiment of the present invention.

(A) and (B) of FIG. 2 are each flowcharts for describing processing operations of the application response unit 22 and the database control unit 12 in the present exemplary embodiment, <Operation of Application Response Unit>

A description is given of processing operations of the application response unit 22. Referring to (A) of FIG. 2, the application response unit 22 executes the following steps.

Step 1: A database operation command (SQL) is inputted from the database usage application 21.

Step 2: By referring to the security configuration information temporary storage unit 25, a determination is made concerning encryption/non-encryption of metadata such as a table name or column name specified as targets of operation by the database operation command.

Step 3: In a case where the metadata such as a table name or column name is encrypted and stored in the database, replacement processing is performed to replace with ciphertext the metadata specified as a target of operation by the database operation command.

Step 4: Referring to the security configuration information storage unit 14, a determination is made as to whether or not encryption is necessary for data specified as a target of operation by the database operation command.

Step 5: In a case where data encryption is not necessary, the database operation command is transmitted to the database control unit 12.

Step 6: A database operation result is received from the database control unit 12.

Step 7: A determination is made as to whether conversion of the database operation result is necessary. The determination of Step 7 is performed because the operation result from the database control unit 12 may be returned as ciphertext.

Step 8: In a case where conversion (or decryption) of the database operation result is necessary, conversion is performed using a decryption key of the key usage unit 23. The conversion processing (decryption) performs conversion using the decryption key of the key usage unit 23, or conversion referring to the decrypted table name or the decrypted column name of the security configuration information temporary storage unit 25, to be described later.

Step 14: An operation result (or a conversion result) is outputted to the database usage application 21.

On the other hand, in a case where the data encryption of Step 4 is necessary, the application response unit 22 performs the following processing.

Step 9: Referring to the cryptographic protocol information storage unit 13, encryption processing is performed by the relevant encryption algorithm.

Step 10: The application response unit 22 transmits a cryptographic protocol execution instruction (request for cryptographic protocol process execution) to the database control unit 12.

Step 11: The cryptographic protocol is executed by the database control unit 12.

Step 12: An execution result of the cryptographic protocol is received from the database control unit 12.

In Steps 11 and 12, the application response unit 22 may decrypt a ciphertext computation result from the database control unit 12 to give plaintext, and perform execution by cooperatively performing a partial computation with plaintext and encrypting the partial computation result to be transmitted to the database control unit 12 to perform a computation with ciphertext by the database control unit 12.

Step 13: Conversion processing decrypting the execution result of the cryptographic protocol is performed using the key information of the key usage unit 23. For the execution result of the cryptographic protocol, conversion processing is performed by decryption using the key information of the key usage unit 23, or decryption making reference to a decrypted table name and decrypted column name of the security configuration information temporary storage unit 25.

Step 14: The conversion result is outputted to the database usage application 21.

<Operation of the Database Control Unit>

Referring to (B) of FIG. 2, the following occurs in the database control unit 12:

Step 1: The database control unit 12 waits to receive an instruction from the application response unit 22.

Step 2: When a database operation command is received from the application response unit 22, the database operation command is executed.

Step 3: The database operation result is returned to the application response unit 22.

Step 4: When a cryptographic protocol processing request is received from the application response unit 22, the cryptographic protocol is executed (corresponding to Step 11 in FIG. 2 (A)).

Step 5: The cryptographic protocol execution processing result is returned to the application response unit 22.

<Operational Effect of Exemplary Embodiment>

As shown in FIG. 2, by cooperation between the database control unit 12 and the application response unit 22, information leakage in the database apparatus 10 is prevented, and handling of arbitrary database operations and efficient process execution are realized.

In the user apparatus 20, management of the key information for encryption and decryption is performed, data encrypted in the database 11 is forwarded to the user apparatus 20, and decryption processing is performed on the user apparatus 11 side. As a result, an increase in the probability of information leakage in the database apparatus 10 is curtailed.

The security configuration information storage unit 14 is provided to store information as to whether or not data in the database 11 is encrypted and information of required security level, and when a database operation command is inputted, the application response unit 22 refers to the security configuration information storage unit 14, determines whether or not encryption of data that is an operation target is necessary, and if the data encryption is not necessary (a case of normal database operation), does not perform encryption processing (Steps 5 and 6 in (A) of FIG. 2). In this way, by excluding data for which privacy is not required, from being a target of encryption, it is possible to curtail effects on processing performance that arise when all database operations are encrypted.

With regard to metadata (for example, in SQL, table name or column name) for identifying data in the database, information corresponding to encrypted metadata and decrypted metadata is held in the user apparatus 20. Accordingly, even if the metadata is encrypted in the database 11, it is possible to easily identify data that is a target of operation. Effects on processing performance due to encryption of the metadata can be avoided.

<Configuration of Database Control Unit>

Figure 3:
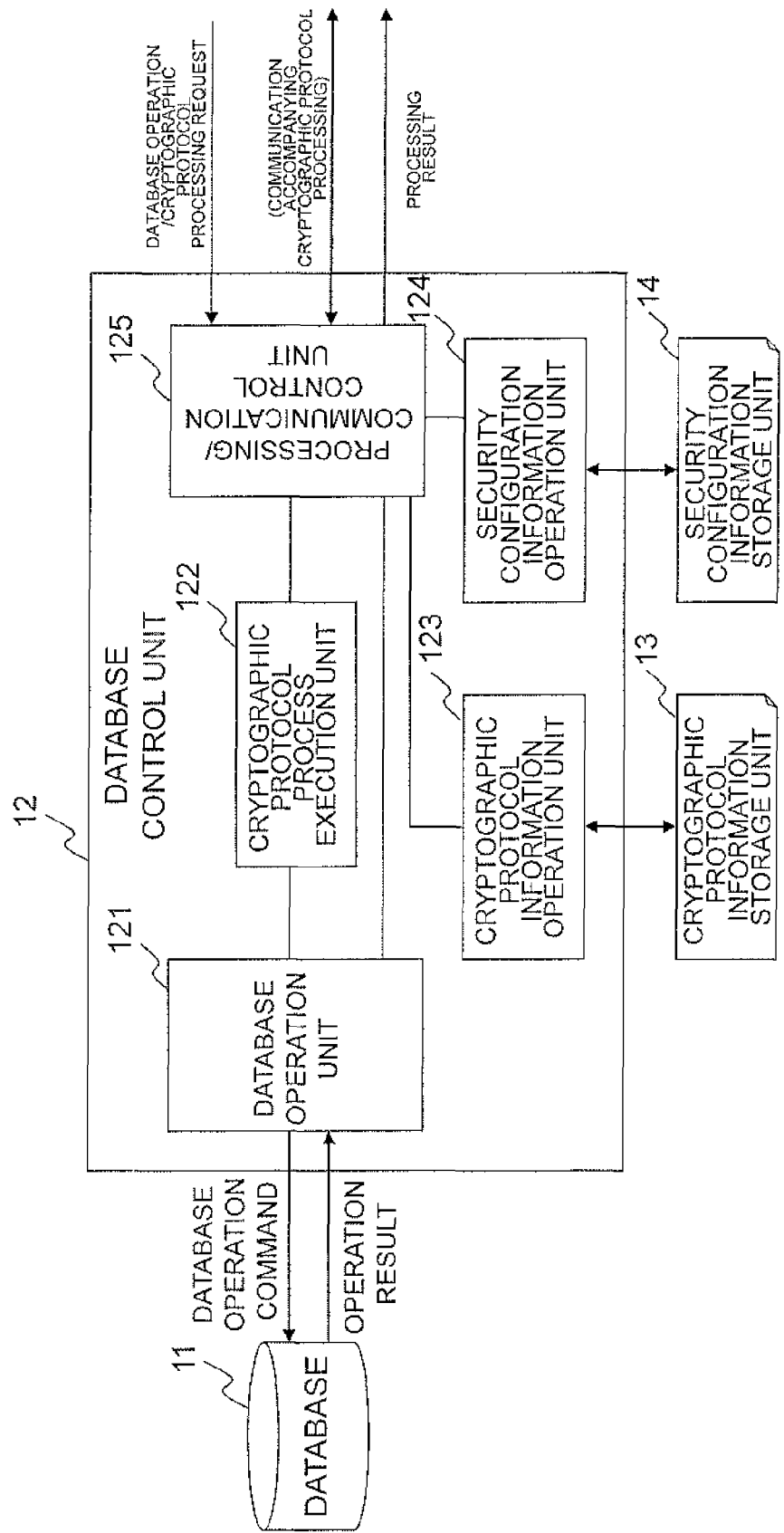
FIG. 3 is a diagram showing an example of a configuration of a database control unit in an exemplary embodiment of the present invention.

Next, a detailed description is given concerning the above-mentioned database control unit 12. FIG. 3 is a diagram showing an example of a configuration of the database control unit 12 of FIG. 1. Referring to FIG. 3, the database control unit 12 is provided with a database operation unit 121, a cryptographic protocol process execution unit 122, a processing/communication control unit 125, a cryptographic protocol information operation unit 123, and a security configuration information operation unit 124.

The cryptographic protocol process execution unit 122 executes retrieval, addition, and the like, of the encrypted database 11.

The database operation unit 121 executes database operations (table creation, data addition or deletion, data retrieval, data computation, and the like) on the database 11. In a case of the processing/communication control unit 125 receiving a database operation command to perform storing, adding, deleting, or updating, with regard to the database 11 in plaintext from the application response unit 22, the plaintext data is forwarded as it is, from the processing/communication control unit 125 to the database operation unit 121, and the database operation unit 121 performs a database operation with plaintext data.

It is to be noted that the cryptographic protocol process execution unit 122 performs operations on data in an encrypted state as it is, but access to the database 11 is performed via the database operation unit 121. For example, regarding a command in a case of obtaining columns B and C from table A within the database 11: an SQL query

SELECT B, C FROM A where columns B and C in table A in the database 11 are encrypted, the database operation unit 121 performs retrieval processing with columns B and C in an encrypted state without change, and returns a retrieval result to the cryptographic protocol process execution unit 122.

The processing/communication control unit 125 performs communication with the application response unit 22 via the network 30, and control of respective units within the database control unit 12.

The cryptographic protocol information operation unit 123 performs reading and writing of cryptographic protocol information with respect to the cryptographic protocol information storage unit 12. The cryptographic protocol information operation unit 123 accesses the cryptographic protocol information storage unit 13 with respect to an access request (read request) to the cryptographic protocol information storage unit 13 from the application response unit 22, and returns the read cryptographic protocol information to the application response unit 22 via the processing/communication control unit 125.

The security configuration information operation unit 124 performs reading of security configuration information from the security configuration information storage unit 14 and writing to the security configuration information storage unit 14. The security configuration information operation unit 124 accesses the security configuration information storage unit 14 with respect to an access request (read request) to the security configuration information storage unit 14 from the application response unit 22, and returns the security configuration information read from the security configuration information storage unit 14 to the application response unit 22 via the processing/communication control unit 125.

<First Modified Example of Database Control Unit>

Figure 4:
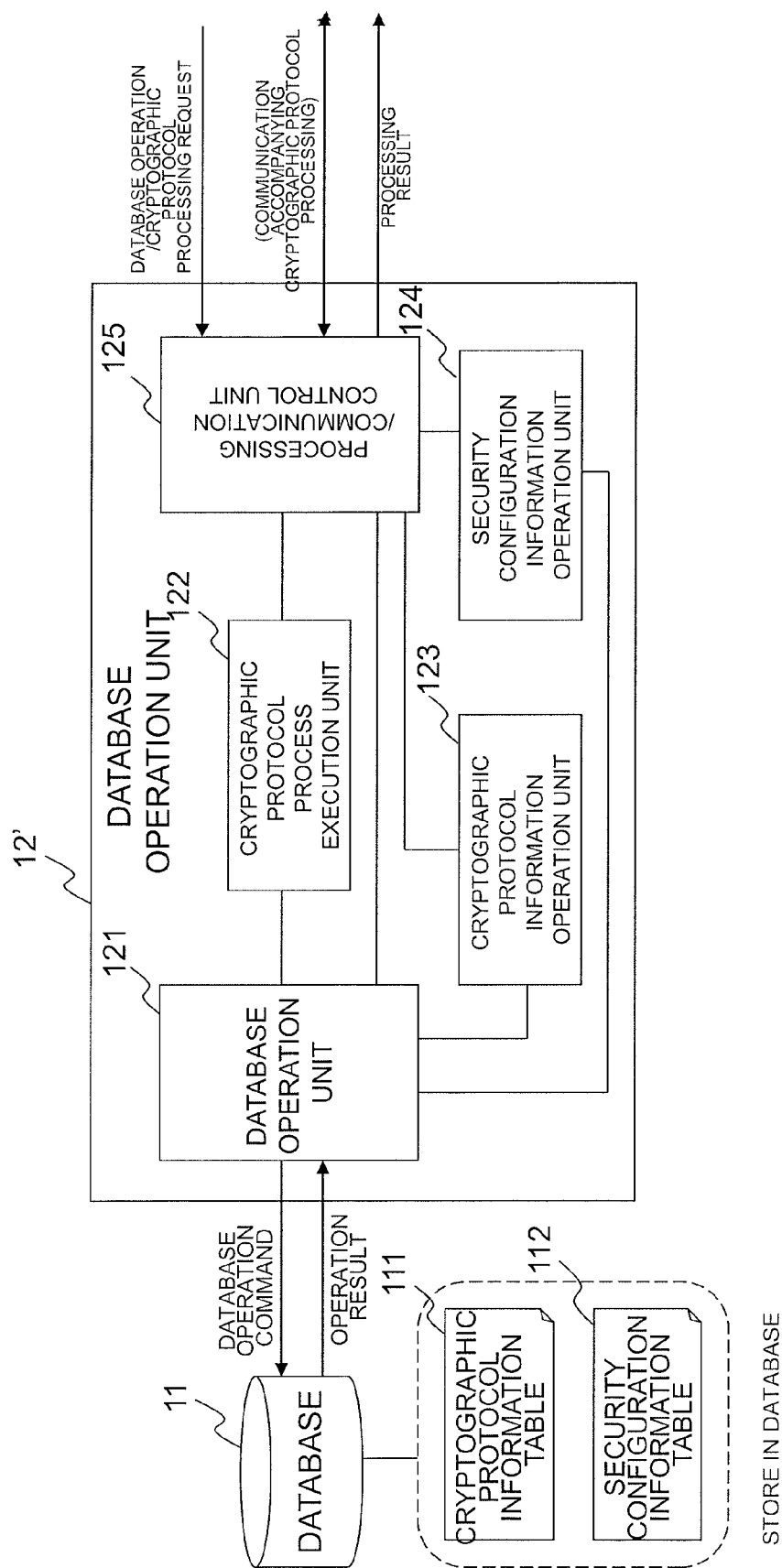
FIG. 4 is a diagram showing another example of a configuration of a database control unit in an exemplary embodiment of the present invention.

FIG. 4 is a diagram showing a modified example of FIG. 3. In the example shown in FIG. 4, cryptographic protocol information and security configuration information are stored within the database 11, as a cryptographic protocol information table 111, and a security configuration information table 112. By issuing a database operation command (an SQL command specifying a table name as a cryptographic protocol information table) to the database operation unit 121, the cryptographic protocol information operation unit 123 of FIG. 4 accesses information of the cryptographic protocol information table 111 within the database 11. Similarly, the security configuration information operation unit 124 accesses information of the security configuration information table 112 within the database 11 via the database operation unit 121.

<Second Modified Example of Database Control Unit>

Figure 26:
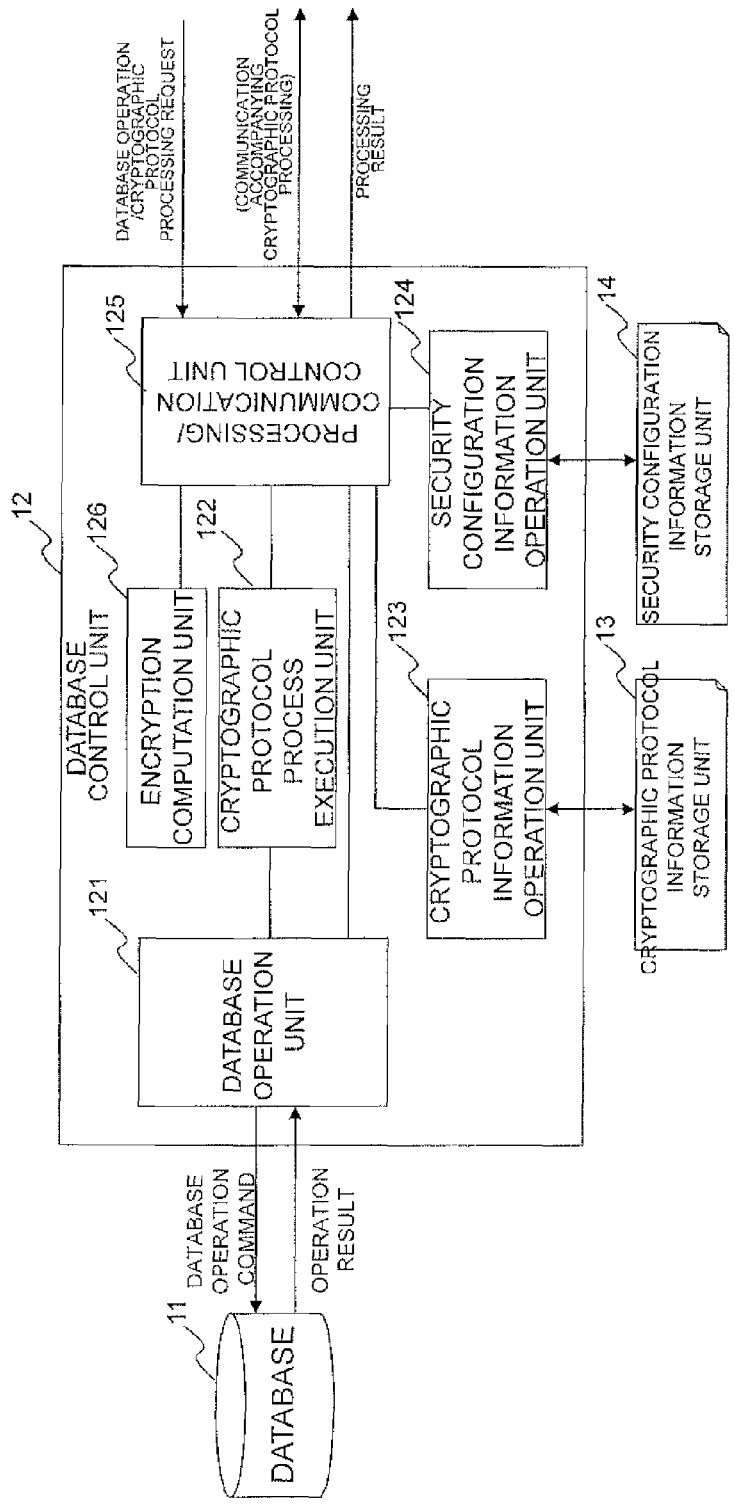
FIG. 26 is a diagram showing a configuration example of database control unit in an exemplary embodiment of the present invention.

FIG. 26 is a diagram showing a further configuration example of the database control unit 12 of FIG. 1. Referring to FIG. 26, the database control unit 12 is provided with the database control unit 121, the cryptographic protocol process execution unit 122, the processing/communication control unit 125, the cryptographic protocol information operation unit 123, the security configuration information operation unit 124, and an encryption computation unit 126. There is a difference from FIG. 3 in that the encryption computation unit 126 is provided. The database operation unit 121, the cryptographic protocol process execution unit 122, the processing/communication control unit 125, the cryptographic protocol information operation unit 123, and the security configuration information operation unit 124 are similar to those in FIG. 3, and a description thereof is omitted.

In a case where an encryption algorithm relates to public key encryption, the application response unit 22 transmits the public key used in encryption to the database control unit 12, and encryption is performed by the encryption computation unit 126 of the database control unit 12. In a case where data stored in the database 11, for example, is encrypted and stored, in the configuration of FIG. 3 the data to be encrypted must be sent from the database apparatus 10 side to the user apparatus 20 side to be encrypted on the user apparatus 20 side, and the encrypted data must be transmitted from the user apparatus 20 to the database apparatus 10. According to the configuration of FIG. 26, when the data stored in the database 11 is encrypted and stored, the data to be encrypted is encrypted by the encryption computation unit 126. Accordingly, transmission from the database apparatus 10 side to the user apparatus 20 side is not necessary. As a result, an effect of curtailing an increase in communication volume between the database apparatus 10 and the user apparatus 20 can be expected.

<Third Modified Example of Database Control Unit>

Figure 27:
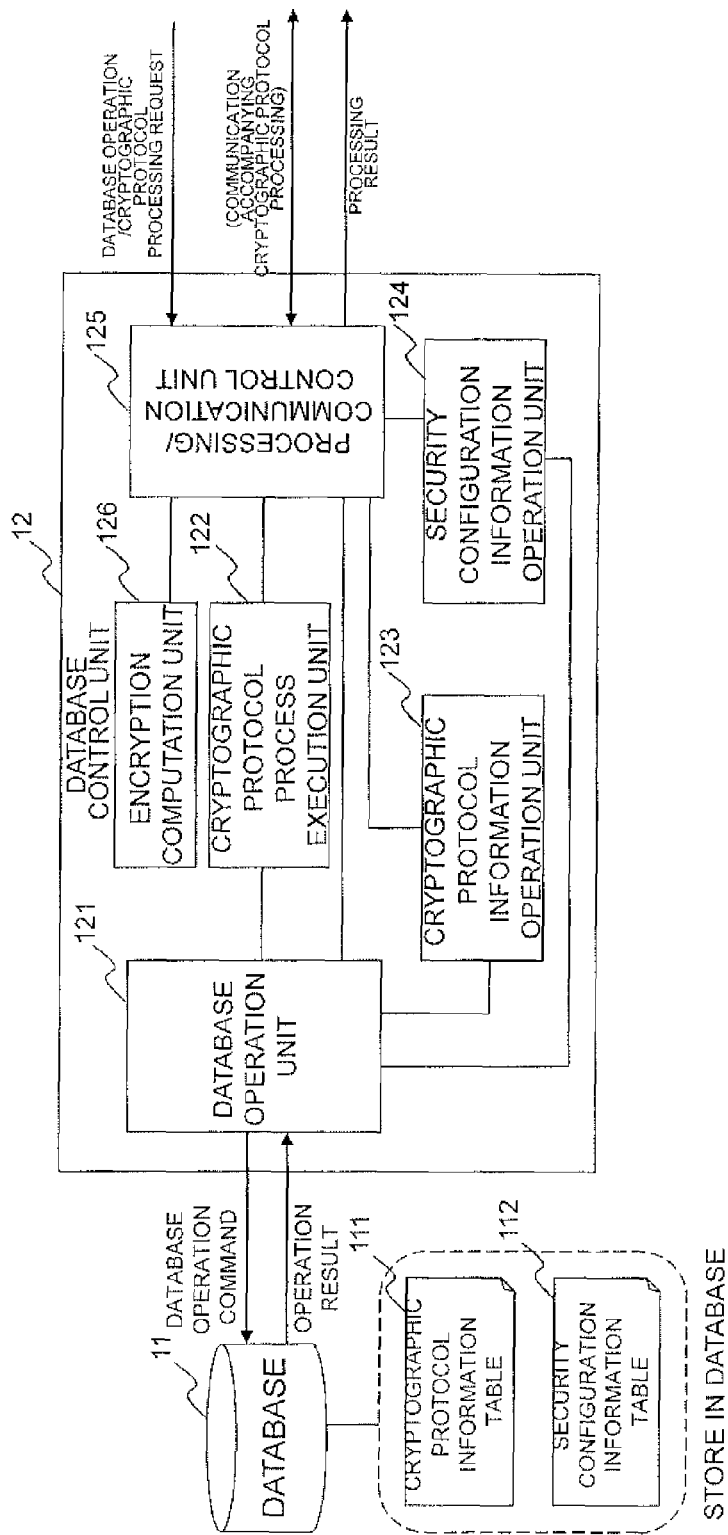
FIG. 27 is a diagram showing another example of a configuration of database control unit in an exemplary embodiment of the present invention.

FIG. 27 is a diagram showing another example of a configuration of the database control unit 12 of FIG. 1. Referring to FIG. 27, the present exemplary embodiment is provided with the cryptographic protocol information table 111 and the security configuration information table 112 within the database 11, similar to FIG. 4, with respect to the configuration of FIG. 26. The encryption computation unit 126 is similar to that of FIG. 26, and a description thereof is omitted.

<Example of Cryptographic protocol Information Storage Unit>

FIG. 5 is a diagram for describing an example of the cryptographic protocol information storage unit 13 of FIG. 1. In FIG. 5, a processing content identifier relates to information for identifying processing content of a database operation. While there is no particular limitation here, in FIG. 5, identifying codes for database operations such as "simple match" (simple check of whether there is a match with a specified character string), "addition," and the like, are configured.

Security level indicates the degree of security (privacy) of data, and while there is no particular limitation, example has configurations of any of "high," "medium," or "low." The privacy level may also be made a numerical value.

The encryption algorithm identifier represents an encryption algorithm used in encryption of data. The cryptographic protocol identifier maintains privacy regarding respective information of processing content identifier, privacy level, and encryption algorithm identifier, and stores an identifier of an executable cryptographic protocol.

When the privacy level is "medium" in a case of performing "simple match" processing on data encrypted by an encryption algorithm of "SE1," for example, a cryptographic protocol of "SE1_SS_M" of the third row of FIG. 5 is executed by the cryptographic protocol process execution unit 122 of the database control unit 12. SS (simple search) in "SE1_SS_M" represents a simple match, and M indicates that the privacy level is middle (medium).

The cryptographic protocol information operation unit 123 reads a cryptographic protocol identifier from the cryptographic protocol information storage unit 13, and by decoding the processing content identifier, the privacy level, and the encryption algorithm identifier, the processing content, the privacy level and the encryption algorithm of the data are derived.

It is to be noted that AES (Advance Encryption Standard) is a common key encryption scheme specified as a new standard in the United States. HE1 indicates Homomorphic Encryption (HE) (in this case, additive homomorphic encryption, Paillier encryption). SE1 indicates Searchable Encryption (SE) of a public key scheme.

It is to be noted that, as shown in FIG. 5, even if processing content involves the same addition, the encryption algorithm AES that is not homomorphic encryption (where additive computations of ciphertext as it is, are not possible) may be set. In this case, ciphertext of the database 11 is transmitted to the application response unit 22, and in the application response unit 22 the text is decrypted by the encryption algorithm AES with the key usage unit 23, and an additive computation is performed on the data as plaintext.

<Example of Security Configuration Information Storage Unit>

FIG. 6 is a diagram showing an example of the security configuration information storage unit 14. Referring to FIG. 6, the security configuration information storage unit 14 includes sections of: table name created in the database 11, whether or not the table name is encrypted (table name encrypted?), column name, whether or not the column name is encrypted (column name encrypted?), whether or not column data is encrypted (column data encrypted?), column data privacy level, and encryption algorithm identifier used in encryption of the column data (column data encryption algorithm identifier).

In the security configuration information storage unit 14 of FIG. 6, the table name of "employee listing" in the first row, for example, is not encrypted, the column name "work location" is not encrypted, the column data is encrypted, the security level of the column data is "medium," and the encryption algorithm identifier is "SE1." With regard to the table name of "employee listing," in the third row the column name is encrypted, the column data is encrypted, the privacy level of the column data is "high," and the encryption algorithm identifier is "AES." The table name in the fourth row is encrypted, and the column name and column data are not encrypted (NULL is configured in the relevant section). On the other hand, the table name of the fifth row is not encrypted, the column name is encrypted, and the column data is not encrypted.

Encryption of metadata such as the table name, column name, and the like, may be done by a similar encryption algorithm to the encryption algorithm that encrypts the column data. In the security configuration information storage unit 14, the table name, column name, and column data encrypted by the same encryption algorithm are associated with each other and form one entry. Or, the encryption algorithm used in encrypting the table name and column name may be a different encryption algorithm from the encryption algorithm used in encrypting the column data. Or, the encryption algorithm used in encrypting the table name and column name may be a specified encryption algorithm commonly decided for a plurality of table names and column names.

The security configuration information storage unit 14, for example, holds security configuration information related to all tables recorded in the database 11. It is to be noted that configuration content of respective sections of the security configuration information storage unit 14 is based on information configured by the user (administrator of the user apparatus 20), with respect to the security configuration unit 26 of the user apparatus 20.

<Example of Table in Database>

FIG. 7 is a diagram for describing table information within the database 11. As in the column "work location" in the security configuration information storage unit 14 shown in FIG. 6 mentioned above, data may be encrypted by a plurality of encryption algorithms. Accordingly, a main body of ciphertext encrypted by a plurality of encryption algorithms is managed by another table.

For the table name, column name and encryption algorithm, a ciphertext table information listing of (B) of FIG. 7 associates and holds:
name of a ciphertext table (ciphertext table name) that is a table storing the ciphertext main body,
encryption algorithm, and
parameter (parameter given to the encryption algorithm).

As a parameter of the encryption algorithm, the encryption algorithm SE1 (Searchable Encryption: public key) in (B) of FIG. 7 has a security parameter used in a key generation algorithm (that outputs a public key and a private key). Parameters of the encryption algorithm AES, may be key length, plaintext block length, round number, or the like (in (B) of FIG. 7 parameters are not configured. In this case, default values are used.)

For the table name "employee listing" of the first row of the ciphertext table information listing in (B) of FIG. 7:
the column name is "work location,"
the encryption algorithm is "AES,"
the parameter is "Null," and
the ciphertext table name is "ciphertext_AES_1."

For the table name "employee listing" of the second row of the ciphertext table information listing in (B) of FIG. 7:
the column name is "work location,"
the encryption algorithm is "SE1,"
the parameter is "0x16a . . . " (0x indicates a hexadecimal representation),
the ciphertext table name is "ciphertext_SE1_1."
Listings where the ciphertext table name is "ciphertext_AES_1" and "ciphertext_SE1_1" are shown in (D) and (E) of FIG. 7 respectively.

A serial number is stored as plaintext in a column of a listing (employee listing in (A) of FIG. 7) in which plaintext before encryption is stored. Serial numbers as in 1, 2, . . . are attached to "Head Office," "Tamagawa" etc. of the column "work location" of the table "employee listing" in (A) of FIG. 7.

As shown in (C) of FIG. 7, in the employee listing after encryption, the column name "company position" is encrypted as "0xa638 . . . ," and the serial numbers for the column name "work location" and the column name "0xa638 . . . " correspond to IDs indicating encrypted content.

In the ciphertext_AES_1 listing that is encrypted by the encryption algorithm AES in (D) of FIG. 7, ciphertexts "0x3d8 . . . " and "0x962 . . . " for ID=1 and 2 are ciphertexts of data for serial numbers ID=1 and 2, with respect to "0xa638 . . . " obtained by performing AES encryption on the column name "work location" (encrypted data of "Head Office" and "Tamagawa" in (A) of FIG. 7).

In the ciphertext_AES_2 listing that is encrypted by the encryption algorithm AES in (E) of FIG. 7, ciphertexts "0x61b . . . " and "0xa53 . . . " for ID=1 and 2 are ciphertexts of data for serial numbers ID=1 and 2, with respect to "0xa638 . . . " obtained by encrypting the column name "company position" (encrypted data of "section chief" and "principal" in (A) of FIG. 7).

In the ciphertext_SE1_1 listing that is encrypted by the encryption algorithm SE1 in (F) of FIG. 7, ciphertexts "0x8ec . . . " and "0xA7c0 . . . " for ID=1 and 2 are ciphertexts of data for serial numbers ID=1 and 2, with respect to "0xa638 . . . " obtained by encrypting the column name "company position" (encrypted data of "section chief" and "principal" in (A) of FIG. 7).

As described above, with regard to the data "Head Office" and "Tamagawa" of the column name "work location" of the employee listing in (A) of FIG. 7, after encryption, serial numbers ID=1, 2, . . . are respectively attached to the section "work location," as shown in (C) of FIG. 7. The ciphertext table storing the encrypted data is stored in the database 11 in a format shown in (D) to (F) of FIG. 7, namely, in a format that stores ciphertexts corresponding respectively to the serial numbers 1, 2, . . . .

Thus, in the present exemplary embodiment:
information for identifying a table storing the ciphertext main body, and
encryption algorithm parameters
are managed by the ciphertext table information listing ((B) of FIG. 7). The ciphertext table information listing ((B) of FIG. 7) may be stored within the security configuration information storage unit 14. Or, the ciphertext table information listing ((B) of FIG. 7) may be managed by a storage unit other than the security configuration information storage unit 14.

<Configuration Example of Application Response Unit>

Figure 8:
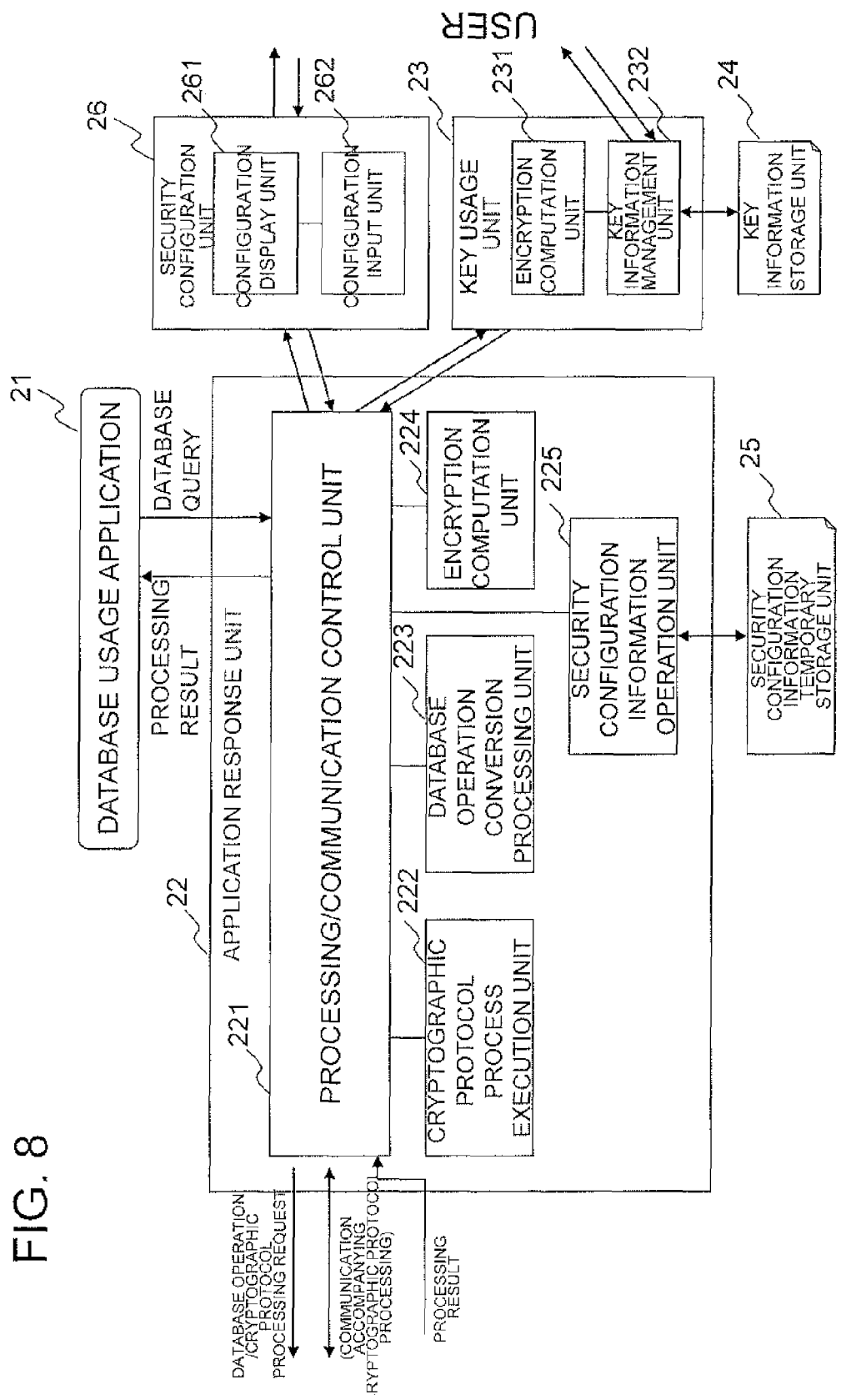
FIG. 8 is a diagram showing an example of a configuration of an application response unit in an exemplary embodiment of the present invention.

FIG. 8 is a diagram showing a configuration example of the application response unit 22, the security configuration unit 26, and the key usage unit 23 of FIG. 1. Referring to FIG. 8, the application response unit 22 is provided with a processing/communication control unit 221, a cryptographic protocol process execution unit 222, a database operation conversion processing unit 223, an encryption computation unit 224, and a security configuration information operation unit 225.

The security configuration unit 26 is provided with a configuration display unit 261 and a configuration input unit 262. The configuration display unit 261 and the configuration input unit 262 perform output and input with respect to the input/output device 27 of FIG. 1. Specifically, display of an operation screen (menu), menu selection, and input of input information are performed with respect to a display device forming the input/output device 27.

The key usage unit 23 is provided with an encryption computation unit 231 and a key information management unit 232.

The processing/communication control unit 221 performs communication with the database usage application 21, the security configuration unit 26, the key usage unit 23, and the database control unit 12 of the database apparatus 10, and performs control of respective units within the application response unit 22.

The encryption computation unit 224 performs encryption computation using information that is not private, among the key information, such as encryption computation by public key encryption, for example.

The database operation conversion processing unit 223 performs cryptographic protocol processing in accordance with the privacy level of data that is a target of operation, with respect to a database operation command inputted from the database usage application 21, or in a case of determining a normal database operation and performing encryption, performs conversion processing to a cryptographic protocol (corresponding to processing of Steps 4 and 9 in (A) of FIG. 2).

The database operation conversion processing unit 223 converts cryptographic protocol processing from the database control unit 12, or the processing result obtained by the normal database operation, to a processing result corresponding to the inputted normal database operation command (corresponding to processing of Steps 7, 8, and 13 in (A) of FIG. 2).

The cryptographic protocol process execution unit 222 executes a search of ciphertext as it is, in the database control unit 12 that accesses the database 11, or cryptographic protocol processing such as addition, multiplication or the like, according to processing content, by communicating with the database control unit 12 (corresponding to processing of Step 11 in (A) of FIG. 2).

The security configuration information operation unit 225 obtains information (including information as to whether or not metadata is encrypted) stored in the security configuration information storage unit 14 of the database apparatus 10, via the processing/communication control unit 221, and creates auxiliary information for identifying data that is a target of operation. The security configuration information operation unit 225 performs reading and writing of information with respect to the security configuration information temporary storage unit 25.

By holding (caching) information, which is held in the security configuration information storage unit 14 of the database apparatus 10, in the security configuration information temporary storage unit 25 of the user apparatus 20, queries (traffic) to the database apparatus 10 from the application response unit 22 are reduced, and processing by the application response unit 22 of the user apparatus 20 is speeded up.

In the security configuration unit 26, the configuration display unit 261 displays and outputs to the output device (27 in FIG. 1) security configuration information such as privacy level information configured for data stored in the database 11 via the application response unit 22. The configuration input unit 262 receives input information related to the privacy level information of the data via the input device 27, reflects the input configuration information in the security configuration information temporary storage unit 25, via the application response unit 22, and also reflects this in the security configuration information storage unit 14 of the database apparatus 10. In this regard, the input configuration information may be written at the same time to the security configuration information temporary storage unit 25 and the security configuration information storage unit 14, or may be written only to the security configuration information temporary storage unit 25, and thereafter written to the security configuration information storage unit 14.

In the key usage unit 23, the encryption computation unit 231 performs encryption computation such as decryption processing of ciphertext using the key information (private key) read via the key information management unit 232.

The key information management unit 232 reads the data that is a database operation target and key information corresponding to security configuration information thereof, from the key information storage unit 24 after obtaining authentication for a user (for example, a user of the database usage application 21, or a system administrator on the user apparatus side) who is an owner of the relevant key information. The key information management unit 232 writes the key information to the key information storage unit 24.

<Example of Security Configuration Information Temporary Storage Unit>

FIG. 9 is a diagram showing a schematic example of content of the security configuration information temporary storage unit 25 on the user apparatus 20 side of FIG. 1. In the security configuration information temporary storage unit 25, "decrypted table name" and "decrypted column name" are added as auxiliary information for identifying a database operation target, to content of the security configuration information storage unit 14 of the database apparatus 10 shown in FIG. 6. Other information is the same as content of the security configuration information storage unit 14 of FIG. 6.

With regard to the table name "employee listing" of FIG. 9, the encrypted column name "0xa638 . . . ," for example, indicates, from "decrypted column name," that the decrypted plaintext column name is "company position." This represents a correspondence relationship between the column "company position" in the table "employee listing" in (A) of FIG. 7 and the encrypted column name "0xa638 . . . " in (C) of FIG. 7.

In FIG. 9, in a case of executing a database query referring to "xx listing" within the database 11, for example, it is necessary to refer to the encrypted table name "0x30c8a4 . . . " in the database 11.

Where the table name "xx listing" is included in a database operation command inputted from the database usage application 21 (for example, an SQL command: select column name, from "xx listing"), the security configuration information operation unit 225 extracts an encrypted table name "0x30c8a4 . . . " corresponding to "xx listing" from the security configuration information temporary storage unit 25, and transmits a database operation command (select column name, from "0x30c8a4 . . . ") related to the encrypted table name "0x30c8a4 . . . ," via the cryptographic protocol process execution unit 222, and the processing/communication control unit 221, to the database control unit 12, via the processing/communication control unit 221.

<Example of Key Information Storage Unit>

FIG. 10 is a diagram showing an example of the key information storage unit 24. The key information storage unit 24 includes encryption algorithm identifiers and key information. In the example shown in FIG. 9, the key information used in encryption or decryption of data by the encryption algorithm "AES" is "0x51a4 . . . ." Key information of the encryption algorithm HE1, which is public key encryption, is "0xb316 . . . ," and the key information includes public key information used in encryption or homomorphic computation processing, and private key information used in decryption.

<Processing by Security Configuration Unit>

A detailed description is given below of processing procedures of the security configuration unit 26 described with reference to FIG. 1 and FIG. 8. In the user apparatus 20, the security configuration unit 26 configures security information related to data of the database 11.

Figure 11:
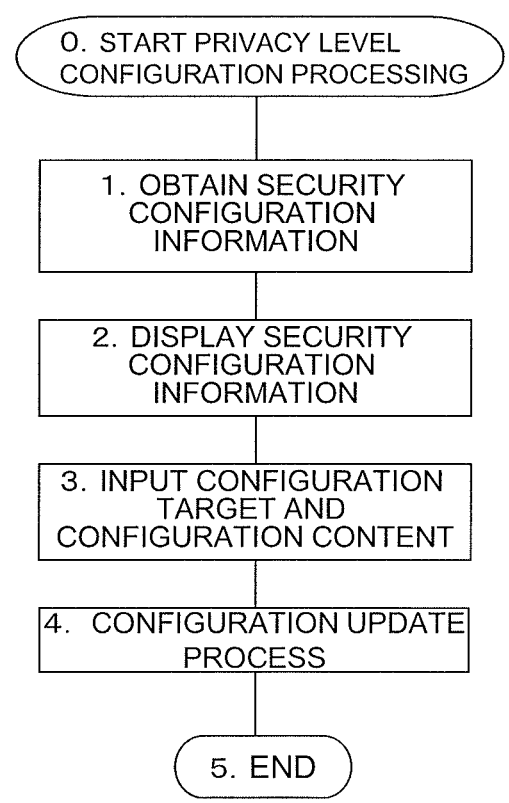
FIG. 11 is a flowchart showing process flow in a security configuration unit in an exemplary embodiment of the present invention.

FIG. 11 is a flowchart showing an example of processing procedures of the security configuration unit 26. An existing application is used, for example, as the database usage application 21. In the present exemplary embodiment, in order to avoid restructuring for an existing application, processing of configuring privacy level of data is implemented by inputting the privacy level by the security configuration unit 26. A description is given of processing flow of the security configuration unit 26, making reference to FIG. 11.

Step 1: Obtaining Security Configuration Information:

A request for current security configuration information of the database 11 is made to the application response unit 22 to obtain the security configuration information. The application response unit 22 refers to the security configuration information storage unit 14 of the database apparatus 10 or the security configuration information temporary storage unit 25 of the user apparatus 20, to obtain security configuration information relevant to data that is a target of a database operation, and return this information to the security configuration unit 26.

In a case where the security configuration information (see FIG. 9) is obtained from the security configuration information storage unit 14, the application response unit 22 creates a data format (see FIG. 6) for the security configuration information temporary storage unit 25 to be returned. That is, with regard to the security configuration information (see FIG. 6) obtained from the security configuration information storage unit 14, for a portion where metadata (table name and column name) is encrypted, the encrypted metadata is decrypted using the key usage unit 23, and plaintext metadata is created and returned to the security configuration unit 26. Or, with regard to the security configuration information (see FIG. 9) obtained from the security configuration information storage unit 14, for a portion where metadata (table name and column name) is encrypted, information (plaintext metadata) of the sections of the decrypted table name and column name is returned to the security configuration unit 26.

In obtaining the security configuration information in Step 1, it is also possible to selectively (partially) obtain and display in stages information related to a table name or information related to a specific table, rather than the entire database 11.

Step 2: Security Configuration Information Display:

The configuration display unit 261 of the security configuration unit 26 displays the security configuration information returned from the application response unit 22 in the input/output device 27.

Step 3: Configuration Target and Configuration Content Input:

The configuration input unit 262 of the security configuration unit 26 receives a configuration target (for example, table name, column name) and configuration content (for example, whether or not the table name is encrypted, whether or not the column name is encrypted, privacy level of column data), inputted by a user of the database from the input/output device 27.

Step 4: Configuration Updating Processing:

The configuration input unit 262 of the security configuration unit 26 transmits the inputted configuration target and configuration content to the application response unit 22 and requests a configuration change (update). The change in the security configuration is written to each of the security configuration information storage unit 14 and the security configuration information temporary storage unit 25 by the security configuration information operation unit 124 of the database control unit 12 and the security configuration information operation unit 225 of the application response unit 22.

It is to be noted that, with respect to execution timing of the processing procedures of the security configuration unit 26 shown in FIG. 11, in a case of newly creating a table in the database 11, the user may perform configuration in advance, before the database usage application 21 issues a database operation command. Or, when the database operation command is issued by the database usage application 21, in a case where the relevant table name is not recorded in the security configuration information storage unit 14 or the security configuration information temporary storage unit 25, the user may be prompted to input information such as table name and column name, whether or not the table name is encrypted, whether or not the column name is encrypted, the privacy level of the column data, and the like, by the security configuration unit 26 making a screen display. In a case of changing security configuration for a table or the like created in the database 11, the user changes the configuration via the security configuration unit 26. In this regard, in the security configuration unit 26, a GUI (Graphical User Interface) for the input/output device 27 is optional, but, for example, as an operation menu, a table list display command or the like may be selectively executed, all or some of the list of table names may be displayed on the screen (in a case where a table name is encrypted, reference is made to a decrypted table name in the security configuration information temporary storage unit 25, to display the plaintext table name), and the user may select the table in question and select a configuration operation, to update the configuration information.

<Configuration Update Processing (Change to Make Encrypted)>

Figure 12:
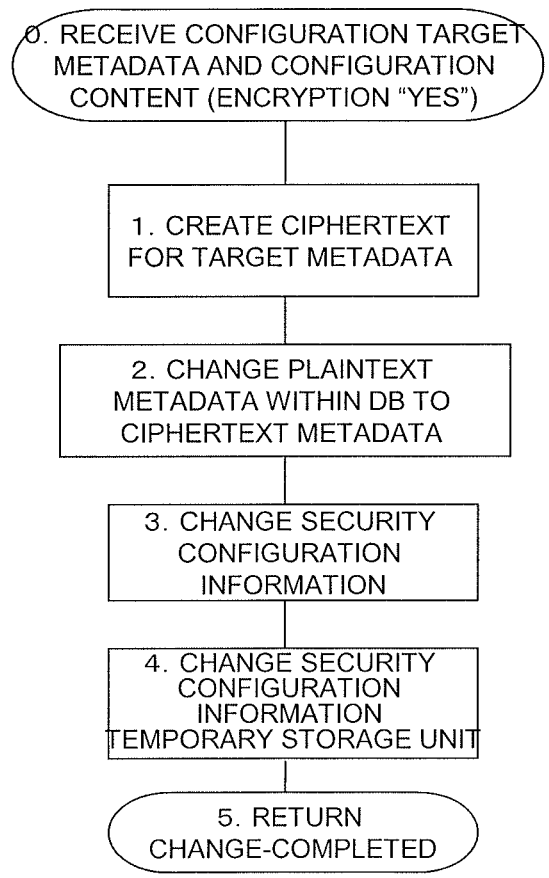
FIG. 12 is a flowchart describing configuration processing with encryption in configuration update processing of FIG. 11.

FIG. 12 is a flowchart describing detailed configuration update processing of Step 4 of FIG. 11. Here, a description is given concerning processing to configure metadata (table name, column name) so that encryption thereof is "yes." Here, the metadata in question (table name, column name) is configured with encryption being "no," in the security configuration information storage unit 14 and the security configuration information temporary storage unit 25.

Step 0: The security configuration unit 26 receives metadata (table name, column name) and configuration content (encryption "yes") for a configuration target, from the input/output device 27.

Step 1: Create Ciphertext of Target Metadata:

The application response unit 22 that receives a configuration update request from the security configuration unit 26 creates the ciphertext of the metadata (table name, and/or column name) that is a configuration target, using the key usage unit 23. The application response unit 22 refers to the security configuration information temporary storage unit 25 or the security configuration information storage unit 14, to obtain encryption algorithm information corresponding to the metadata in question, encrypts the metadata (table name and/or column name) by the encryption computation unit 231, and creates the encrypted metadata.

Step 2: Change Plaintext Metadata of Database to Ciphertext Metadata:

The application response unit 22 that receives the instruction to make a configuration change from the security configuration unit 26 makes a request to the database control unit 12 to replace the metadata that is the configuration target in the database 11, by ciphertext metadata created in Step 1 described above. The database control unit 12 replaces the plaintext metadata in the database 11 with the encrypted metadata. The present invention is not limited in any particular way by being implementation specific, and in a case of changing a table name to a ciphertext, for example, in the application response unit 22, for an SQL command of:

ALTER TABLE pre-change table RENAME TO post-change table name, an SQL text with post-change table name as ciphertext table name may be automatically generated and issued to the database operation unit 121 (FIG. 4) of the database control unit 12. In a case of changing a column name to a ciphertext, for example, for an SQL command of:

ALTER TABLE table name RENAME COLUMN pre-change column name TO post-change column name, an SQL text to have the post-change column name as the ciphertext column name may be automatically generated by the application response unit 22, and issued to the database operation unit 121 (FIG. 4).

Step 3: Change Security Configuration Information:

The application response unit 22 makes a request to the database control unit 12, with regard to the security configuration information storage unit 14 (see FIG. 6) to similarly replace a plaintext table name or column name that is a configuration target with a ciphertext table name or a ciphertext column name, and to perform a change of the section concerning table name encryption or column name encryption to "yes," and the security configuration information operation unit 124 of the database control unit 12 changes the security configuration information of the security configuration information storage unit 14. The relevant table name and column name for the table name in the ciphertext table information listing ((B) of FIG. 7) are replaced with a ciphertext table name and ciphertext column name.

Step 4: Change Security Configuration Information Temporary Storage Unit:

The security configuration information operation unit 225 of the application response unit 22 writes the plaintext table name or column name that is a configuration target, in the section of the decrypted table name or decrypted column name, in the security configuration information temporary storage unit 25 (see FIG. 9), replaces the table name or column name with a ciphertext table name or a ciphertext column name, and changes the section "table name encrypted?" or "column name encrypted?" to "yes."

Step 5: Reply that Change has been Completed:

The application response unit 22 replies to the security configuration unit 26 that the configuration change (configuration update processing) has been completed. The security configuration unit 26 makes a display indicating completion in the input/output device 27. In this regard, post-change content of the security configuration information temporary storage unit 25 may be displayed on the screen to present to the user the fact that the change has been completed.

It is to be noted that in the security configuration unit 26, the table name and column name may be changed simultaneously to encryption "yes," or the table name and column name may be changed separately. Or, a plurality of tables or a plurality of columns may be collectively changed to encryption "yes." In this case, the processing of Steps 1 to 4 described above is executed for each table/column.

<Configuration Update Processing (Change to Encryption "No")>

Figure 13:
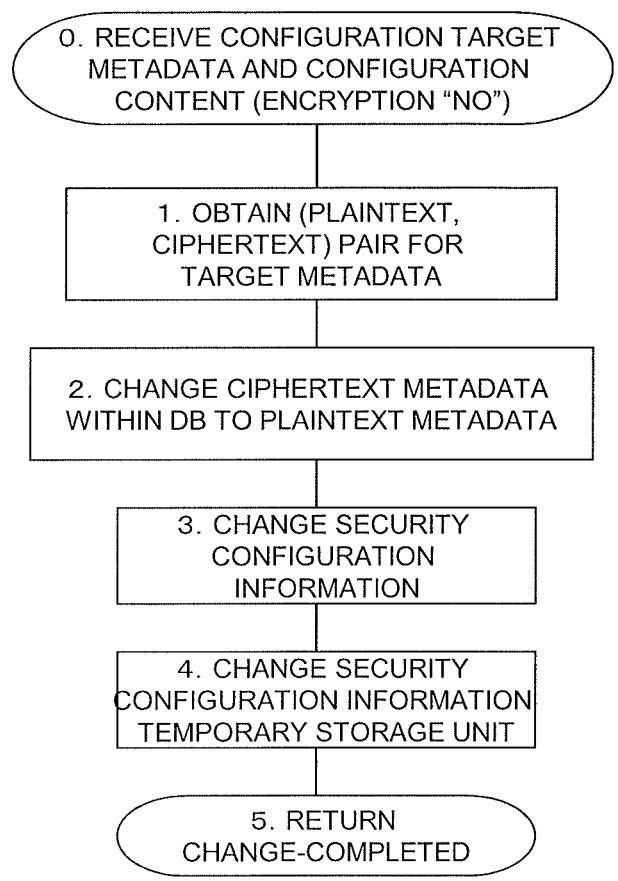
FIG. 13 is a flowchart describing configuration processing without encryption in configuration update processing of FIG. 11.

Next, as a detailed processing procedure of the configuration update processing of Step 4 of FIG. 11, a description is given of processing to change to encryption "no." FIG. 13 is a flowchart describing detailed processing of Step 4, configuration updating processing, of FIG. 11. FIG. 13 shows a procedure for processing to change from encryption "yes" to encryption "no" for metadata (table name, column name). Here, the metadata (table name, column name) is previously configured to "yes."

Step 0: The security configuration unit 26 receives metadata (table name, column name) that is a configuration target and configuration content (encryption "no") from the input/output device 27.

Step 1: Obtain Pair (Plaintext, Ciphertext) of Metadata Target:

The application response unit 22 that receives a configuration change instruction from the security configuration unit 26 refers to the security configuration information temporary storage unit 25 (see FIG. 9), obtains ciphertext metadata within the database 11 for the metadata (table name or column name) that is a configuration target, and obtains a corresponding plaintext table name or a plaintext column name, from the section of the decrypted table name or decrypted column name.

Step 2: Change Ciphertext Metadata of Database 11 to Plaintext Metadata:

The application response unit 22 requests the database control unit 12 to replace ciphertext metadata (table name or column name) with corresponding plaintext metadata, and replaces a table name/column name within the database 11 with a plaintext table name/column name. In a case of changing the table name, in the database control unit 12, an SQL command of, for example:

ALTER TABLE pre-change table name RENAME TO post-change table name may be issued, with pre-change table name as ciphertext and post-change table name as plaintext, to the database operation unit 121 (FIG. 4). In a case of changing a column name to a ciphertext, an SQL command of, for example:

ALTER TABLE table name RENAME COLUMN pre-change column name TO post-change column name, may be issued, with pre-change column name as ciphertext and post-change column name as plaintext, to the database operation unit 121 (FIG. 4). The relevant table name and column name of the table name of the ciphertext table information listing ((B) of FIG. 7) are replaced with plaintext table name and plaintext column name.

Step 3: Change Security Configuration Information:

For the security configuration information storage unit 14 (see FIG. 6) also, the database control unit 12 replaces the section of the ciphertext table name or ciphertext column name with a plaintext table name or a plaintext column name. A request is made to change the section of the "table name encrypted?" or "column name encrypted?" to "no," and the security configuration information operation unit 124 of the database control unit 12 changes the security configuration information.

Step 4: Change Security Configuration Information Temporary Storage Unit:

The security configuration information operation unit 225 of the application response unit 22 replaces the ciphertext table name or ciphertext column name, in the security configuration information temporary storage unit 25 (see FIG. 9), with the corresponding plaintext table name or plaintext column name, changes the section of the decrypted table name or decrypted column name to "NULL," and changes the section of the "table name encrypted?" or "column name encrypted?" to "no."

Step 5: Reply that Change has been Completed:

The application response unit 22 replies to the security configuration unit 26 that the change has been completed.

It is to be noted that in the security configuration unit 26, the table name and column name may be changed simultaneously to encryption "no," or the table name and column name may be changed separately. Or, a plurality of tables or a plurality of columns may be collectively changed to encryption "no." In this case, the processing of Steps 1 to 4 described above is executed for each table/column.

<Privacy Level Configuration Processing>

In the present exemplary embodiment, in order to avoid (make unnecessary) restructuring of the existing database usage application 21, an operation to configure data privacy level is performed via the security configuration unit 26. The security configuration unit 26 makes a query to the application response unit 22 concerning current content of the security configuration information storage unit 14 and content of the database 11. Rather than making a query concerning all information at once, the security configuration unit 26 may make a query in parts/stages, as in a list of all table names, and then a list of column names and security configurations for a certain table.

The application response unit 22 reads content of the security configuration information storage unit 14, and in a case where metadata is encrypted, after the encrypted metadata is decrypted by the key usage unit 23, sends the metadata to the security configuration unit 26.

According to the present exemplary embodiment, efficient processing is possible by using information held in the security configuration information temporary storage unit 25.

The application response unit 22 reads content of the database 11 via the database control unit 12, and in a case where the metadata (table name, column name) or column data is encrypted, after decryption by the key usage unit 23, sends the metadata to the security configuration unit 26, and the security configuration unit 26 displays the security configuration information or the database information.

A database user inputs an indication of whether or not metadata is encrypted, or an indication of column data privacy level (for example, 3 stages of "low," "medium," and "high") from the input/output device 27 to the security configuration unit 26.

The security configuration unit 26 transmits the inputted privacy level information to the application response unit 22. The application response unit 22 reflects the privacy level information transmitted from the security configuration unit 26 in the security configuration information temporary storage unit 25, and furthermore changes content of the database 11, with respect to the security configuration information storage unit 14 via the database control unit 12.

<Privacy Level Configuration 1>

Figure 14:
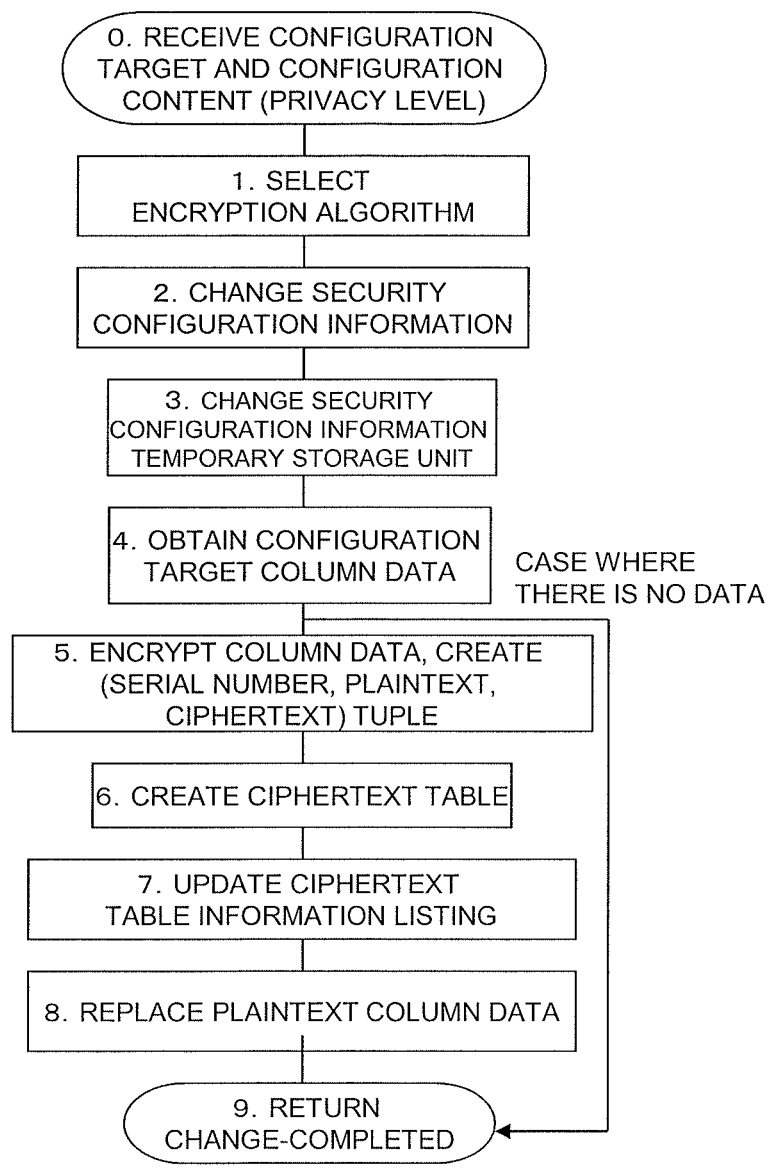
FIG. 14 is a flowchart describing configuration processing of privacy level in configuration update processing of FIG. 11.

FIG. 14 is a flowchart describing a processing procedure of configuring the privacy level of plaintext column data (encrypting plaintext column data) stored in the database 11.

Step 0: Receive Configuration Target and Configuration Content (Privacy Level):

The application response unit 22 receives a table name and column name that are configuration targets, and configuration content (privacy level) from the security configuration unit 26.

Step 1: Select Encryption Algorithm:

The application response unit 22 refers to the cryptographic protocol information storage unit 13 (see FIG. 5), obtains a list of encryption algorithm identifiers corresponding to inputted privacy level (high, medium, low), and selects one thereof. In a case of selecting one from among the list of encryption algorithm identifiers corresponding to the same privacy level, a selection known to have good processing efficiency is made. The encryption algorithm identifier may be automatically selected by the application response unit 22, or a list of encryption algorithm identifiers may be displayed on a screen via the security configuration unit 26 and the user performs a change operation of privacy level may make a selection.

Step 2: Change Security Configuration Information:

The application response unit 22 requests the security configuration information operation unit 124 of the database control unit 12 to change the section of the column data privacy level of a table name and column name that are configuration targets in the security configuration information storage unit 14 (see FIG. 6), to an inputted privacy level, requests that the section of the column data encryption algorithm identifier be changed to the selection made in Step 1, and updates the security configuration information of the security configuration information storage unit 14. In a case where the configuration target table name and column are encrypted, the application response unit 22 detects a name matching a plaintext table name or a plaintext column name inputted from the security configuration unit 26, from a decrypted table name or decrypted column name of the security configuration information temporary storage unit 25, obtains a corresponding encrypted table name or encrypted column name, and identifies the ciphertext table name and ciphertext column name that are configuration targets, in the security configuration information storage unit 14 (see FIG. 6).

Step 3: Change Security Configuration Information Temporary Storage Unit:

The security configuration information operation unit 225 of the application response unit 22 changes the section of the column data privacy level of the configuration target table name and column name from Null to the inputted privacy level, with respect to the security configuration information temporary storage unit 25, and changes the section of the column data encryption algorithm identifier to the selection of Step 1.

Step 4: Obtain Configuration Target Column Data:

The application response unit 22 requests the database control unit 12 to obtain column data of the configuration target table name and column name, to obtain the column data. As described above, the column data is stored as a ciphertext table (referred to in the ciphertext table name of (B) of FIG. 7) in the database 11. If there is no column data of a relevant column in the database, control moves to Step 9.

Step 5: Create Column Data Encryption, Serial Number, Plaintext and Ciphertext:

The application response unit 22 transmits obtained column data (plaintext column data) and the encryption algorithm identifier selected in Step 1 to the key usage unit 23, and requests encryption of the column data. The application response unit 22 attaches a serial number to the obtained cipher text column data, and creates a list of tuples:
[serial number, plaintext column data, ciphertext column data].

Step 6: Create Ciphertext Table:

The application response unit 22 requests the database control unit 12 to create a table storing a list of tuples as in:
[serial number, ciphertext column data]
created in Step 5, and creates a ciphertext table (the ciphertext table name is ciphertext_encryption algorithm identifier, as shown in (B) of FIG. 7) in the database 11.

Step 7: Update Ciphertext Table Information Listing:

The application response unit 22 requests the database control unit 12 to add to the ciphertext table information listing (see (B) of FIG. 7) the tuple:
[configuration target table name, configuration target column name, encryption algorithm identifier selected in Step 1, name of created ciphertext table].

The database control unit 12 adds to the ciphertext table information listing (see (B) of FIG. 7) the tuple: [table name, column name, encryption algorithm identifier, ciphertext table name].

Step 8: Replacement of Plaintext Column Data:

The application response unit 22 requests the database control unit 12 to rewrite plaintext column data of the database operation target column (for example, data of the column name "work location" of (A) of FIG. 7) with a serial number associated by the tuple: "serial number, plaintext column data, ciphertext column data" created in Step 5 (see (C) of FIG. 7).

The database control unit 12 associates and stores ciphertext column data encrypted in Step 5, for each of ID=1, 2, . . . in the ciphertext table (see storage format of (D) to (F) FIG. 7).

Step 9: Reply that Change has been Completed:

The application response unit 22 replies to the security configuration unit 26 that the change has been completed.

It is to be noted that in the procedure of FIG. 14, besides the case where plaintext column data already stored in the database 11 is encrypted by an encryption algorithm corresponding to the privacy level and stored in the database 11, application is also possible to a case where plaintext column data is stored in the database 11 by a database operation command inputted to the application response unit 22 (for example, a case where the privacy level is configured by the security configuration unit 26, for newly recorded column data, but encryption algorithm selection or the like has not been performed).

<Privacy Level Configuration 2>

In a case where the database control unit 12 has a configuration of FIG. 3 or FIG. 4, the privacy level configuration procedure of FIG. 14 described above is a processing procedure to configure the privacy level of plaintext column data stored in the database 11. FIG. 28 is a flowchart describing a processing procedure to configure the privacy level for plaintext column data stored in the database 11, for a case where the database control unit 12 has a configuration of FIG. 26 or FIG. 27. In FIG. 28, Steps 1 to 9 are the same as Steps 1 to 9 of FIG. 14. In FIG. 28, for public key encryption such as HE1 or the like, the encryption algorithm selected in Step 1 branches to Step 10 after Step 3.

Step 10: In a case where the encryption algorithm selected in Step 1 is public key encryption such as HE1 or the like, the application response unit 22 obtains the public key information via the key usage unit 23, transmits the obtained public key information together with a corresponding encryption algorithm identifier to the database control unit 12, and requests encryption of the plaintext column data.

Step 11: The database control unit 12 obtains plaintext column data that is a configuration target from the database 11. If the relevant column data is not present, control branches to Step 16.

Step 12: The database control unit 12 encrypts the column data in the encryption computation unit 126, using the encryption algorithm identifier received and the public key information from the application response unit 22. A serial number is attached to the column data of the obtained ciphertext, and a list of tuples is created: [serial number, plaintext column data, ciphertext column data].

Step 13: The database control unit 12 creates a ciphertext table (see (D) to (F) of FIG. 7) storing a list of tuples: [serial number, ciphertext column data].

Step 14: The database control unit 12 adds to the ciphertext table information listing (see (B) of FIG. 7) the tuple: [configuration target table name, configuration target column name, encryption algorithm identifier selected in Step 1, name of ciphertext table created in Step 12].

Step 15: The database control unit 12 rewrites plaintext column data for a column that is an operation target to a serial number associated by the tuple: [serial number, plaintext column data, ciphertext column data] as created in Step 12, to be stored in the database 11.

Step 16: The database control unit 12 replies to the application response unit 22 that encryption of the plaintext column data has been completed. The application response unit 22 replies to the security configuration unit 26 that the change has been completed (Step 9).

<Change of Privacy Level>

With regard to processing that reflects specifying the privacy level of the column data in the security configuration information storage unit 14, the security configuration information temporary storage unit 25, and the database 11, a description is given below concerning a case where the privacy level is already configured.

The application response unit 22 refers to the security configuration information storage unit 14, obtains column data privacy level information configured in a specified column, compares with a newly specified privacy level, and if the privacy level is the same, does not perform any particular processing. In a case where the newly specified privacy level is lower than the column data privacy level configured in the security configuration information storage unit 14, a section with the column data privacy level in the security configuration information is changed to the newly specified privacy level.

Figure 15:
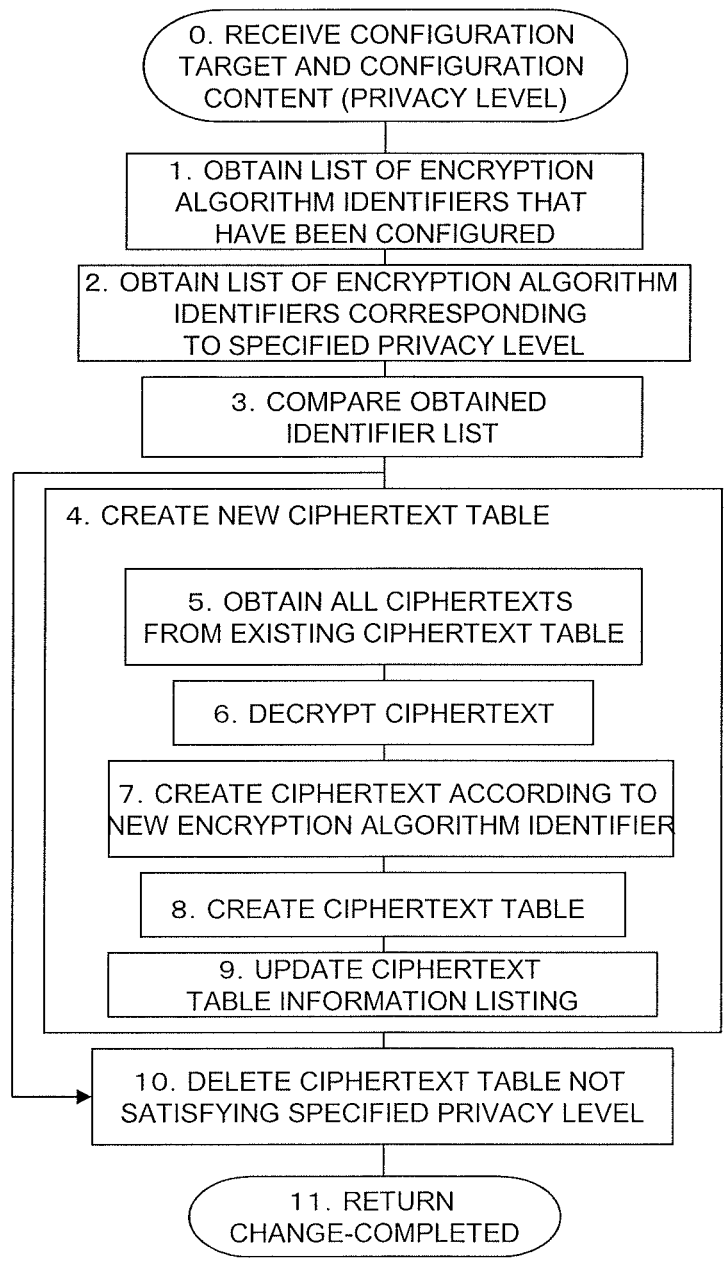
FIG. 15 is a diagram describing processing flow reflecting configuration target and configuration content inputted by the security configuration unit with respect to an application response unit of an exemplary embodiment of the present invention.

In a case where the privacy level specified by the security configuration unit 26 is higher than the column data privacy level configured in the security configuration information storage unit 14, processing from Step 4 onwards in FIG. 15 is performed.

FIG. 15 is a diagram describing processing flow reflecting configuration target and configuration content inputted from the security configuration unit 26, with respect to the application response unit 22. A description is given of processing (processing of the application response unit 22) that changes the configured privacy level (changes to a higher value), referring to FIG. 15.

Step 0: Receive Configuration Target and Configuration Content (Privacy Level):

The application response unit 22 receives a table name and column name that are configuration targets, and configuration content (change of privacy level) from the security configuration unit 26.

Step 1: Obtain List of Already Configured Encryption Algorithm Identifiers:

The application response unit 22 obtains a list of encryption algorithm identifiers used in encryption of column data specified by the inputted configuration target table name and column name, from the security configuration information storage unit 14 (see FIG. 6) of the database apparatus 10. It is to be noted that in a case where the configuration target table name and column are encrypted, the application response unit 22 detects a name matching a plaintext table name or a plaintext column name inputted from the security configuration unit 26, from a decrypted table name or decrypted column name of the security configuration information temporary storage unit 25, obtains a corresponding encrypted table name or encrypted column name, and identifies the ciphertext table name and ciphertext column name that are configuration targets, in the security configuration information storage unit 14 (see FIG. 6).

Step 2: Obtain List of Encryption Algorithm Identifiers Corresponding to Specified Privacy Level:

The application response unit 22 refers to the cryptographic protocol information storage unit 13 (see FIG. 5) of the database apparatus 10 and obtains a list of encryption algorithm identifiers corresponding to the newly inputted privacy level.

Step 3: Comparison of Encryption Algorithm Identifiers:

The application response unit 22 compares the list of encryption algorithm identifiers obtained in Step 1 and the list of encryption algorithm identifiers corresponding to the new privacy level obtained in Step 2.

Step 4: Creation of New Ciphertext Table:

As a result of the comparison in Step 3, in a case where there is no common encryption algorithm identifier in the list of encryption algorithm identifiers obtained in Step 1 and the list of encryption algorithm identifiers corresponding to the new privacy level obtained in Step 2, the application response unit 22 creates a new ciphertext table by the following procedure. Where there is a common encryption algorithm identifier, since data encrypted by an encryption algorithm of the same privacy level exists, the following privacy level change processing (data is re-encrypted by an encryption algorithm corresponding to the new privacy level information to create a ciphertext table and update the ciphertext table information) is not performed.

Step 5: Obtain all Ciphertext from Existing Ciphertext Table:

In a case where a plurality of encryption algorithm identifiers are included in the encryption algorithm identifier list obtained in Step 1, the application response unit 22 selects one encryption algorithm identifier from among them (where there is only 1, the 1 encryption algorithm identifier is selected), and requests the database control unit 12 to obtain content of the ciphertext table corresponding to the selected encryption algorithm identifier from the database 11. The database control unit 12 refers to the ciphertext table information listing (see (B) of FIG. 7), identifies the ciphertext table name corresponding to the selected encryption algorithm identifier, obtains content (stored as a pair format of ID and ciphertext) of the identified ciphertext table, and transmits this to the application response unit 22.

Step 6: Decryption of Ciphertext:

The application response unit 22 transmits the encryption algorithm identifier selected in Step 5 and the obtained ciphertext to the key usage unit 23, and requests decryption to plaintext.

Step 7: Creation of Ciphertext by Encryption Algorithm of New Identifier:

In a case where there are a plurality of encryption algorithm identifiers included in only the list of encryption algorithm identifiers corresponding to the privacy level obtained in Step 2 (not included in the encryption algorithm identifier list obtained in Step 1), the application response unit 22 selects one encryption algorithm identifier from among them (in a case where there is only 1 encryption algorithm identifier included in the list of encryption algorithm identifiers corresponding to the privacy level obtained in Step 2, the 1 encryption algorithm identifier is selected), transmits this to the key usage unit 23 together with plaintext obtained in Step 6, and requests encryption by the encryption algorithm of the new identifier. A list of new tuples is created:
[serial number, plaintext, ciphertext].

Step 8: Creation of Ciphertext Table:

The application response unit 22 requests the database control unit 12 to create a ciphertext table storing a list of tuples:
[serial number, ciphertext],
and creates a ciphertext table (see storage format of (D) to (F) of FIG. 7).

Step 9: Updating of Ciphertext Table Information Listing:

In order to add a new table to the encryption table information listing (see (B) of FIG. 7) the application response unit 22 requests the database control unit 12 to add the tuple:
[target table name, target column name, new encryption algorithm identifier, ciphertext table name created in Step 8].

Step 10: Deletion of Encryption Table not Satisfying Specified Privacy Level:

A request is made to the database control unit 12 regarding an encryption algorithm identifier included in only Step 1, to refer to the ciphertext table information listing (see (B) of FIG. 7) to identify a corresponding ciphertext table and to delete the ciphertext table in question and a corresponding portion of the ciphertext table information listing (a row (entry) including the table name of the ciphertext table that is to be deleted) from the database 11. By this operation, with regard to column data for which a change in privacy level is specified, encryption column data encrypted by an encryption algorithm of a privacy level lower than the newly specified privacy level is deleted from the database 11.

In a case where the column data privacy level is configured to a value lower than the currently configured privacy level by the security configuration unit 26, processing similar to that described above is performed. In a case where data exists that is encrypted by an encryption algorithm of a privacy level the same as the newly specified privacy level, processing to perform re-encryption with the encryption algorithm corresponding to the newly specified privacy level and create a ciphertext table is not performed.

<Data Addition Processing>

Figure 16:
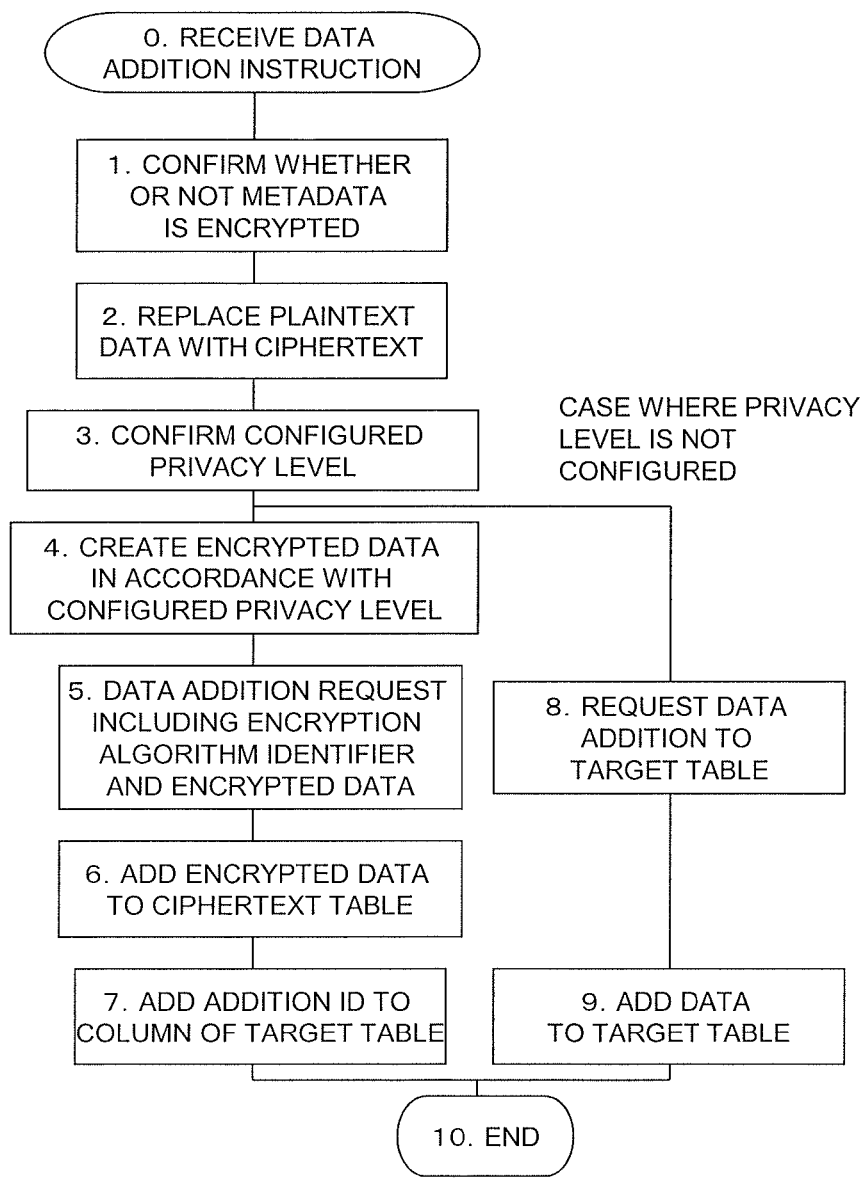
FIG. 16 is a flowchart describing processing of adding data to a table already created within a database, with regard to the application response unit of an exemplary embodiment of the present invention.

Next, a description is given of an example of a processing procedure for adding new column data to the database 11. FIG. 16 is a flowchart describing processing of adding data to a table already created within the database 11, with regard to the application response unit 22.

Step 0: Receive Data Addition Instruction:

The application response unit 22 recognizes that a database operation command inputted from the database usage application 21 is a data addition instruction such as an SQL:
INSERT Text (INSERT INTO (column name 1, column name 2 . . . ) VALUES (value 1, value 2 . . . )

Step 1: Confirmation Whether or not Metadata is Encrypted:

The application response unit 22 refers to the security configuration information storage unit 14 or security configuration information temporary storage unit 25 of the database apparatus 10, and confirms whether or not the addition target table name or column name is encrypted in the database 11.

Step 2: Replacing of Plaintext Data with Ciphertext:

In a case where a table name or column name specified by a database operation command in the data addition instruction is encrypted, the application response unit 22 obtains a ciphertext table name or column name corresponding to plaintext table name and column name of a section of decrypted table name and decrypted column name in the security configuration information temporary storage unit 25, and replaces the plaintext table name and plaintext column name included in the data addition instruction, such as the INSERT text described above, with the obtained ciphertext table name and the ciphertext column name.

The application response unit 22 refers to the security configuration information storage unit 14 or the security configuration information temporary storage unit 25, and obtains column data privacy level and encryption algorithm identifier, for the column that is an addition target.

Step 3: Confirmation of Already Configured Privacy Level:

In a case where the column data privacy level of the relevant table name and column name is Null, in the security configuration information storage unit 14 or the security configuration information temporary storage unit 25 (a case where the privacy level is not configured), the application response unit 22 moves control to Step 8. On the other hand, in a case where the column data privacy level is configured, the application response unit 22 executes the following Step 4.

Step 4: Creation of Encrypted Data According to Configured Privacy Level:

In a case where the column privacy level and the encryption algorithm identifier are configured, with regard to all configured encryption algorithm identifiers, the application response unit 22 sends the plaintext data to be added and encryption algorithm identifier to the key usage unit 23, and creates a list of tuples:
[encryption algorithm identifier, encrypted data]
by which the plaintext data is encrypted by the configured encryption algorithm.

Step 5: Request to Add Data Including Encryption Algorithm Identifier and Encrypted Data:

The application response unit 22 transmits to the database control unit 12:
addition target table name and column name, and
[encryption algorithm identifier, encrypted data]
obtained in Step 4, and requests addition to the database 11.

Step 6: Encrypted Data Addition to Ciphertext Table:

The database control unit 12 obtains the maximum value of serial numbers stored in the addition target column and makes the serial number maximum value+1 the starting number IDx for an extra ID.

The database control unit 12 refers to the ciphertext table information listing (see (B) of FIG. 7) with regard to all of:
[encryption algorithm identifier, encrypted data]
obtained in Step 4, and obtains the ciphertext table name corresponding to the encryption algorithm identifier specified for the addition target table and column.

The database control unit 12 adds a tuple of
[extra ID, encrypted data]
to the obtained ciphertext table. The ciphertext table stores pair information of ID and encrypted data, as shown in (D) to (F) of FIG. 7. Therefore,
[extra ID, ciphertext data]
is added to the end of the ciphertext table. In a case of a plurality of data to be added, the extra ID is incremented as in IDx+1, IDx+2, . . . in order, from the start number IDx thereof.

Step 7: Add Extra ID to Column of Target Table:

The extra ID obtained in Step 6 is added as column data to a column of an addition target table. For example, an extra ID is added to the end of the column of the table (after encryption) of (C) of FIG. 7. In a case where the there are N items of added data, IDx, IDx+1, IDx+2, . . . , IDx+N−1 is added to the end of the column of the table (after encryption) of (C) of FIG. 7, and the ID maximum value is updated to IDx+1.

Steps 4 to 7 above related to data addition processing in a case where privacy level is configured.

In Step 3, in a case where the privacy level is not configured, the following processing is performed.

Step 8: Request for Data Addition to Target Table:

The application response unit 22 transmits an instruction to add data after replacement to ciphertext of addition target table name and column name obtained in Step 2, to the database control unit 12, and requests addition of data to the database 11.

Step 9: Data Addition to Target Table:

The database control unit 12 adds data to the database 11 in accordance with the data addition instruction transmitted by the application response unit 22.

In the present exemplary embodiment, a description has been given above of a processing procedure for configuration as to whether or not there is encryption, and configuration of privacy level, and a processing procedure of an operation of adding column data as an example of a database operation, making reference to respective flow diagrams. Below, a description is given of several representative processes of a system of the present exemplary embodiment (note that since there is basically no branching in the processing, reference is not made to the flowcharts).

<Initial Operation after Starting Application Response Unit>

A description is given of initial operations after starting the application response unit 22. In the initial operations of the application response unit, in order to make the following processing efficient, processing to read some information placed in the database apparatus 10, on the user apparatus 20 side, and processing to generate auxiliary information are preformed, as the initial operations after starting.

The application response unit 22 reads content of the security configuration information storage unit 14 of the database apparatus 10 via the database control unit 12, and stores the content in the security configuration information temporary storage unit 25.

In a case where metadata (table name, column name) of the database 11 is encrypted, the application response unit 22 decrypts the encrypted metadata thereof by the key usage unit 23, and stores the metadata in a section of decrypted table name and decrypted column name of the security configuration information temporary storage unit 25. Furthermore, content of the cryptographic protocol information storage unit 13 of the database apparatus 10 may be read on the user apparatus 20 side in the initial operation of the application response unit 22, and this may be stored and held in a storage unit.

<Processing of Operations on Metadata>

A description is given concerning operations of adding a new table to the database 11, and changing an existing table name or column name (operations on metadata). In a case of adding a new table to the database 11, configuration of security information is performed by the security configuration unit 26, as described above.

When a database operation command for table addition from the database usage application 21 is inputted, the application response unit 22 notifies the security configuration unit 26. The security configuration unit 26 displays content of the table addition command, and prompts the database user to input security configuration information of the table to be added (whether or not table name and column name are encrypted, and privacy level of the column data). The security configuration unit 26 transmits the security configuration information inputted by the database user to the application response unit 22.

After the table name and column name have been encrypted in accordance with the security configuration information transmitted by the security configuration unit 26, the application response unit 22 transmits the database operation command for table addition to the database control unit 12, and creates a table in the database 11.

The application response unit 22 transmits the security configuration information to the database control unit 12, to be stored in the security configuration information storage unit 14. The application response unit 22 stores security configuration information the same as the security configuration information stored in the security configuration information storage unit 14, in the security configuration information temporary storage unit 25. In a case where the table name and column name are encrypted, the table name and column name before encryption are stored as the table name and column name after decryption.

<Change of Table Name and Column Name>

A change of configuration content of metadata such as table name or column name of a table stored in the database 11 (a change to encryption "yes," or a change to encryption "no") has already been described with reference to FIG. 12 and FIG. 13. A description is given below concerning a change to a table name or column name.

In a case of changing an existing table name or column name already stored in the database 11, it is necessary to change processing according to whether or not the table name or column name is encrypted.

When a database operation command to change the table name or column name is inputted, the application response unit 22 searches the security configuration information temporary storage unit 25, and confirms whether or not configuration regarding encryption of the table name or column name to be changed, is "yes."

If the configuration regarding encryption is "no," a normal database operation command is transmitted to the database control unit 12, and a database operation is executed. The table name or column name that are stored in the security configuration information storage unit 14 and the security configuration information temporary storage unit 25 are changed together. If the configuration regarding encryption is "yes," the following processing is performed.

Step 1: The application response unit 22 encrypts plaintext table name or column name after the specified change, by the key usage unit 23, and creates a tuple with regard to the table name or column name after the change:
[plaintext table name or column name, ciphertext table name or column name].

Step 2: The application response unit 22 refers to the security configuration information temporary storage unit 25, searches for the ciphertext table name or column name, corresponding to the plaintext table name or column name that is a target of the specified change, and identifies a ciphertext table name or column name recorded in the database 11.

Step 3: The application response unit 22 transmits a database operation command to the database control unit 12 to replace the ciphertext table name or column name recorded in the database 11 at present, as identified in Step 2, with a post-change ciphertext table name or column name as created in Step 1, and executes a change of the table name or column name of in the database 11.

Step 4: The application response unit 22 replaces the ciphertext table name or column name as identified in Step 2, as recorded in the security configuration information storage unit 14 or security configuration information temporary storage unit 25, with a ciphertext table name or column name as created in Step 1. A corresponding plaintext table name or column name (decrypted table name or column name) as recorded in the security configuration information temporary storage unit 25 is replaced with plaintext gable name or column name after the specified change.

<Adding Data to Existing Table>

Addition of data to a column of an existing table already stored in the database 11 has been described making reference to FIG. 16. The added data is encrypted, and as data of a specified column of a specified table, a value of +1 (extra ID) is added to the number of rows (maximum serial number) of the current table, reference is made to the ciphertext table information listing ((B) of FIG. 7), and a pair, extra ID and ciphertext, are added to a ciphertext table for an encryption algorithm corresponding to the added data (in a case of a plurality of encryption algorithms, to a plurality of ciphertext tables respectively corresponding to the plurality of encryption algorithms).

<Change of Data of Existing Table>

A description is given of processing of the application response unit 22 and the database control unit 12 for a case where a database operation command inputted from the database usage application 21 is for a data change. The data change corresponds, for example, to an SQL command (UPDATE table name SET <column>=<value>) or the like.

Step 1: The application response unit 22 refers to the security configuration information storage unit 14 (or the security configuration information temporary storage unit 25), and confirms whether or not the table name or column name that is a target of an additional change, is encrypted.

Step 2: In a case where the table name or column name that is a target of an additional change, is encrypted, the application response unit 22 refers to the security configuration information temporary storage unit 25, obtains the ciphertext table name or column name in the database 11, and replaces the (plaintext) table name or column name corresponding to the database operation command inputted to the application response unit 22, with the obtained ciphertext table name or column name.

Step 3: The application response unit 22 refers to the security configuration information storage unit 14 (or the security configuration information temporary storage unit 25), and confirms whether or not the privacy level is configured in the column name that is a target for change.

Step 4: In a case where the column data privacy level of the relevant table name or the relevant column name of the security configuration information storage unit 14 (or the security configuration information temporary storage unit 25) is Null (a case where the privacy level is not configured), a database operation command performing only replacement of the table name or column name described above is transmitted to the database control unit 12, and a change is executed.

In a case where the column data privacy level of the relevant table name or the relevant column name of the security configuration information storage unit 14 (or the security configuration information temporary storage unit 25) is configured, the following processing is performed.

Step 5: The application response unit 22 refers to the security configuration information storage unit 14 (or the security configuration information temporary storage unit 25), and obtains all encryption algorithm identifiers of the target column.

Step 6: The application response unit 22 encrypts the plaintext data that is a target of change, by encryption algorithms of all the obtained identifiers.

Step 7: The application response unit 22 transmits to the database control unit 12 the table name or column name that is a target of change, an indication of a row that is a target of change, and all created tuples of
[encryption algorithm identifier, ciphertext].

Step 8: The database control unit 12 refers to table/column that is a target of change, to obtain a serial number stored in a row that is a target of change.

Step 9: The database control unit 12 refers to the ciphertext table information to specify a ciphertext table for each encryption algorithm, and rewrites ciphertext of a row corresponding to the serial number obtained in Step 4, with ciphertext received in Step 7.

<Deletion of Data from an Existing Table>

A description is given of processing of the application response unit 22 and the database control unit 12 for a case where a database operation command inputted from the database usage application 21 is for data deletion from the database 11.

Step 1: The application response unit 22 refers to the security configuration information storage unit 14 (or the security configuration information temporary storage unit 25), and confirms whether or not a table name that is an operation target, is encrypted.

Step 2: In a case where the table name that is an operation target is not encrypted, the application response unit 22 transmits a normal database operation command as it is, to the database control unit 12.

Step 3: In a case where the table name that is an operation target is encrypted, the application response unit 22 refers to the security configuration information temporary storage unit 25, obtains a ciphertext table name in the database 11 and replaces the table name that is an operation target with the obtained ciphertext table name, to be transmitted to the database control unit 12.

Step 4: The database control unit 12 performs data deletion, in accordance with the database operation command from the application response unit 22. At this time, a confirmation is made with regard to the deletion target table, as to whether or not there is a column in which data is encrypted, and in a case where there is an encrypted column, deletion of the corresponding ciphertext table data is performed.

<Retrieval and Computation of Data of Existing Table>

A description is given below of processing in a case where a database operation command relates to retrieval and computation with respect to data of an existing table within the database 11.

Step 1: The application response unit 22 refers to the security configuration information storage unit 14 (or the security configuration information temporary storage unit 25), and confirms whether or not a table name or column name that is an operation target is encrypted.

Step 2: In a case where the table name or column name that is an operation target is encrypted, the application response unit 22 refers to the security configuration information temporary storage unit 25, obtains the ciphertext table name or column name in the database 11, and replaces the plaintext table name or column name corresponding to the database operation command inputted to the application response unit 22, with the obtained ciphertext table name or column name.

Step 3: The application response unit 22 refers to the security configuration information storage unit 14 or the security configuration information temporary storage unit 25, and confirms whether or not the column data privacy level is configured for the data of the column that is an operation target.

In a case where the privacy level of the column that is an operation target is not configured (the column data is not encrypted), processing of Steps 4 to 6 as below is performed.

Step 4: The application response unit 22 transmits a database operation command (retrieval or computation) replacing the table name or column name described above, to the database control unit 12.

Step 5: The database control unit 12 executes the database operation (retrieval or computation) received from the application response unit 22, and returns an execution result to the application response unit 22.

Step 6: In a case where a table name or column name included in the database operation command (retrieval or computation) is replaced by ciphertext, the database control unit 12, again replaces the table name or column name included in the execution result of the database operation with a corresponding plaintext table name or column name, and transmits this to the application response unit 22.

A description is given below of retrieval or computation of data of an existing table within the database 11 in a case where the column data privacy level of the column that is an operation target is configured.

Step 7: The application response unit 22 refers to the security configuration information storage unit 14 and obtains an identifier of an encryption algorithm used in encryption of the column that is an operation target.

Step 8: The application response unit 22 refers to the cryptographic protocol information storage unit 13, and obtains a cryptographic protocol identifier (see FIG. 5) corresponding to a triplet:

[processing content, privacy level configured for a column that is an operation target, encryption algorithm identifier used in encryption of a column that is an operation target].

Step 9: Input of

[cryptographic protocol identifier, operation target column, processing content]

is made to the cryptographic protocol process execution unit 222 of the application response unit 22.

Step 10: The cryptographic protocol process execution unit 222 of the application response unit 22 communicates with the database control unit 12 in accordance with the inputted cryptographic protocol identifier, to execute the database operation and obtain an execution result. It is to be noted that specific content of the cryptographic protocol processing differs according to cryptographic protocol.

Step 11: If replacement of the table name or column name included in the database operation command is performed, the database control unit 12 again replaces ciphertext table name or column name included in the obtained execution result with plaintext table name or column name, and sends the execution result to the application.

<Operation Example of Processing to Configure Privacy Level for Data>

Next, a description is given concerning a case of configuring a column of "employee listing" and a column of "work location" to a privacy level of "medium," in a table in the database 11 in the present exemplary embodiment.

Step 1: Select Encryption Algorithm:

The application response unit 22 selects an encryption algorithm corresponding to the privacy level specified by a user, by the security configuration unit 26. As shown in FIG. 17, reference is made to the cryptographic protocol information storage unit 13 to obtain a list ("SE1," "AES," "HE1") of encryption algorithm identifiers corresponding to the privacy level "medium." One algorithm is selected from among the list ("SE1," "AES," "HE1") of encryption algorithm identifiers. Here, efficiency of ciphertext creation is viewed as important, and "AES" is selected.

Step 2. Change of Security Configuration Information Storage Unit:

With regard to a row storing information of the table name "employee listing" and column name "work location" of the security configuration information storage unit 14, as shown in FIG. 18, the security configuration information operation unit 124 of the database apparatus 10 changes:
the section "column data encrypted?" from "no" to "yes,"
the section "column data privacy level" from "NULL" to "medium," and
the section "column data encryption algorithm identifier" from "NULL" to "AES."

Step 3: Change of Security Configuration Information Temporary Storage Unit 25:

With regard to the row storing information of the table name "employee listing" and column name "work location" of the security configuration information temporary storage unit 25, the security configuration information operation unit 225 of the application response unit 22 makes a change similar to the security configuration information storage unit 14. That is, as shown in FIG. 19, regarding the table name "employee listing," concerning the row storing information of the column name "work location," the section "column data encrypted?" is changed from "no" to "yes,"
the section "column data privacy level" is changed from "NULL" to "medium," and
the section "column data encryption algorithm identifier" is changed from "NULL" to "AES."

Step 4: Obtaining Target Column Data:

The table "employee listing" is as shown in (A) of FIG. 20. The database control unit 12 obtains a list of data of the column "work location" from the table "employee listing," and transmits the list to the application response unit 22. At this time, a main key column for uniquely distinguishing a line of the table "employee listing" is also obtained therewith. Here, "employee number" is the main key.

Step 5: Encryption of Obtained Column Data:

The application response unit 22 encrypts data of the column "work location" by the key usage unit 23, associates the ciphertext with the original plaintext and employee number, and makes a list with attached serial numbers, 1, 2, 3, . . . , as shown in (B) of FIG. 20. It is to be noted that this list is held by a storage unit within the application response unit 22.

Step 6: Creation of Ciphertext Table:

Among the list ((A) of FIG. 21) created in Step 5, a list of tuples: (ciphertext "0x3d8 . . . " of plaintext "Head Office," ciphertext "0x962 . . . " of plaintext "Tamagawa") and serial numbers (1, 2, . . . ) is sent to the database control unit 12, and a ciphertext table is created and stored. The ciphertext table name is "ciphertext_AES_1," as shown in (B) of FIG. 21. The ciphertext table is formed of a pair: serial number and ciphertext.

Step 7: Updating of Ciphertext Table Information Listing:

As shown in (C) of FIG. 21, the ciphertext table information listing stores: table name "employee listing," column name "work location," encryption algorithm "AES," and ciphertext table name "ciphertext_AES_1."

Step 8. Replacement of Plaintext Column Data:

The list of tuples of employee number and serial number ((A) of FIG. 22), created in Step 5, is sent to the database control unit 12, and values of the column "work location" of the table "employee listing" are replaced with serial numbers (1, 2, . . . ), as shown in (B) of FIG. 22. When the replacing to serial numbers is completed, the list created in Step 5 ((A) of FIG. 22) is deleted. The ciphertext table and ciphertext table information listing of (C) and (D) of FIG. 22 are the same as the ciphertext table and ciphertext table information listing of (B) and (C) of FIG. 21.

<Average Value Computation>

Next, a description is given concerning an example of a computation operation to obtain an average value of the encrypted data stored in the database 11. FIG. 23 is a diagram showing an example of the security configuration information temporary storage unit 25 referred to in this example. A description is given concerning processing to obtain an average value of data where the column name is "overtime hours" for a table name of "work hours management listing" stored in the database 11, when the data is encrypted.

The column data for the column "work hours" and the column data of the first column of "overtime hours," in the table with table name "work hours management listing," each have a column data privacy level configured to "medium," and are encrypted by an encryption algorithm with identifier "AES." The column data of the second column of "overtime hours" is encrypted by an encryption algorithm with identifier "HE1." It is to be noted that the security configuration information storage unit 14 of the database apparatus 10 side is the same as the security configuration information temporary storage unit 25 of FIG. 23 with "decrypted table name" and "decrypted column name" removed.

The main body of the table name "work hours management listing" has content as shown, for example, in (A) of FIG. 24. It is to be noted that serial numbers (ID) 1, 2, 3 . . . in "work hours" and "overtime hours" are serial numbers (ID) 1, 2, 3 . . . , stored with ciphertext, as pairs in a ciphertext table. An example of the ciphertext table "ciphertext_AES_1" storing encrypted data of "work hours," and ciphertext tables "ciphertext_AES_2" and "ciphertext_HE1_1" storing encrypted data of "overtime hours" are as in (C), (D), and (E) of FIG. 24, and a ciphertext table information listing defining correspondence relationships between these is as shown, for example, in (B) of FIG. 24.

The cryptographic protocol information storage unit 13 is as shown in FIG. 25. An encryption algorithm identifier OPE1 represents an Oder Preserving Symmetric Encryption algorithm (common key scheme). HE1 represents Homomorphic Encryption, and SE1 represents Searchable Encryption.

Where a database operation command inputted from the database usage application 21 is an average value computation operation (for example, SQL text: SELECT AVERAGE (column name) FROM table name), the application response unit 22 determines whether or not metadata (table name, column name) is encrypted. The application response unit 22 refers to the security configuration information temporary storage unit 25 of FIG. 23, and obtains information corresponding to column name "overtime hours" of table name "work hours management listing." Reference is made to the sections "table name encrypted?" and "column name encrypted?," to confirm that encryption of both is configured to "no." In this case, the application response unit 22 does not perform metadata replacement processing.

Next, the application response unit 22 refers to the section "column data privacy level" where column name is "overtime hours" for a table name of "work hours management listing" of the security configuration information temporary storage unit 25 of FIG. 23, and confirms that the column data privacy level is configured to "medium." Processing accompanying cryptographic protocol processing is then performed.

The application response unit 22 confirms the section "column data encryption algorithm identifier" where table name is "work time management listing" of the security configuration information temporary storage unit 25 of FIG. 23, and obtains encryption algorithm identifiers "AES" and "HE1" that are used in encryption.

The application response unit 22 refers to the cryptographic protocol information storage unit 13 (see FIG. 25), and searches for cryptographic protocol identifiers corresponding to processing content "average" with privacy level "medium," for the encryption algorithms "AES" and "HE1," respectively.

As a result of the search, the application response unit 22 obtains a cryptographic protocol identifier "HE1_AVG_M," for the encryption algorithm "HE1."

The following are inputted to the cryptographic protocol process execution unit 222 of the application response unit 22:
cryptographic protocol identifier: "HE1_AVG_M,"
table name: "work hours management listing,"
column name: "overtime hours,"
encryption algorithm: "HE1," and
processing content: "average."

The cryptographic protocol process execution unit 222 performs cryptographic protocol processing by interacting with the cryptographic protocol process execution unit 122 of the database control unit 12, in accordance with the inputted cryptographic protocol identifier. Specific operations thereof vary according to cryptographic protocol or implementation (there are no particular limitations, and 1 example of operations is described below). A result of execution of the cryptographic protocol process execution unit 222 is reflected in the database usage application 21.

The cryptographic protocol process execution unit 222 on the user apparatus 20 side sends the 4 items: table name "work hours management listing" that is an operation target, column name "overtime hours," encryption algorithm identifier "HE1," and cryptographic protocol identifier "HE1_AVG_M," to the cryptographic protocol process execution unit 122 of the database control unit 12.

The cryptographic protocol process execution unit 122 operates as follows, in accordance with a processing procedure specified by the received cryptographic protocol identifier "HE1_AVG_M."

The cryptographic protocol process execution unit 122 refers to the ciphertext table information listing ((B) of FIG. 24), to obtain table name "ciphertext_HE1_1" that stores data encrypted by the encryption algorithm "HE1," with regard to the column "work hours" of the table "work hours management listing."

The cryptographic protocol process execution unit 122 then obtains all ciphertext data stored in the column "ciphertext" of "ciphertext_HE1_1" and the number of data items.

The cryptographic protocol process execution unit 122 computes sum total of ciphertext for the plaintext, rather than decrypting the obtained ciphertext data. In additive homomorphic encryption such as Paillier encryption, for example, with regard to ciphertext $E(m1)$ of plain text $m1$ and ciphertext $E(m2)$ of plain text $m2$, for ciphertext $E(m1+m2)$ of $m1+m2$, the following holds: $E(m1)+E(m2)=E(m1+m2)$. Accordingly, the sum total of ciphertext $E(\Sigma mi)$ is computed as $\Sigma E(mi)$.

The cryptographic protocol process execution unit 122 of the database control unit 12 sends the obtained sum total of ciphertext and the number of data items to the cryptographic protocol process execution unit 222 (see FIG. 8) on the user apparatus 20 side, via the processing/communication control unit 125 (see FIG. 3). It is to be noted that RSA encryption and Elgamal encryption described above are multiplicative homomorphic. Therefore, an encryption algorithm corresponding to a computation operation (processing content identifier) is configured. In the example of the cryptographic protocol information storage unit 13 of FIG. 25, for example, the homomorphic encryption algorithm HE1 (in this case, HE1 is Paillier encryption or the like) is configured for a processing content operator of "average."

In the cryptographic protocol process execution unit 222 on the user apparatus 20 side, the ciphertext total sum received from the database control unit 12 and the encryption algorithm identifier "HE1" are send to the key usage unit 23, the ciphertext total sum is decrypted, and the plaintext total sum is obtained. The cryptographic protocol process execution unit 222 obtains an average value (plaintext) by dividing the total sum (plaintext) by the number of data items (plaintext). The obtained average value is returned to the database usage application 21 that originally issued the database operation command (average value).

Outside of the abovementioned average value, in a case where some complex arithmetic computations, such as addition, multiplication, etc., use an additive homomorphic encryption algorithm or a multiplicative homomorphic encryption algorithm, and it is possible to perform computational processing of ciphertext as it is, in the cryptographic protocol process execution unit 122 of the database control unit 12, a result (ciphertext) of performing computation of ciphertext as it is returned to the cryptographic protocol process execution unit 222 of the application response unit 22, and in the application response unit 22, a ciphertext of the processing result is decrypted to plaintext by the key usage unit 23, and computation of the rest of the complex arithmetic computation is performed with plaintext, to return a computation result to the database usage application 21. Processing is made efficient by the configuration in question. In the database control unit 12, in a case where computation of the database operation command is a computation outside of addition or multiplication (for example, decryption computation of addition, subtraction, multiplication, division, or the like, size comparison computation, logical computation, or the like), in a case where it is not possible to perform computational processing of ciphertext as it is, computation target data of the database 11 is transmitted to the application response unit 22 as it is. In the application response unit 22, computation target ciphertext data is decrypted to plaintext using the key usage unit 23, the computation is performed on the plaintext data in question, and a computation result is returned to the database usage application 21. The configuration in question can handle arbitrary computation.

In the abovementioned exemplary embodiment an SQL command is shown as an example of a database operation command, but clearly the database operation command is not limited to an SQL command.

At least some of the abovementioned exemplary embodiment is appended, as an example, as follows. (Note that there is no limitation to the following).

APPENDIX 1

A database encryption system, comprising:
a database apparatus that comprises a database, and database control unit that controls execution of a database operation; and
a user apparatus that is connected to the database control unit via a network, wherein
the user apparatus comprises:
a key usage unit that manages key information for encryption and decryption;

a security configuration unit that configures information related to configuration of security of data and/or metadata stored in the database;
a first storage unit that stores information related to the configuration of security; and
an application response unit that receives a database operation command issued to the database apparatus, and determines whether or not encryption is necessary with respect to data and/or metadata handled by the database operation command, by referring to the information of the first storage unit, wherein
the application response unit, if encryption is necessary, transmits to the database control unit, as data and/or metadata of the database operation command, encrypted data and/or encrypted metadata that has been encrypted according to key information of the key usage unit by using an encryption algorithm corresponding to the security of the data and/or metadata, to cause the database control unit to execute the database operation,
the application response unit, if encryption is not necessary, transmits the database operation command as it is, to the database control unit, to cause the database control unit to execute the database operation, and
the application response unit receives a database processing result transmitted by the database control unit, and if conversion or decryption of the data and/or metadata of the database processing result is necessary, returns a result of performing the conversion or the decryption according to key information of the key usage unit, to an issuing source of the database operation command as a response to the database operation command.

APPENDIX 2

The database encryption system according to appendix 1, wherein
the security configuration unit performs at least one of:
a configuration or change with regard to whether or not the metadata is encrypted,
a configuration or change with regard to whether or not the data is encrypted, and
a configuration or change of privacy level information representing the security level.

APPENDIX 3

The database encryption system according to appendix 2, wherein
the first storage unit holds information with regard to whether or not the metadata is encrypted, whether or not the data is encrypted, privacy level information representing the security level of the data, and distinguishing information for an encryption algorithm corresponding to the privacy level information.

APPENDIX 4

The database encryption system according to appendix 3, wherein
the first storage unit, in a case where the metadata including a table name and column name stored in the database is encrypted, holds the encrypted table name and column name, in addition to storing and holding the table name in plaintext and the column name in plaintext, before encryption, as a decrypted table name and a decrypted column name, respectively.

APPENDIX 5

The database encryption system according to appendix 4, wherein
the application response unit, in a case where at least one of a table name and column name among metadata of the database processing result is encrypted, obtains at least one of the table name in plaintext and the column name in plaintext, held as the decrypted table name and the decrypted column name of the first storage unit.

APPENDIX 6

The database encryption system according to any one of appendices 1 to 5, wherein
the database control unit receives the database operation command transmitted by the application response unit, executes a database operation using a cryptographic protocol on encrypted data or a database operation on plaintext data, with respect to the database, and returns a processing result to the application response unit as the database processing result.

APPENDIX 7

The database encryption system according to appendix 6, wherein
the database control unit, with regard to a predetermined prescribed operation and computation of the database operation command, performs the operation or computation on ciphertext data stored in the database, as ciphertext, and transmits a ciphertext processing result to the application response unit as the database processing result.

APPENDIX 8

The database encryption system according to any one of appendices 4 to 7, wherein
the database apparatus comprises:
a second storage unit that stores and holds information as to whether or not the metadata including a table name and column name stored in the database is encrypted, whether or not the data is encrypted, privacy level information representing the security level of the data, and distinguishing information for an encryption algorithm corresponding to the privacy level information; and
a third storage unit that stores and holds at least cryptographic protocol distinguishing information associating processing content of the database operation command, the privacy level information, and the encryption algorithm.

APPENDIX 9

The database encryption system according to appendix 8, wherein
the database functions as the second and/or third storage unit, and holds information stored in the second and/or third storage unit as a table within the database.

APPENDIX 10

The database encryption system according to appendix 8 or 9, wherein the application response unit selects an encryption algorithm corresponding to the privacy level information corresponding to the data by referring to at least one of the first to third storage units, and encrypts the data using the selected encryption algorithm and key information of the key usage unit, to transmit the data to the database control unit.

APPENDIX 11

The database encryption system according to appendix 10, wherein
the application response unit determines whether or not a table name and column name specified by the database operation command are encrypted by referring to the first and/or second storage unit, and in a case where at least one of the table name and column name is encrypted, replaces at least one of the table name and the column name of the database operation command with ciphertext, to be transmitted to the database control unit.

APPENDIX 12

The database encryption system according to appendix 10, wherein
the database control unit comprises a cryptographic protocol process execution unit that executes a cryptographic protocol process of processing content corresponding to the database operation command, based on cryptographic protocol distinguishing information of the third storage unit, with respect to data encrypted by the encryption algorithm corresponding to the privacy level information.

APPENDIX 13

The database encryption system according to any one of appendices 1 to 12, wherein
the database control unit, in a case where, with regard to a computation operation of the database operation command, data to be operated on, which is stored as ciphertext in the database, is encrypted by an encryption algorithm corresponding to a predetermined prescribed homomorphic computation, and the computation operation of the database operation command includes the prescribed homomorphic computation, performs the computation operation on the encrypted data that is to be operated on, as ciphertext, and transmits a ciphertext computation result to the application response unit as the database processing result, and
the application response unit:
(A) returns a plaintext computation result obtained by decrypting the ciphertext computation result transmitted by the database control unit by using key information of the key usage unit, to the issuing source of the database operation command, or
(B) in a case where the computation operation of the database operation command further requires computation in plaintext, performs the computation in plaintext, and returns the plaintext computation result to the issuing source of the database operation command, or the application response unit:
(C) decrypts the ciphertext computation result transmitted by the database control unit by using key information of the key usage unit, and further performs plaintext computation on a plaintext computation result obtained;
(D) encrypts the plaintext computation result using key information of the key usage unit, then transmits the encrypted result to the database control unit, and performs a computation operation on the ciphertext as it is, by the database control unit;
(E) decrypts the ciphertext computation result transmitted by the database control unit using key information of the key usage unit, to have plaintext; and
(F) returns the plaintext computation result to the issuing source of the database operation command, or further performs a computation on the plaintext computation result, or furthermore, repeats the processing of (D) and (E) at least once and then returns the plaintext computation result to the issuing source of the database operation command.

APPENDIX 14

The database encryption system according to any one of appendices 1 to 12, wherein
the database control unit, in a case where data to be operated on, which is stored as ciphertext, is encrypted by an encryption algorithm such that a computation operation of the database operation command cannot be performed with the data as ciphertext, in the database, transmits the ciphertext data that is a target of the computation operation to the application response unit, and
the application response unit decrypts the ciphertext data transmitted by the database control unit using key information of the key usage unit, performs the computation operation of the database operation command on plaintext data obtained, and returns the computation operation result to the issuing source of the database operation command.

APPENDIX 15

The database encryption system according to appendix 8 or 9, wherein according to input to the security configuration unit, in a case of encrypting column data of a table within the database, the database control unit reads the column data from the database,
the application response unit encrypts the column data obtained by reading from the database by referring to the first and/or second storage unit, using key information of the key usage unit with an encryption algorithm corresponding to configured privacy level information, and transmits the column data to the database control unit,
the database control unit creates a ciphertext table including a pair of a serial number and ciphertext of the column data, and the database control unit comprises a ciphertext table information listing including a tuple of table name, column name, encryption algorithm, and ciphertext table name, in order to manage the ciphertext table.

APPENDIX 16

The database encryption system according to any one of appendices 1 to 14, wherein
the database control unit comprises an encryption computation unit that encrypts data and/or metadata using a public key transmitted by the application response unit.

APPENDIX 17

The database encryption system according to appendix 16, wherein
in a case of, according to input to the security configuration unit, encrypting column data of a table within the database, the database control unit reads the column data from the database, obtains public key information from the application response unit, and encrypts the column data by the encryption computation unit,
the database control unit creates a ciphertext table including a pair of a serial number and ciphertext of the column data, and the database control unit comprises a ciphertext table information listing including a tuple of table name, column name, encryption algorithm, and ciphertext table name, in order to manage the ciphertext table.

APPENDIX 18

The database encryption system according to appendix 15, wherein
the application response unit, in a case where a database operation command to add column data is inputted and encryption of the column data is necessary, encrypts the added data by an encryption algorithm corresponding to the column data using key information of the key usage unit, and transmits the added data to the database control unit, and
the database control unit adds a pair of an updated serial number and ciphertext to an end of the ciphertext table of the database.

APPENDIX 19

The database encryption system according to appendix 3, wherein
the application response unit, on receiving an instruction to change privacy level information of data stored in the database from the security configuration unit, decrypts encrypted data stored in the database once to plaintext using key information of the key usage unit, re-encrypts the plaintext with an encryption algorithm corresponding to the changed privacy level information and then transmits the re-encrypted data to the database control unit, stores the re-encrypted data in the database, and updates the privacy level information and the encryption algorithm distinguishing information of the first storage unit.

APPENDIX 20

The database encryption system according to appendix 19, wherein
the security configuration unit specifies, with regard to a change of privacy level information of data stored in the database, a table name, a column name, and privacy level information after change,
the application response unit obtains a first set of encryption algorithm identifiers used in encryption of the data of the table name and column name stored in the database from the second storage unit, and obtains a second set of encryption algorithm identifiers corresponding to inputted privacy level information,
in a case where a common encryption algorithm identifier does not exist in the first and second sets, ciphertext of the data of the table name and column name, encrypted by an encryption algorithm of one of the encryption algorithm identifiers among the first set, is decrypted to plaintext using key information of the key usage unit, and the plaintext is encrypted by an encryption algorithm corresponding to the inputted privacy level information of the second set, to be transmitted to the database control unit, and
the database control unit stores a pair of a serial number and ciphertext in a ciphertext table and then updates the ciphertext table information listing, and with regard to data for which a change of the privacy level information is specified, deletes a ciphertext table that does not correspond to the specified privacy level information.

APPENDIX 21

The database encryption system according to any one of appendices 1 to 20, wherein
the user apparatus issues a database operation command to the database, and executes a database usage application program that receives a processing result of the database operation command, and the application response unit receives a database operation command from the database usage application program and returns a processing result of the database operation command to the database usage application program.

APPENDIX 22

A user apparatus, connected to a database apparatus via a network, the user apparatus comprising:
a key usage unit that manages key information for encryption and decryption;
a security configuration unit that configures information related to configuration of security of data and/or metadata stored in the database;
a first storage unit that stores information configured by the security configuration unit; and
an application response unit that receives a database operation command issued to the database apparatus, and determines whether or not encryption is necessary with respect to data and/or metadata handled by the database operation command, by referring to the information of the first storage unit, wherein
the application response unit, if encryption is necessary, transmits to the database apparatus, as data and/or metadata of the database operation command, encrypted data and/or encrypted metadata that has been encrypted according to key information of the key usage unit by using an encryption algorithm corresponding to the security of the data and/or metadata, to cause the database apparatus to execute a database operation,
the application response unit, if encryption is not necessary, transmits the database operation command as it is, to the database apparatus to cause the database apparatus to execute the database operation, and
the application response unit receives a database processing result transmitted by the database apparatus, and if conversion or decryption of the data and/or metadata of the database processing result is necessary, returns a result of performing the conversion or the decryption according to key information of the key usage unit, to an issuing source of the database operation command as a response to the database operation command.

APPENDIX 23

The user apparatus according to appendix 22, wherein
the security configuration unit performs at least one of: a configuration or change with regard to whether or not the metadata including a table name and column name stored in the database is encrypted, a configuration or change with regard to whether or not the data is encrypted, and a configuration or change of privacy level information representing data security level.

APPENDIX 24

The user apparatus according to appendix 23, wherein
the first storage unit holds information as to whether or not metadata including a table name and column name stored in the database is encrypted, whether or not data is encrypted, privacy level information representing the security level of the data, and distinguishing information for an encryption algorithm corresponding to the privacy level information, and the first storage unit, in a case where the table name and column name are encrypted, stores and holds, in addition to an encrypted table name and column name, the table name in plaintext and column name in plaintext before encryption, as a decrypted table name and column name.

APPENDIX 25

The user apparatus according to appendix 24, wherein the application response unit determines whether or not a table name and column name specified by the database operation command are encrypted by referring to the first storage unit,
the application response unit replaces plaintext with ciphertext in a case where at least one of the table name and column name is encrypted, and
the application response unit, by referring to the first storage unit, in a case of encrypting data, encrypts the data using key information of the key usage unit using an encryption algorithm corresponding to the privacy level information, and transmits the encrypted data to the database apparatus.

APPENDIX 26

A database apparatus that receives a database operation command transmitted by the user apparatus according to any one of appendices 22 to 25, executes a database operation using a cryptographic protocol on encrypted data, or a database operation on plaintext data, with respect to the database, and returns a processing result to the application response unit, as the database processing result.

APPENDIX 27

The database apparatus according to appendix 26, wherein the database control unit receives a database operation command transmitted by the application response unit, executes a database operation using a cryptographic protocol on encrypted data, or a database operation on plaintext data, with respect to the database, and returns a processing result to the application response unit, as the database processing result.

APPENDIX 28

The database apparatus according to appendix 26, wherein the database control unit, with regard to a predetermined prescribed operation and computation of the database operation command, performs the operation or computation on ciphertext data stored in the database, as ciphertext, and transmits the ciphertext processing result to the application response unit as the database processing result.

APPENDIX 29

The database apparatus according to appendix 26, wherein the database apparatus comprises:
a second storage unit that stores and holds information as to whether or not the metadata including a table name and column name stored in the database is encrypted, whether or not the data is encrypted, privacy level information representing the security level of the data, and distinguishing information for an encryption algorithm corresponding to the privacy level information; and
a third storage unit that stores and holds at least cryptographic protocol distinguishing information that associates processing content of the database operation command, privacy level information, and encryption algorithm.

APPENDIX 30

The database apparatus according to appendix 29, wherein the database functions as the second and/or third storage unit, and holds information stored in the second and/or third storage unit as a table within the database.

APPENDIX 31

The database apparatus according to appendix 29, wherein the database control unit comprises a cryptographic protocol process execution unit that executes a cryptographic protocol process of processing content corresponding to the database operation command, based on cryptographic protocol distinguishing information of the third storage unit, with respect to data encrypted by the encryption algorithm corresponding to the privacy level information.

APPENDIX 32

The database apparatus according to any one of appendices 26 to 31, wherein
the database control unit, in a case where, with regard to a computation operation of the database operation command, data to be operated on, which is stored as ciphertext in the database, is encrypted by an encryption algorithm corresponding to a predetermined prescribed homomorphic computation, and the computation operation of the database operation command includes the prescribed homomorphic computation, performs the computation operation on the encrypted data that is to be operated on, as ciphertext, and transmits a ciphertext computation result to the application response unit as the database processing result, and
the application response unit:
(A) returns a plaintext computation result obtained by decrypting the ciphertext computation result transmitted by the database control unit by using key information of the key usage unit, to the issuing source of the database operation command, or
(B) in a case where the computation operation of the database operation command further requires computation in plaintext, performs the computation in the plaintext, and returns the plaintext computation result to the issuing source of the database operation command, or the application response unit:
(C) decrypts the ciphertext computation result transmitted by the database control unit by using key information of the key usage unit, and further performs plaintext computation on a plaintext computation result obtained;
(D) encrypts the plaintext computation result using key information of the key usage unit, then transmits the encrypted result to the database control unit, and performs a computation operation on the ciphertext as it is, in the database control unit;
(E) decrypts the ciphertext computation result transmitted by the database control unit using key information of the key usage unit, to have plaintext; and
(F) returns the plaintext computation result to the issuing source of the database operation command, or further performs a computation on the plaintext computation result, or furthermore, repeats the processing of (D) and (E) at least once and then returns the plaintext computation result to the issuing source of the database operation command.

APPENDIX 33

The database apparatus according to any one of appendices 26 to 31, wherein
the database control unit, in a case where data to be operated on, which is stored as ciphertext, is encrypted by an encryption algorithm such that a computation operation of the database operation command cannot be performed with the data as ciphertext, transmits the ciphertext data that is a computation operation target to the application response unit, and
the application response unit decrypts the ciphertext data transmitted by the database control unit using key information of the key usage unit, performs a computation operation of the database operation command on the obtained plaintext data, and returns the computation operation result to the issuing source of the database operation command.

APPENDIX 34

The database apparatus according to appendix 26, wherein in a case of encrypting column data of a table within the database,
the database control unit reads the column data from the database,
the application response unit refers to the first and/or the second storage unit to encrypt the column data obtained by reading from the database, using key information of the key usage unit with an encryption algorithm corresponding to configured privacy level information, and transmits the column data to the database control unit,
the database control unit creates a ciphertext table including a pair of a serial number and ciphertext of the column data, and
the database control unit comprises a ciphertext table information listing including a tuple of table name, column name, encryption algorithm, and ciphertext table name, in order to manage the ciphertext table.

APPENDIX 35

The database apparatus according to appendix 26, wherein the database control unit comprises an encryption computation unit that encrypts data and/or metadata using a public key transmitted by the application response unit.

APPENDIX 36

The database apparatus according to appendix 26, wherein in a case of encrypting column data of a table within the database,
the database control unit reads the column data from the database, obtains public key information from the application response unit, and encrypts the column data by the encryption computation unit,
the database control unit creates a ciphertext table including a pair of a serial number and ciphertext of the column data, and
the database control unit comprises a ciphertext table information listing including a tuple of table name, column name, encryption algorithm, and ciphertext table name, in order to manage the ciphertext table.

APPENDIX 37

The database apparatus according to appendix 26, wherein the application response unit, in a case where a database operation command to add column data is inputted and encryption of the column data is necessary, encrypts the added data by an encryption algorithm corresponding to the column data using key information of the key usage unit and transmits the added data to the database control unit, and
the database control unit adds a pair of an updated serial number and ciphertext to the end of the ciphertext table of the database.

APPENDIX 38

A database encryption method, comprising:
by a user apparatus connected to a database apparatus via a network, storing and managing key information for encryption and decryption; configuring information related to configuration of security of data and/or metadata stored in the database and storing the information in a first storage unit;
determining, with respect to a database operation command issued to the database apparatus, whether or not it is necessary to encrypt the data and/or metadata handled by the database operation command, by referring to the information of the first storage unit;
if encryption is necessary, transmitting to the database apparatus, as data and/or metadata of the database operation command, encrypted data and/or encrypted metadata that has been encrypted according to the key information using an encryption algorithm corresponding to the security of the data and/or metadata, to cause the database apparatus to execute a database operation;
if encryption is not necessary, transmitting the database operation command as it is, to the database apparatus to cause the database apparatus to execute the database operation; and
receiving a database processing result transmitted by the database apparatus, and if conversion or decryption of the data and/or metadata of the database processing result is necessary, returning a result of performing the conversion or the decryption according to the key information to an issuing source of the database operation command as a response to the database operation command.

APPENDIX 39

The database encryption method according to appendix 38, comprising: performing, in configuring the security, at least one of: a configuration or change with regard to whether or not the metadata is encrypted, a configuration or change with regard to whether or not the data is encrypted, and a configuration or change of privacy level information representing data security level.

APPENDIX 40

The database encryption method according to appendix 38, wherein
the first storage unit holds information as to whether or not the metadata is encrypted, whether or not the data is encrypted, privacy level information representing the security level of the data, and distinguishing information for the encryption algorithm corresponding to the privacy level information.

APPENDIX 41

The database encryption method according to appendix 40, wherein
the first storage unit holds, in a case where the metadata including a table name and column name stored in the database is encrypted, the encrypted table name and column name, in addition to storing and holding the table name in plaintext and the column name in plaintext, before encryption, as a decrypted table name and a decrypted column name, respectively.

APPENDIX 42

The database encryption method according to appendix 41, comprising: obtaining, in a case where at least one of a table name and column name among metadata of the database processing result is encrypted, at least one of the table name in plaintext and the column name in plaintext, held as the decrypted table name and the decrypted column name in the first storage unit.

APPENDIX 43

The database encryption method according to any one of appendices 38 to 42, wherein
the database apparatus receives the database operation command transmitted by the user apparatus, executes a database operation using a cryptographic protocol on encrypted data, or a database operation on plaintext data, with respect to the database, and returns a processing result to the user apparatus, as the database processing result.

APPENDIX 44

The database encryption method according to appendix 43, wherein
the database control unit performs, with regard to a predetermined prescribed operation and computation of the database operation command, the operation or computation on ciphertext data stored in the database, as ciphertext, and transmits a ciphertext processing result to the user apparatus as the database processing result.

APPENDIX 45

The database encryption method according to any one of appendices 41 to 44, wherein
the database apparatus stores and holds in a second storage unit information as to whether or not the metadata including the table name and column name stored in the database is encrypted, whether or not the data is encrypted, privacy level information representing data security level, and distinguishing information for an encryption algorithm corresponding to the privacy level information, and
the database apparatus stores and holds in a third storage unit at least cryptographic protocol distinguishing information that associates processing content of the database operation command, privacy level information, and an encryption algorithm.

APPENDIX 46

The database encryption method according to appendix 45, wherein
the database functions as the second and/or third storage unit, and holds information stored in the second and/or third storage unit, as a table within the database.

APPENDIX 47

The database encryption method according to appendix 45 or 46,
wherein the user apparatus selects an encryption algorithm corresponding to the privacy level information corresponding to the data by referring to at least one of the first to third storage units, and encrypts data using the selected encryption algorithm and key information of the key usage unit, to transmit the data to the database apparatus.

APPENDIX 48

The database encryption method according to appendix 47, wherein
the user apparatus determines whether or not the table name and column name specified by the database operation command are encrypted by referring to the first and/or second storage unit, and in a case where at least one of the table name and column name is encrypted, replaces at least one of the table name and the column name of the database operation command with ciphertext, and then transmits the ciphertext to the database apparatus.

APPENDIX 49

The database encryption method according to appendix 47, wherein
the database apparatus comprises a cryptographic protocol process execution unit that executes a cryptographic protocol process of processing content corresponding to the database operation command, based on the cryptographic protocol distinguishing information of the third storage unit, with respect to the data encrypted by the encryption algorithm corresponding to the privacy level information.

APPENDIX 50

The database encryption method according to any one of appendices 38 to 49, wherein
the database apparatus, in a case where, with regard to a computation operation of the database operation command, data to be operated on, which is stored as ciphertext in the database, is encrypted by an encryption algorithm corresponding to a predetermined prescribed homomorphic computation, and the computation operation of the database operation command includes the prescribed homomorphic computation, performs the computation operation on the encrypted data that is to be operated on, as ciphertext, and transmits a ciphertext computation result to the user apparatus as the database processing result; and
the user apparatus:
(A) returns a plaintext computation result obtained by decrypting the ciphertext computation result transmitted by the database apparatus by using key information of the key usage unit, to the issuing source of the database operation command, or
(B) in a case where the computation operation of the database operation command requires computation in plaintext, performs the computation in the plaintext, and returns the plaintext computation result to the issuing source of the database operation command, or the user apparatus:
(C) decrypts the ciphertext computation result transmitted by the database apparatus by using key information of the key usage unit, and performs plaintext computation on a plaintext computation result obtained;
(D) encrypts the plaintext computation result using key information of the key usage unit, then transmits the encrypted result to the database apparatus and performs a computation operation on the ciphertext as it is, in the database apparatus;
(E) decrypts the ciphertext computation result transmitted by the database apparatus using the key information, to have plaintext; and (F) returns the plaintext computation result to the issuing source of the database operation command, or performs a computation on the plaintext computation result, or furthermore, repeats the processing of (D) and (E) at least once and then returns the plaintext computation result to the issuing source of the database operation command.

APPENDIX 51

The database encryption method according to any one of appendices 38 to 49, wherein
the database apparatus, in a case where data to be operated on, which is stored as ciphertext, is encrypted by an encryption algorithm such that a computation operation of the database operation command cannot be performed with the data as ciphertext, in the database, transmits the ciphertext data that is a computation operation target to the user apparatus, and
the user apparatus decrypts the ciphertext data transmitted by the database apparatus using key information of the key usage unit, performs a computation operation of the database operation command on the obtained plaintext data, and returns the computation operation result to the issuing source of the database operation command.

APPENDIX 52

The database encryption method according to appendix 45 or 48, wherein
in a case of encrypting column data of a table within the database according to input of the security configuration,
the database apparatus reads the column data from the database,
the user apparatus encrypts the column data that is read from the database by referring to the first and/or second storage units, using key information of the key usage unit with an encryption algorithm corresponding to the configured privacy level information, and transmits the encrypted column data to the database control unit,
the database apparatus creates a ciphertext table including a pair of a serial number and ciphertext of the column data, and
the database apparatus comprises a ciphertext table information listing including a tuple of table name, column name, encryption algorithm, and ciphertext table name, in order to manage the ciphertext table.

APPENDIX 53

The database encryption method according to any one of appendices 38 to 51, wherein
the database apparatus encrypts data and/or metadata using a public key transmitted by the application response unit.

APPENDIX 54

The database encryption method according to appendix 53, wherein
in a case of encrypting column data of a table within the database according to input of the security configuration,
the database apparatus reads the column data from the database, obtains public key information from the application response unit, and encrypts the column data by the encryption computation unit,
the database apparatus creates a ciphertext table including a pair of a serial number and ciphertext of the column data, and
the database apparatus comprises a ciphertext table information listing including a tuple of table name, column name, encryption algorithm, and ciphertext table name, in order to manage the ciphertext table.

APPENDIX 55

The database encryption method according to appendix 52, wherein
the user apparatus, in a case where a database operation command to add column data is inputted and encryption of the column data is necessary, encrypts the added data by an encryption algorithm corresponding to the column data, using the key information, and transmits the added data to the database apparatus, and
the database apparatus adds a pair of an updated serial number and ciphertext to the end of the ciphertext table of the database.

APPENDIX 56

The database encryption method according to appendix 40, wherein
the user apparatus, on receiving an instruction to change privacy level information of data stored in the database, with regard to configuration of the security, decrypts encrypted data stored in the database once to plaintext using the key information, re-encrypts the plaintext with an encryption algorithm corresponding to the changed privacy level information and then transmits the re-encrypted data to the database apparatus, stores the re-encrypted data in the database, and updates the privacy level information and the encryption algorithm distinguishing information in the first storage unit.

APPENDIX 57

The database encryption method according to appendix 56, comprising: specifying, for a change of privacy level information of data stored in the database, with regard to configuration of the security, a table name, a column name, and privacy level information after change;
by the user apparatus, obtaining a first set of encryption algorithm identifiers used in encryption of the data of the table name and column name stored in the database from the second storage unit, and obtaining a second set of encryption algorithm identifiers corresponding to inputted privacy level information,
in a case where a common encryption algorithm identifier does not exist in the first and second sets, by decrypting ciphertext of the data of the table name and column name, encrypted by an encryption algorithm of one of the encryption algorithm identifiers among the first set, to plaintext using the key information, and encrypting the plaintext by an encryption algorithm corresponding to the inputted privacy level information of the second set, to be transmitted to the database apparatus; and
by the database apparatus, storing a pair of a serial number and ciphertext in a ciphertext table and then updating the ciphertext table information listing, and with regard to data for which a change of the privacy level information is specified, deleting a ciphertext table that does not correspond to the specified privacy level information.

APPENDIX 58

The database encryption method according to any one of appendices 38 to 57, wherein the user apparatus issues a database operation command to the database, and executes a database usage application program that receives a processing result of the database operation command, and the user apparatus receives a database operation command from the database usage application program, and returns a processing result of the database operation command to the database usage application program.

APPENDIX 59

The database encryption method according to appendix 38, wherein
the database apparatus receives the database operation command transmitted by the user apparatus, executes a cryptographic protocol on encrypted data, or a database operation on plaintext data, with respect to the database, and returns a processing result to the user apparatus.

APPENDIX 60

A program, causing a computer of a user apparatus, connected to a database apparatus via a network, to execute:
a key usage process of managing key information for encryption and decryption;
a security configuration process of configuring information related to configuration of security of data and/or metadata stored in a database, and storing in a first storage unit; and
an application response process of determining, with respect to a database operation command issued to the database apparatus, whether or not encryption is necessary with respect to data and/or metadata handled by the database operation command, by referring to the information of the first storage unit, wherein
the application response process further comprises:
if encryption is necessary, transmitting to the database apparatus, as data and/or metadata of the database operation command, encrypted data and/or encrypted metadata that has been encrypted according to the key information by using an encryption algorithm corresponding to the security of the data and/or metadata, to cause the database apparatus to execute a database operation;
if encryption is not necessary, transmitting the database operation command as it is, to the database apparatus to cause the database apparatus to execute the database operation; and
receiving a database processing result transmitted by the database apparatus, and if conversion or decryption of the data and/or metadata of the database processing result is necessary, returning a result of performing the conversion or the decryption according to the key usage process to an issuing source of the database operation command as a response to the database operation command.

APPENDIX 61

A program, causing a computer forming a database apparatus to execute:
a process of executing, on receiving an encrypted database operation command from the user apparatus of appendix 60, a cryptographic protocol on the database; a process of executing, on receiving an unencrypted database operation command from the user apparatus, a database operation on plaintext data with respect to the database; and
a process of returning the processing result to the user apparatus.

APPENDIX 62

A computer readable storage medium that stores the program of appendix 60 or 61.

It is to be noted that that the respective disclosures of the abovementioned Patent Literatures PTL1 to PTL3 and Non-Patent Literature NPL1 are incorporated herein by reference thereto. Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements (including respective elements of respective appendices, respective elements of respective exemplary embodiments, respective elements of respective drawings, and the like) is possible within the scope of the claims of the present invention. That is, the present invention clearly includes every type of transformation and modification that a person skilled in the art can realize according to the entire disclosure including the scope of the claims and to technological concepts thereof. Particularly, any numerical range disclosed herein should be interpreted that any intermediate values or subranges falling within the disclosed range are also concretely disclosed even without specific recital thereof.

REFERENCE SIGNS LIST 10 database apparatus
11 database
12 database control unit
13 cryptographic protocol information storage unit
14 security configuration information storage unit
20 user apparatus
21 database usage application (program)
22 application response unit
23 key usage unit
24 key information storage unit
25 security configuration information temporary storage unit
26 security configuration unit
27 input/output device
30 network
111 cryptographic protocol information table
112 security configuration information table
121 database operation unit
122 cryptographic protocol process execution unit
123 cryptographic protocol information operation unit
124 security configuration information operation unit
125 processing/communication control unit
126 encryption computation unit
221 processing/communication control unit
222 cryptographic protocol process execution unit
223 database operation conversion processing unit
224 encryption computation unit
225 security configuration information operation unit
231 encryption computation unit
232 key information management unit
261 configuration display unit
262 configuration input unit

The invention claimed is:
1. A database encryption system, comprising:
a database computer apparatus that comprises a database, and a database controller that controls execution of database operation; and
a user computer apparatus that is connected to the database controller via a network, wherein the user computer apparatus further comprises:
a key usage logic that manages key information for encryption and decryption; and an application response logic that receives a database operation command issued to the database computer apparatus;

wherein:

the application response logic transmits to the database controller, as data and/or metadata of the database operation command, encrypted data and/or encrypted metadata that has been encrypted according to key information of the key usage logic to cause the database controller to execute the database operation, the application response logic receives a database processing result transmitted by the database controller, and returns a result of performing conversion or the decryption according to key information of the key usage logic, to an issuing source of the database operation command as a response to the database operation command;

the user computer apparatus comprises:

a security configuration logic that configures information related to configuration of security of data and/or metadata stored in the database, and a first storage of a computer that stores information related to the configuration of security; and the application response logic:

receives a database operation command issued to the database computer apparatus, and, by referring to the information of the first storage, transmits to the database controller, as data and/or metadata of the database operation command, encrypted data and/or encrypted metadata that has been encrypted according to key information of the key usage logic by using an encryption algorithm corresponding to the security of the data and/or metadata, to cause the database controller to execute the database operation.

2. The database encryption system according to claim 1, wherein the security configuration logic performs at least one of:

a configuration or change with regard to whether or not the metadata is encrypted, a configuration or change with regard to whether or not the data is encrypted, and a configuration or change of privacy level information representing the security level.

3. The database encryption system according to claim 1, wherein the first storage holds information with regard to whether or not the metadata is encrypted, whether or not the data is encrypted, privacy level information representing the security level of the data, and distinguishing information for an encryption algorithm corresponding to the privacy level information.

4. The database encryption system according to claim 3, wherein the first storage, in a case where the metadata including a table name and column name stored in the database is encrypted, holds the encrypted table name and column name, in addition to storing and holding the table name in plaintext and the column name in plaintext, before encryption, as a decrypted table name and a decrypted column name, respectively.

5. The database encryption system according to claim 4, wherein the application response logic, in a case where at least one of a table name and column name among metadata of the database processing result is encrypted, obtains at least one of the table name in plaintext and the column name in plaintext, held as the decrypted table name and the decrypted column name of the first storage.

6. The database encryption system according to claim 4, wherein the database computer apparatus comprises:

a second storage of a computer that stores and holds information as to whether or not the metadata including a table name and column name stored in the database is encrypted, whether or not the data is encrypted, privacy level information representing the security level of the data, and distinguishing information for an encryption algorithm corresponding to the privacy level information; and a third storage of a computer that stores and holds at least cryptographic protocol distinguishing information associating processing content of the database operation command, the privacy level information, and the encryption algorithm.

7. The database encryption system according to claim 6, wherein the database functions as the second storage and/or the third storage, and holds information stored in the second storage and/or the third storage as a table within the database.

8. The database encryption system according to claim 6, wherein the application response logic selects an encryption algorithm corresponding to the privacy level information corresponding to the data by referring to at least one of the first storage, the second storage, and the third storage, and encrypts the data using the selected encryption algorithm and key information of the key usage logic, to transmit the data to the database controller.

9. The database encryption system according to claim 8, wherein the application response logic determines whether or not a table name and column name specified by the database operation command are encrypted by referring to the first and/or second storage, and in a case where at least one of the table name and column name is encrypted, replaces at least one of the table name and the column name of the database operation command with ciphertext, to be transmitted to the database controller.

10. The database encryption system according to claim 8, wherein the database controller comprises a cryptographic protocol process execution logic that executes a cryptographic protocol process of processing content corresponding to the database operation command, based on cryptographic protocol distinguishing information of the third storage, with respect to data encrypted by the encryption algorithm corresponding to the privacy level information.

11. The database encryption system according to claim 6, wherein the security configuration logic refers to at least one of the first storage, the second storage, and the third storage to select, for processing content specified by the database operation command received by the application response logic, an encryption algorithm that performs the database operation command with a predetermined processing efficiency from encryption algorithms corresponding to the privacy level information corresponding to the database operation command.

12. The database encryption system according to claim 11, wherein the security configuration logic stores in the second storage distinguishing information for the selected encryption algorithm in association with a table and a column to be processed by the database operation command.

13. The database encryption system according to claim 6, wherein in a case of encrypting column data of a table within the database according to input to the security configuration logic, the database controller reads the column data from the database, the application response logic encrypts the column data obtained by reading from the database by referring to the first storage and/or second storage, using key information of the key usage logic with an encryption algorithm corresponding to configured privacy level information, and transmits the column data to the database controller, the database controller creates a ciphertext table including a pair of a serial number and ciphertext of the column data, and the database controller comprises a ciphertext table information listing including a tuple of table name, column name, encryption algorithm, and ciphertext table name, in order to manage the ciphertext table.

14. The database encryption system according to claim 13, wherein the application response logic, in a case where a database operation command to add column data is inputted and encryption of the column data is necessary, encrypts the added data by an encryption algorithm corresponding to the column data using key information of the key usage logic, and transmits the added data to the database controller, and the database controller adds a pair of an updated serial number and ciphertext to an end of the ciphertext table of the database.

15. The database encryption system according to claim 3, wherein the application response logic, on receiving an instruction to change privacy level information of data stored in the database from the security configuration logic, decrypts encrypted data stored in the database once to plaintext using key information of the key usage logic, re-encrypts the plaintext with an encryption algorithm corresponding to the changed privacy level information and then transmits the re-encrypted data to the database controller, stores the re-encrypted data in the database, and updates the privacy level information and the encryption algorithm distinguishing information of the first storage.

16. The database encryption system according to claim 15, wherein the security configuration logic specifies, with regard to a change of privacy level information of data stored in the database, a table name, a column name, and privacy level information after change, the application response logic obtains a first set of encryption algorithm identifiers used in encryption of the data of the table name and column name stored in the database from the second storage, and obtains a second set of encryption algorithm identifiers corresponding to inputted privacy level information, in a case where a common encryption algorithm identifier does not exist in the first and second sets, ciphertext of the data of the table name and column name, encrypted by an encryption algorithm of one of the encryption algorithm identifiers among the first set, is decrypted to plaintext using key information of the key usage logic, and the plaintext is encrypted by an encryption algorithm corresponding to the inputted privacy level information of the second set, to be transmitted to the database controller, and the database controller stores a pair of a serial number and ciphertext in a ciphertext table and then updates the ciphertext table information listing, and with regard to data for which a change of the privacy level information is specified, deletes a ciphertext table that does not correspond to the specified privacy level information.

17. The database encryption system according to claim 1, wherein the database controller receives the database operation command transmitted by the application response logic, executes a database operation using a cryptographic protocol on encrypted data or a database operation on plaintext data, with respect to the database, and returns a processing result to the application response logic as the database processing result.

18. The database encryption system according to claim 17, wherein the database controller, with regard to a predetermined prescribed operation and computation of the database operation command, performs the operation or computation on ciphertext data stored in the database, as ciphertext, and transmits a ciphertext processing result to the application response logic as the database processing result.

19. The database encryption system according to claim 1, wherein the database controller, in a case where, with regard to a computation operation of the database operation command, data to be operated on, which is stored as ciphertext in the database, is encrypted by an encryption algorithm corresponding to a predetermined prescribed homomorphic computation, and the computation operation of the database operation command includes the prescribed homomorphic computation, performs the computation operation on the encrypted data that is to be operated on, as ciphertext, and transmits a ciphertext computation result to the application response logic as the database processing result, and the application response logic:

(A) returns a plaintext computation result obtained by decrypting the ciphertext computation result transmitted by the database controller by using key information of the key usage logic, to the issuing source of the database operation command, or (B) in a case where the computation operation of the database operation command further requires computation in plaintext, performs the computation in plaintext, and returns the plaintext computation result to the issuing source of the database operation command, or the application response logic:

(C) decrypts the ciphertext computation result transmitted by the database controller by using key information of the key usage logic, and further performs plaintext computation on a plaintext computation result obtained;

(D) encrypts the plaintext computation result using key information of the key usage logic, then transmits the encrypted result to the database controller, and performs a computation operation on the ciphertext as it is, by the database controller;

(E) decrypts the ciphertext computation result transmitted by the database controller using key information of the key usage logic, to have plaintext; and (F) returns the plaintext computation result to the issuing source of the database operation command, or further performs a computation on the plaintext computation result, or furthermore, repeats the processing of (D) and (E) at least once and then returns the plaintext computation result to the issuing source of the database operation command.

20. The database encryption system according to claim 1, wherein the database controller, in a case where data to be operated on, which is stored as ciphertext, is encrypted by an encryption algorithm such that a computation operation of the database operation command cannot be performed with the data as ciphertext, in the database, transmits the ciphertext data that is a target of the computation operation to the application response logic, and the application response logic decrypts the ciphertext data transmitted by the database controller using key information of the key usage logic, performs the computation operation of the database operation command on plaintext data obtained, and returns the computation operation result to the issuing source of the database operation command.

21. The database encryption system according to claim 1, wherein the database controller comprises an encryption computation logic that encrypts data and/or metadata using a public key transmitted by the application response logic.

22. The database encryption system according to claim 21, wherein
in a case of, according to input to the security configuration logic, encrypting column data of a table within the database, the database controller reads the column data from the database, obtains public key information from the application response logic, and encrypts the column data by the encryption computation logic,
the database controller creates a ciphertext table including a pair of a serial number and ciphertext of the column data, and
the database controller comprises a ciphertext table information listing including a tuple of table name, column name, encryption algorithm, and ciphertext table name, in order to manage the ciphertext table.

23. The database encryption system according to claim 1, wherein
the user computer apparatus issues a database operation command to the database, and executes a database usage application program that receives a processing result of the database operation command, and
the application response logic receives a database operation command from the database usage application program and returns a processing result of the database operation command to the database usage application program.

24. A user computer apparatus, connected to a database system via a network, the user computer apparatus comprising:
a hardware processor implementing a key usage logic and an application response logic;
the key usage logic being configured to manage key information for encryption and decryption; and
the application response logic being configured to:
receive a database operation command issued to the database computer apparatus, and
then transmit to the database system, as data and/or metadata of the database operation command, encrypted data and/or encrypted metadata that has been encrypted according to key information of the key usage logic to cause the database system to execute a database operation;
the application response logic being further configured to:
receive a database processing result transmitted by the database system, and
return a result of performing conversion or the decryption according to key information of the key usage logic, to an issuing source of the database operation command as a response to the database operation command;
a security configuration logic that configures information related to configuration of security of data and/or metadata stored in the database; and
a first storage, of a computer, that stores the information related to configuration of security;
wherein the application response logic:
receives a database operation command issued to the database computer apparatus, and
transmits to the database system, as data and/or metadata of the database operation command, encrypted data and/or encrypted metadata that has been encrypted according to key information of the key usage logic by using an encryption algorithm corresponding to the security of the data and/or metadata, to cause the database computer apparatus to execute a database operation.

25. The user computer apparatus according to claim 24, wherein the security configuration logic performs at least one of: a configuration or change with regard to whether or not the metadata including a table name and column name stored in the database is encrypted, a configuration or change with regard to whether or not the data is encrypted, and a configuration or change of privacy level information representing data security level.

26. The user computer apparatus according to claim 25, wherein
the first storage holds information as to whether or not metadata including a table name and column name stored in the database is encrypted, whether or not data is encrypted, privacy level information representing the security level of the data, and distinguishing information for an encryption algorithm corresponding to the privacy level information, and
the first storage, in a case where the table name and column name are encrypted, stores and holds, in addition to an encrypted table name and column name, the table name in plaintext and column name in plaintext before encryption, as a decrypted table name and column name.

27. The user computer apparatus according to claim 26, wherein
the application response logic determines whether or not a table name and column name specified by the database operation command are encrypted by referring to the first storage,
the application response logic replaces plaintext with ciphertext in a case where at least one of the table name and column name is encrypted, and
the application response logic, by referring to the first storage, in a case of encrypting data, encrypts the data using key information of the key usage logic using an encryption algorithm corresponding to the privacy level information, and transmits the encrypted data to the database computer apparatus.

28. A database encryption method, comprising:
by a user computer apparatus connected to a database computer apparatus via a network, storing and managing key information for encryption and decryption;
with respect to a database operation command issued to the database computer apparatus, transmitting to the database computer apparatus, as data and/or metadata of the database operation command, encrypted data and/or encrypted metadata that has been encrypted according to the key information to cause the database computer apparatus to execute a database operation;
receiving a database processing result transmitted by the database computer apparatus, and returning a result of performing the conversion or the decryption according to the key information to an issuing source of the database operation command as a response to the database operation command;
by the user computer apparatus, configuring information related to configuration of security of data and/or metadata stored in the database and storing the information in a first storage of a computer;

with respect to a database operation command issued to the database computer apparatus, by referring to the information of the first storage, transmitting to the database computer apparatus, as data and/or metadata of the database operation command, encrypted data and/or encrypted metadata that has been encrypted according to the key information using an encryption algorithm corresponding to the security of the data and/or metadata, to cause the database computer apparatus to execute a database operation wherein the database computer apparatus receives the database operation command transmitted by the user computer apparatus, executes a cryptographic protocol on encrypted data, or a database operation on plaintext data, with respect to the database, and returns a processing result to the user computer apparatus.

29. A non-transitory computer-readable recording medium, storing a program that when executed by a hardware processor causes a user computer apparatus connected to a database computer apparatus via a network to execute:

a key usage process of managing key information for encryption and decryption;

an application response process of, with respect to a database operation command issued to the database computer apparatus, transmitting to the database computer apparatus, as data and/or metadata of the database operation command, encrypted data and/or encrypted metadata that has been encrypted according to the key information to cause the database computer apparatus to execute a database operation;

receiving a database processing result transmitted by the database computer apparatus, and returning a result of performing the conversion or the decryption according to the key usage process to an issuing source of the database operation command as a response to the database operation command;

a security configuration process of configuring information related to configuration of security of data and/or metadata stored in a database, and storing in a first storage of a computer, and the application response process comprises, with respect to a database operation command issued to the database computer apparatus, by referring to the information of the first storage, transmitting to the database computer apparatus, as data and/or metadata of the database operation command, encrypted data and/or encrypted metadata that has been encrypted according to the key information by using an encryption algorithm corresponding to the security of the data and/or metadata, to cause the database computer apparatus to execute a database operation.

* * * * *